United States Patent
Galatte et al.

(10) Patent No.: US 9,435,546 B2
(45) Date of Patent: Sep. 6, 2016

(54) PORTABLE COOKING SYSTEM AND METHODS OF USING THE SAME

(71) Applicant: David A. Galatte, Vernon Hills, IL (US)

(72) Inventors: David A. Galatte, Vernon Hills, IL (US); Scott Collins, Chicago, IL (US); Luc Lam, Skokie, IL (US)

(73) Assignee: David A. Galatte, Vernon Hills, IL (US)

( * ) Notice: Subject to any disclaimer, the term of this patent is extended or adjusted under 35 U.S.C. 154(b) by 525 days.

(21) Appl. No.: 14/023,656

(22) Filed: Sep. 11, 2013

(65) Prior Publication Data

US 2014/0069413 A1 Mar. 13, 2014

Related U.S. Application Data

(60) Provisional application No. 61/743,816, filed on Sep. 12, 2012.

(51) Int. Cl.
| | |
|---|---|
| *F24C 15/08* | (2006.01) |
| *F24C 3/14* | (2006.01) |
| *A47J 37/07* | (2006.01) |

(52) U.S. Cl.
CPC ............ *F24C 15/08* (2013.01); *A47J 37/0763* (2013.01); *F24C 3/14* (2013.01)

(58) Field of Classification Search
CPC ....... F24C 15/08; F24C 3/14; A47J 37/0763; A47J 2037/0777; B60P 3/0257
See application file for complete search history.

(56) References Cited

U.S. PATENT DOCUMENTS

| | | | | |
|---|---|---|---|---|
| 2,329,419 | A | * | 9/1943 | Reed .......................... B60P 3/32 296/176 |
| 3,888,539 | A | * | 6/1975 | Niessner .................... B60P 3/32 296/156 |
| 5,533,771 | A | | 7/1996 | Taylor et al. |
| 5,536,518 | A | | 7/1996 | Rummel |
| 5,755,154 | A | | 5/1998 | Schroeter et al. |
| D411,782 | S | | 7/1999 | Husted |
| 6,125,837 | A | | 10/2000 | Mulberry |
| D479,092 | S | | 9/2003 | Lewis et al. |
| D483,983 | S | | 12/2003 | Harrod et al. |
| D491,414 | S | | 6/2004 | Nichols et al. |
| 6,814,383 | B2 | | 11/2004 | Reed, III et al. |

(Continued)

OTHER PUBLICATIONS

Party King Grills, "Swing'N Smoke Varsity Grills," 3 pages, published at least as early as Sep. 11, 2012.

(Continued)

*Primary Examiner* — Alfred Basichas

(74) *Attorney, Agent, or Firm* — Klintworth & Rozenblat IP LLC

(57) ABSTRACT

A portable cooking system is provided and includes a guide member and a cooking device supported by the guide member, wherein the cooking device engages and is movable along the guide member between a first cooking device position, in which the cooking device is at least partially positioned within a vehicle, and a second cooking device position, in which the cooking device is spaced-apart from and external of the vehicle. The cooking device may be a grill. The guide member may be at least partially supported by the vehicle when the guide member is in both the first guide member position and the second guide member position. Alternatively, the guide member may be supported by the vehicle when the guide member is in the first guide member position and may not be supported by the vehicle when the guide member is in the second guide member position.

18 Claims, 38 Drawing Sheets

(56) References Cited

U.S. PATENT DOCUMENTS

| | | |
|---|---|---|
| D536,567 S | 2/2007 | May et al. |
| 7,338,104 B1 | 3/2008 | Bejin |
| D571,605 S | 6/2008 | Chung |
| D618,034 S | 6/2010 | Chung |
| D618,485 S | 6/2010 | Chung |
| D618,951 S | 7/2010 | Tzeng |
| 7,806,138 B1 | 10/2010 | Frantz |
| D654,758 S | 2/2012 | Thimm et al. |
| D660,074 S | 5/2012 | Chung |

OTHER PUBLICATIONS

Party King Grills, "Swing'N Smoke MVP Grills," 3 pages, published at least as early as Sep. 11, 2012.

Party King Grills, "Party Wagon All-Terrain Grills," 2 pages, published at least as early as Sep. 11, 2012.

www.freedomgrill.com, Freedom Grill Grilling System, "FG-50," 1 page, published at least as early as Sep. 11, 2012.

www.freedomgrill.com, Freedom Grill Grilling System, "FG-100," 1 page, published at least as early as Sep. 11, 2012.

www.freedomgrill.com, Freedom Grill Grilling System, "FG-800," 1 page, published at least as early as Sep. 11, 2012.

www.freedomgrill.com, Freedom Grill Grilling System, "FG-900," 1 page, published at least as early as Sep. 11, 2012.

GO Chassi, "Go Chassi C.22 Grill N Chill with Grill, Stereo, Cooler and Draft Tower," 1 page, published at least as early as Sep. 11, 2012.

* cited by examiner

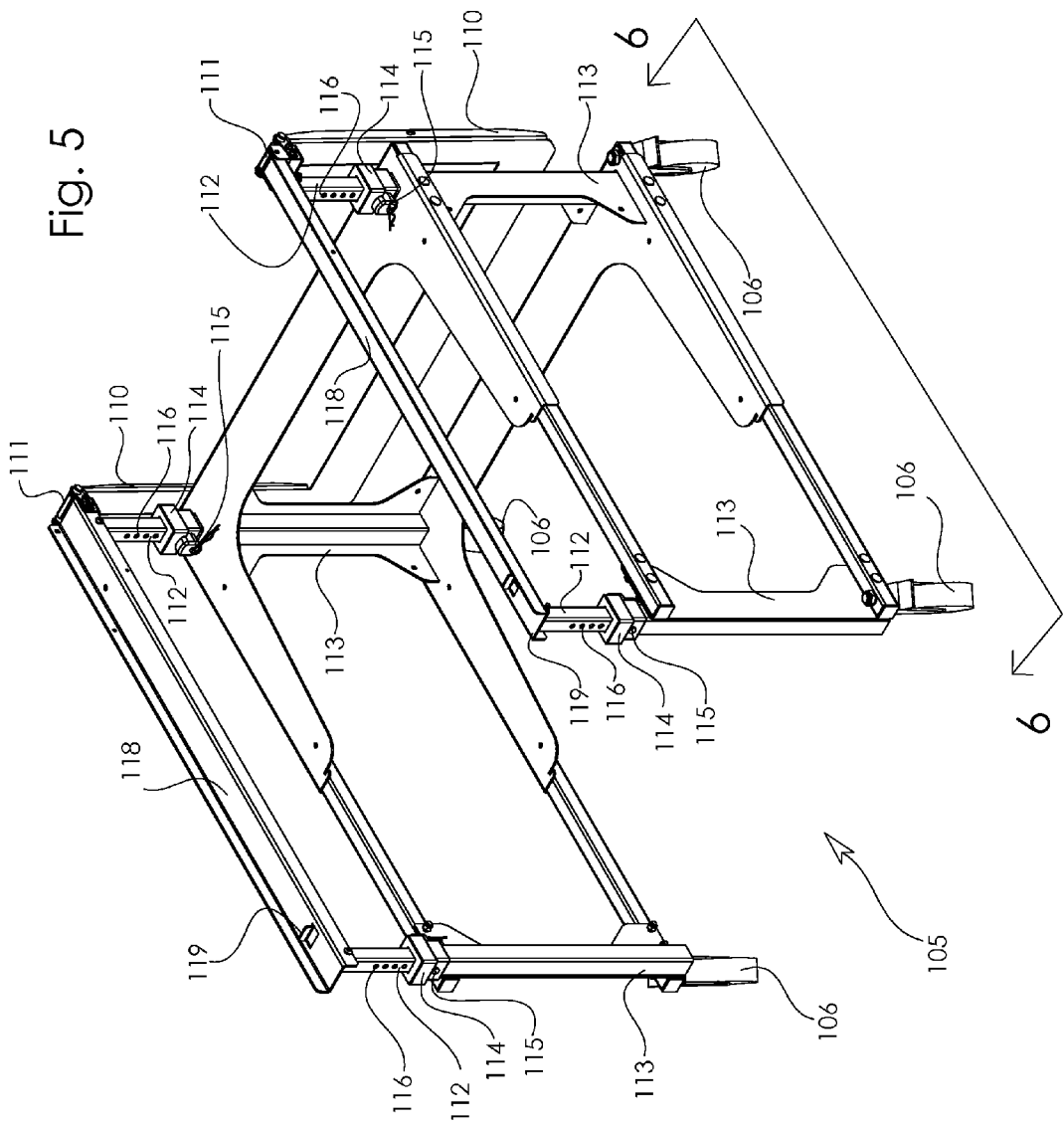

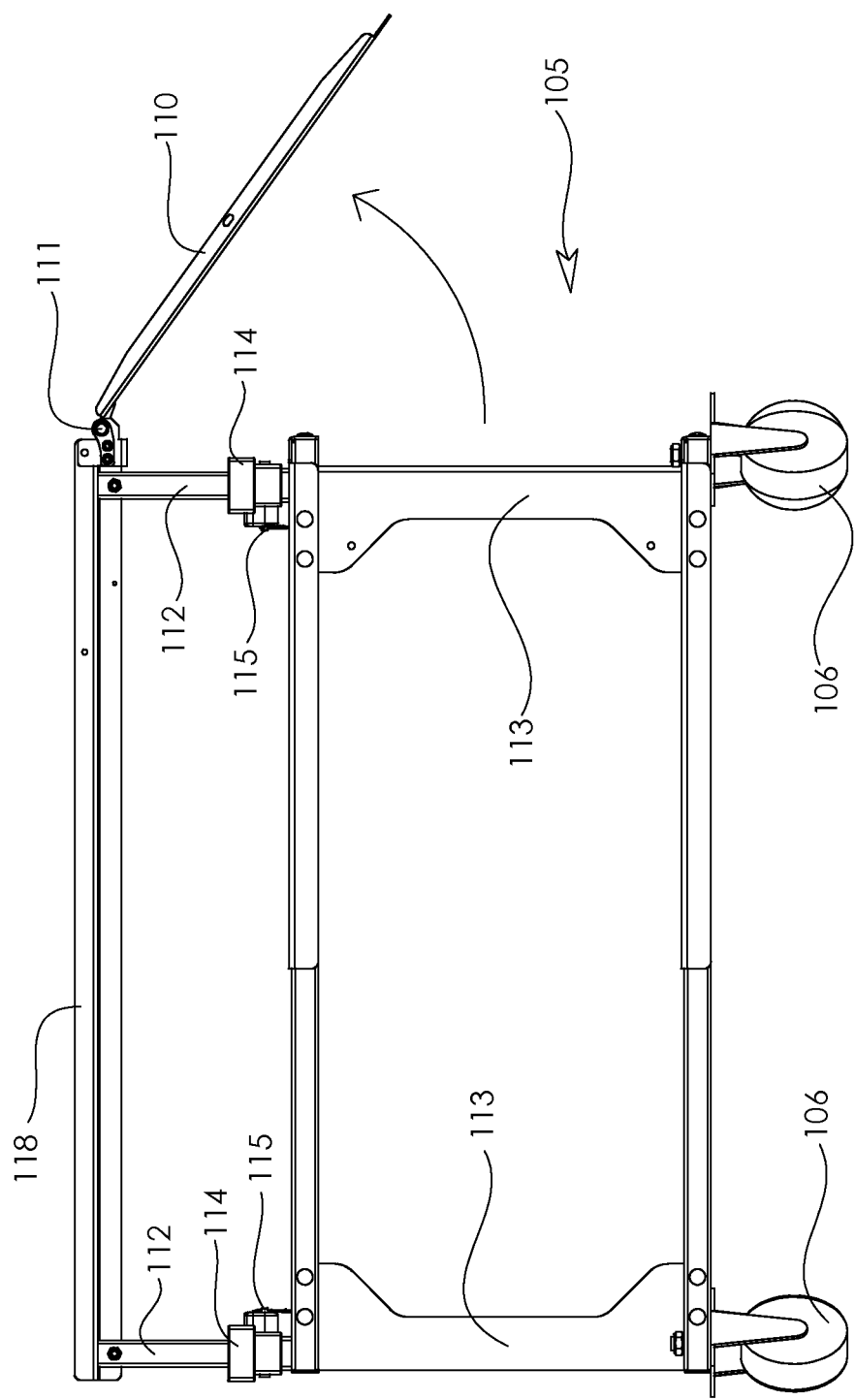

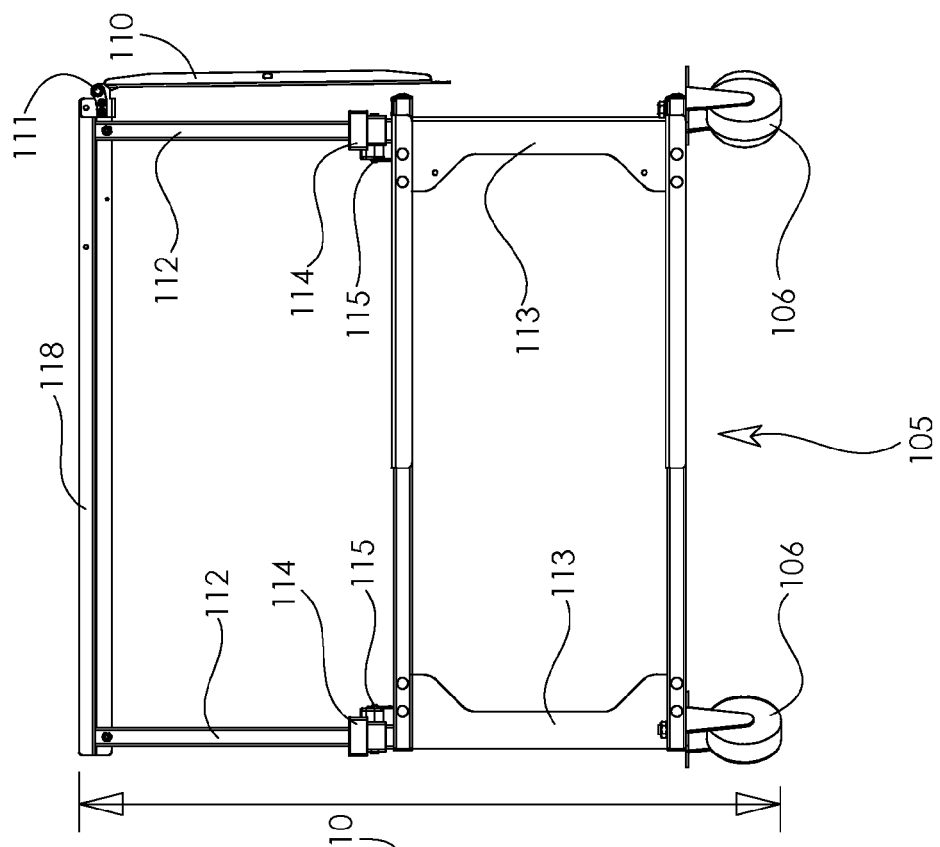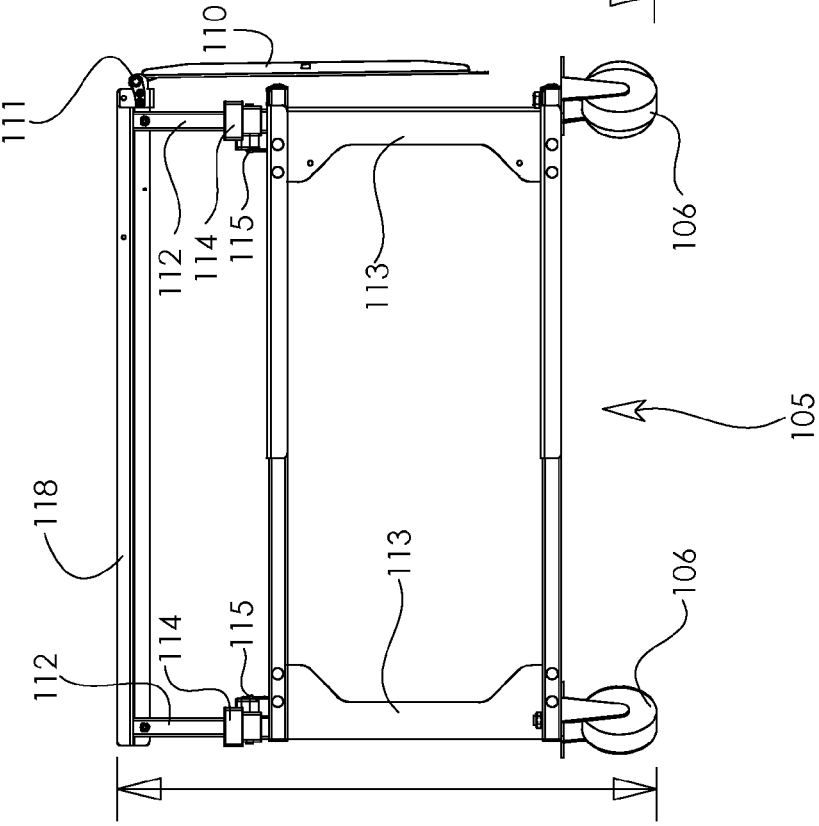

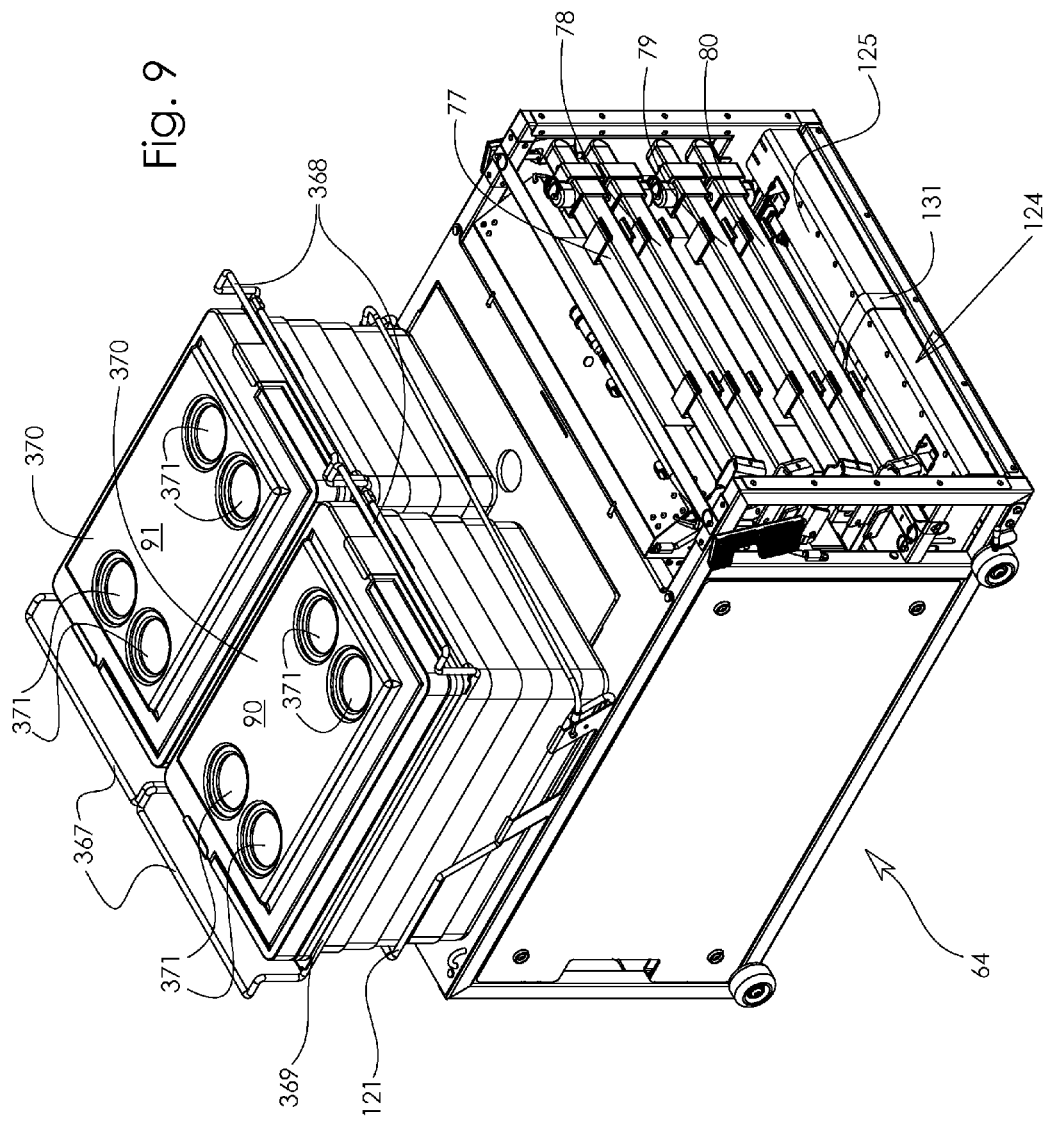

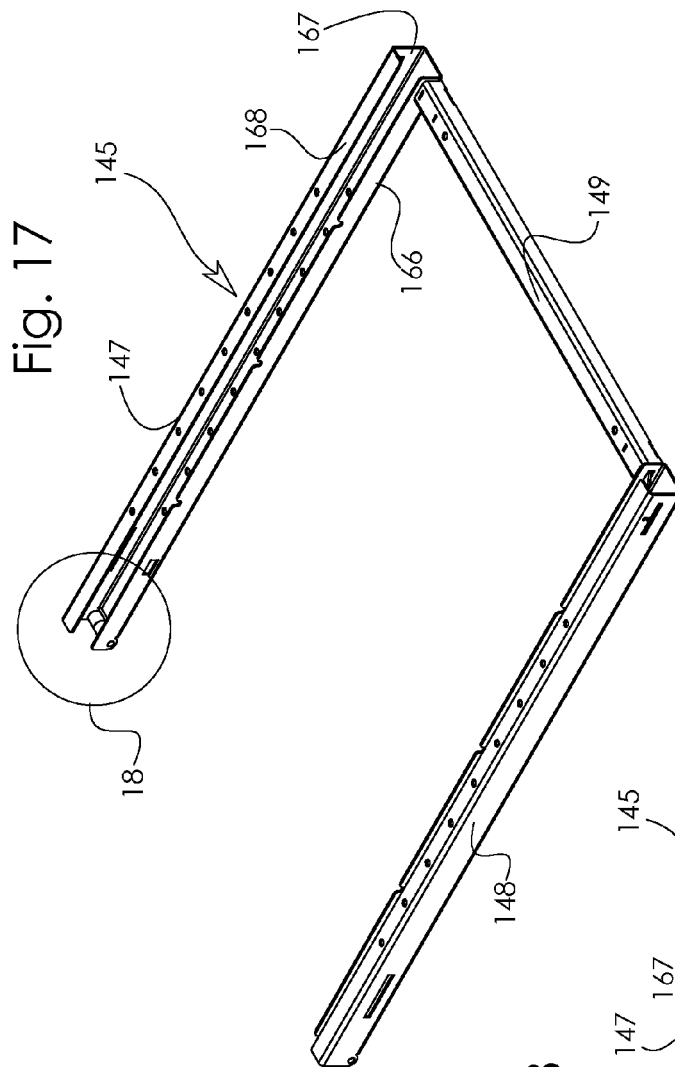
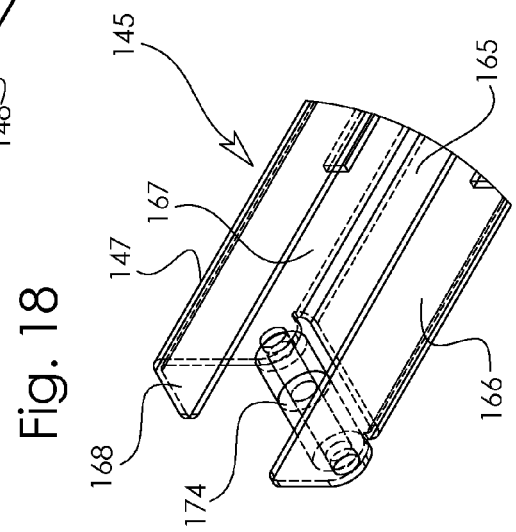

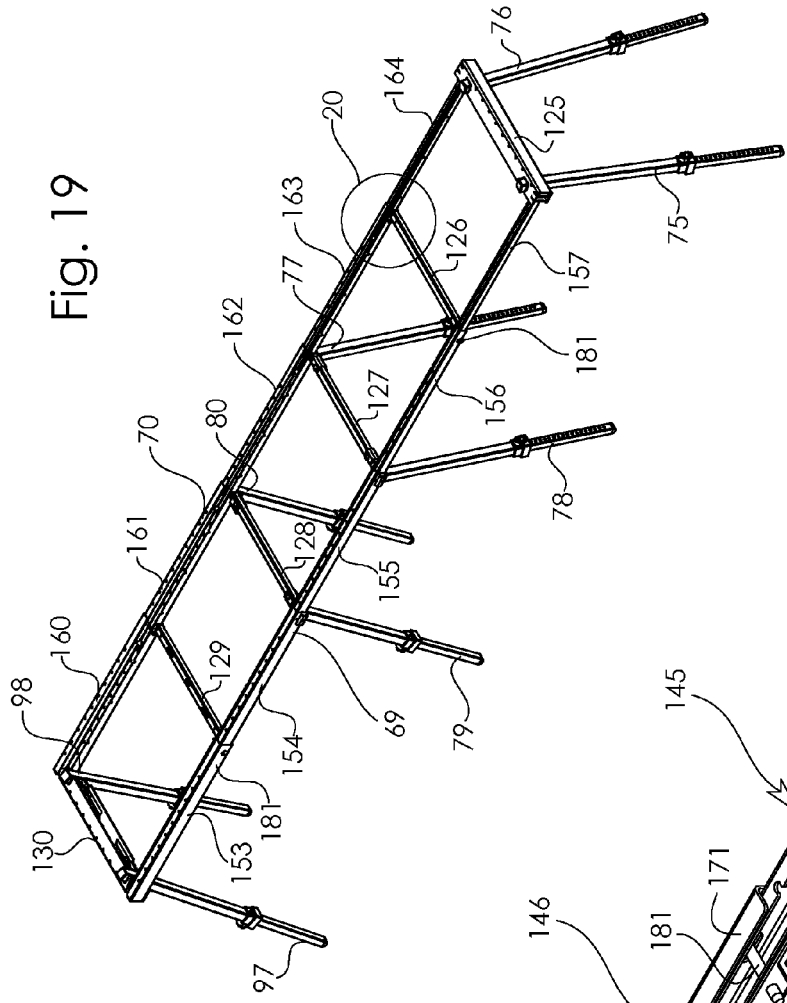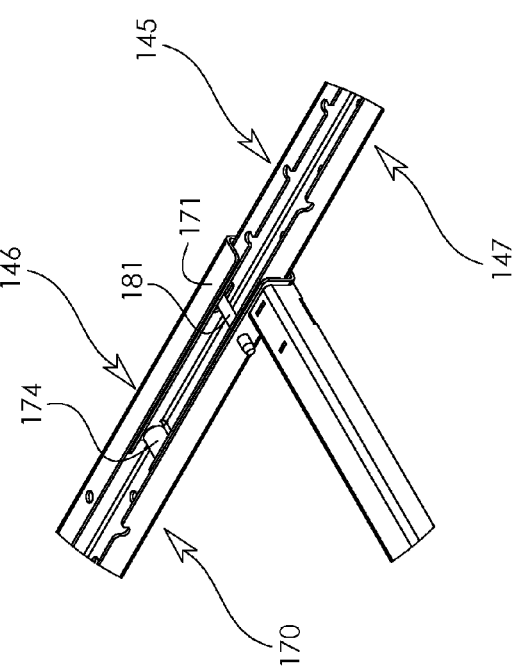

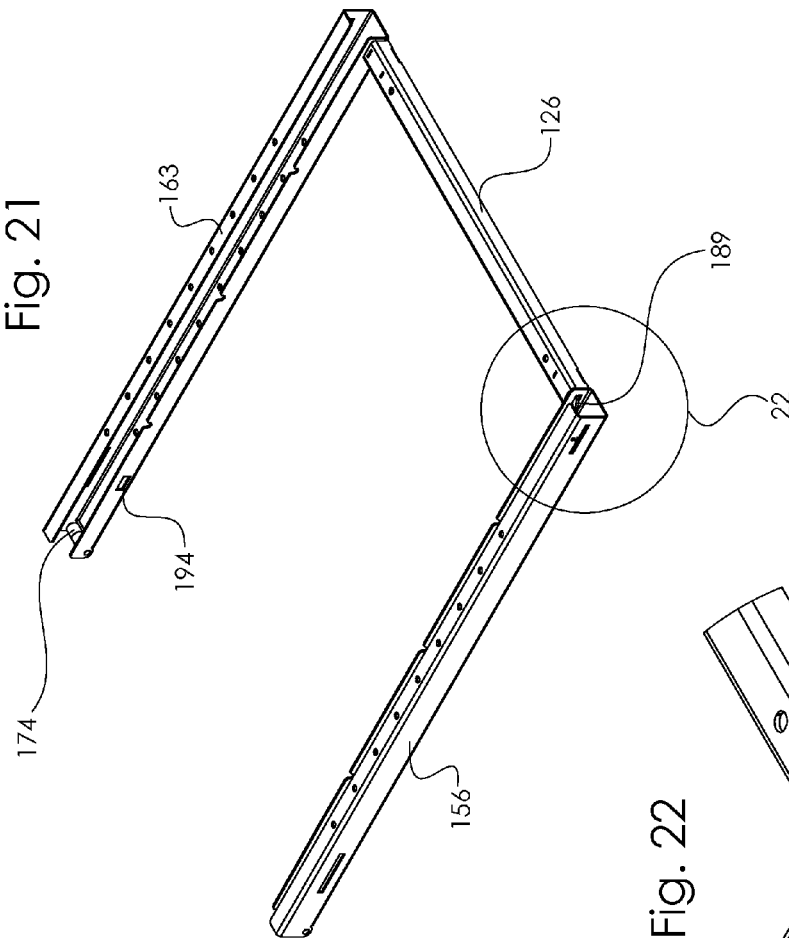
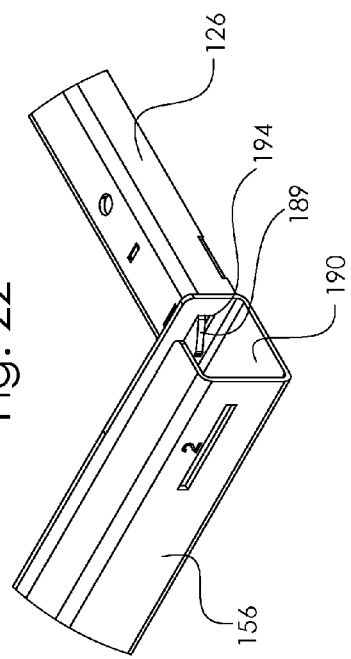

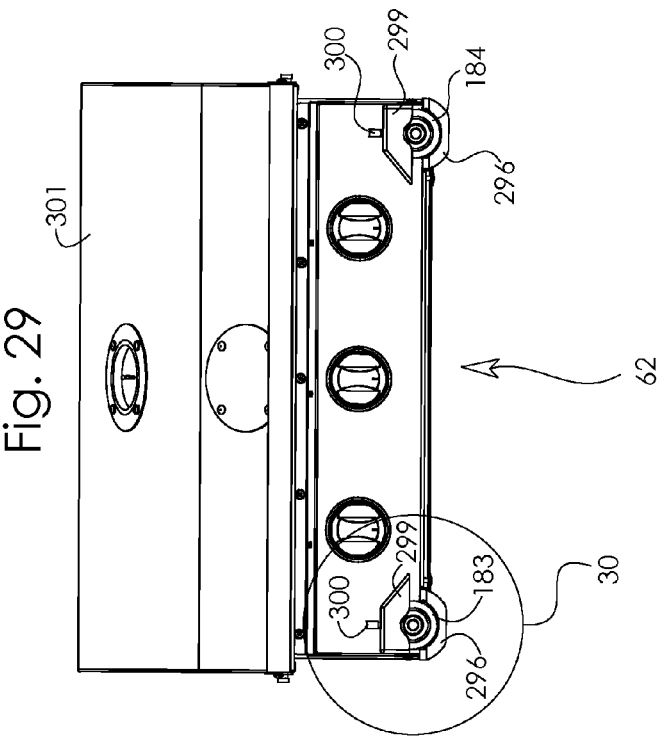
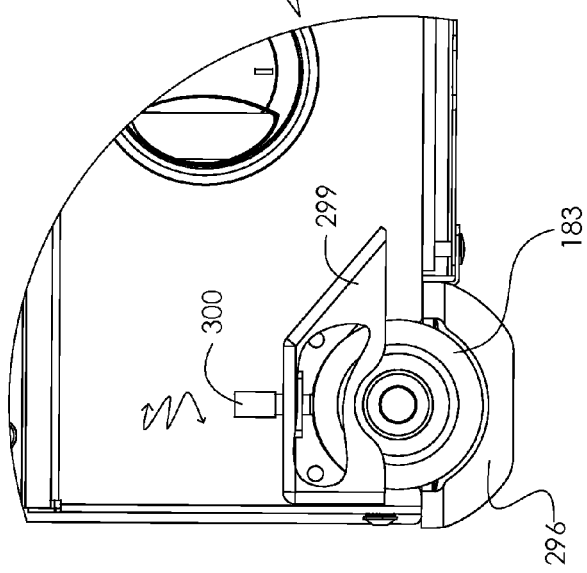

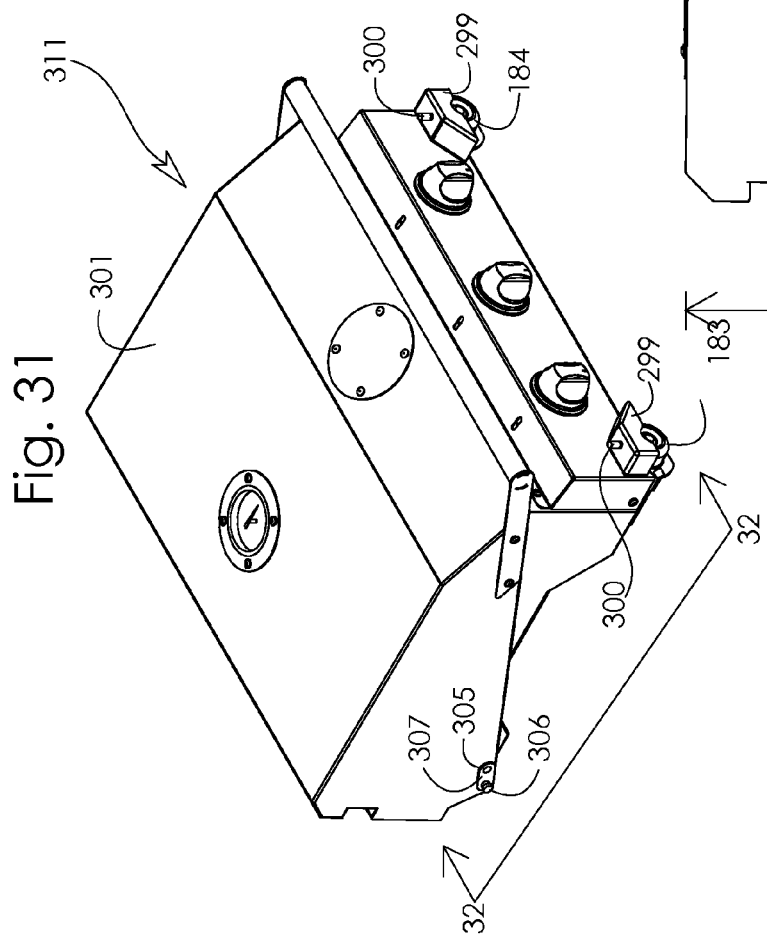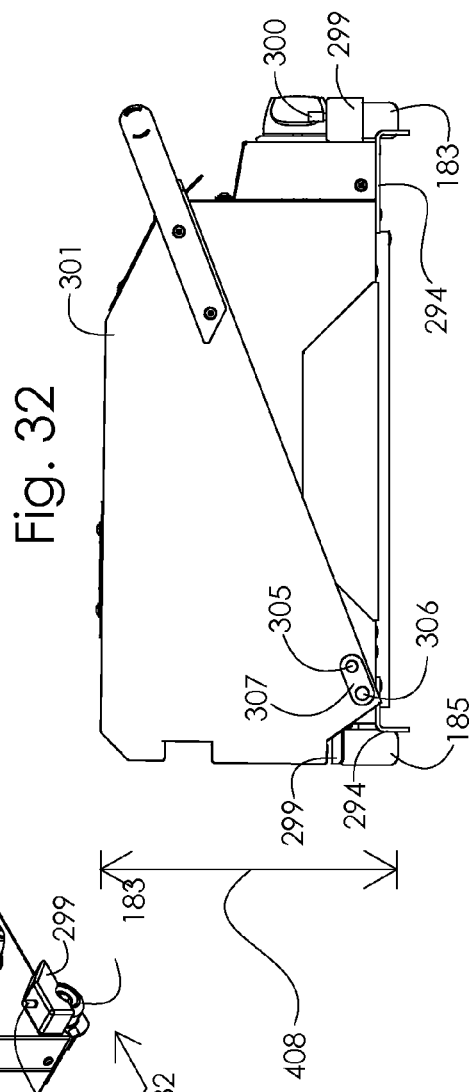

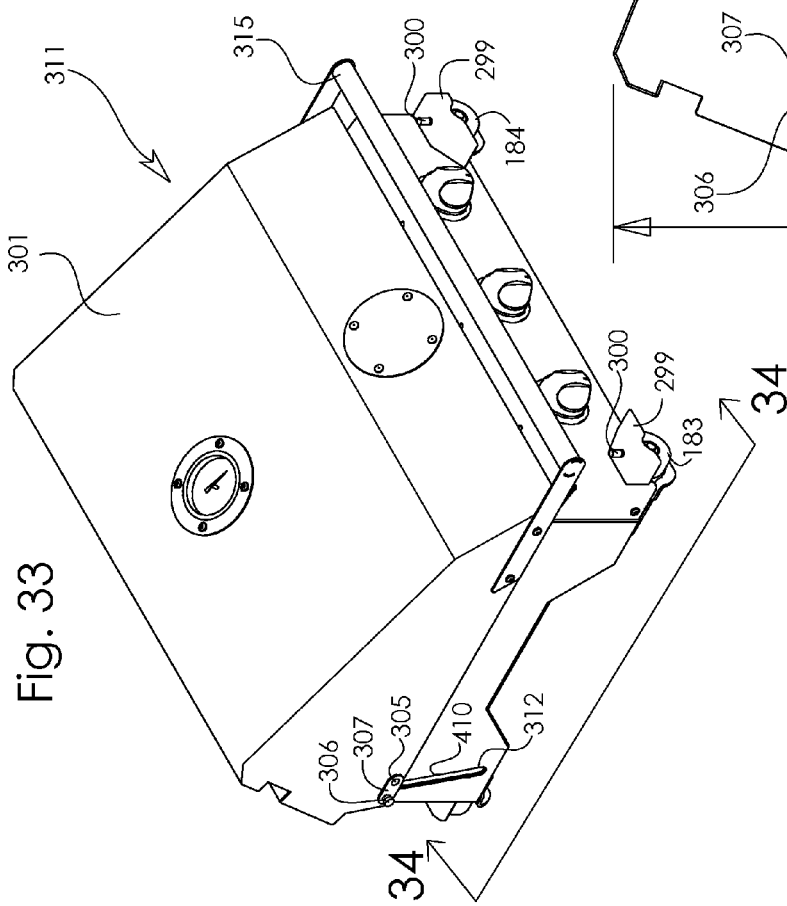
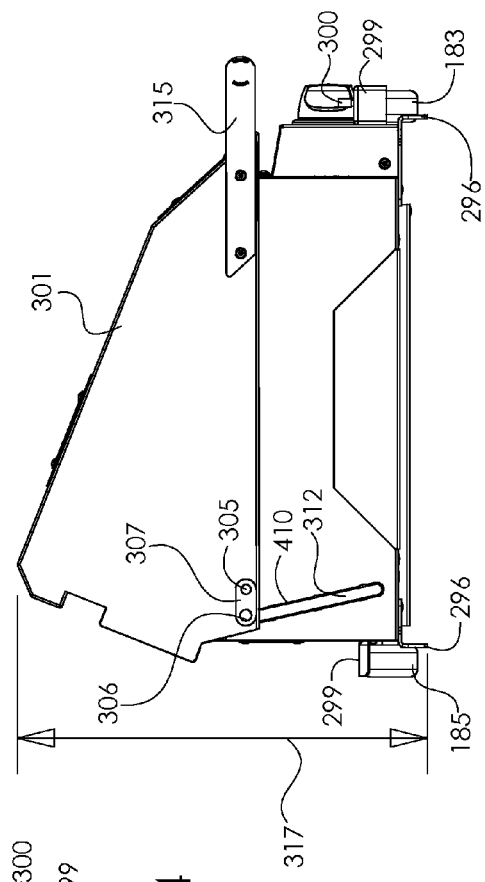
Fig. 33
Fig. 34

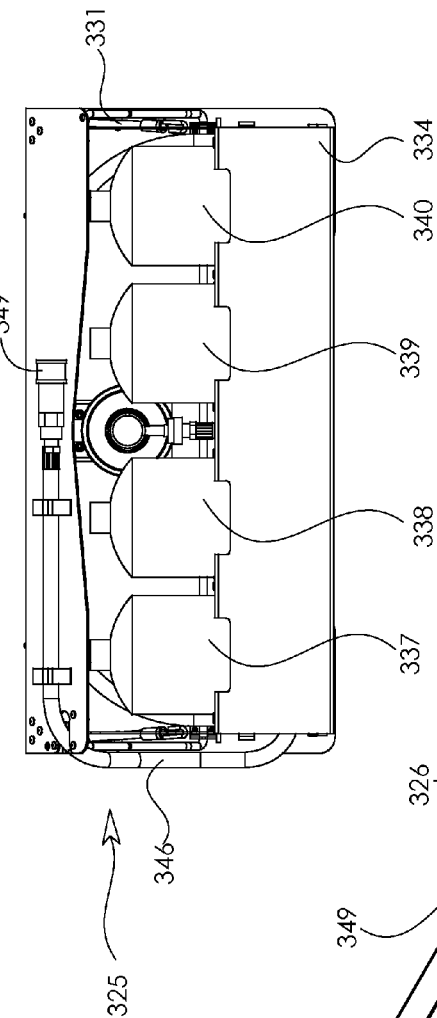
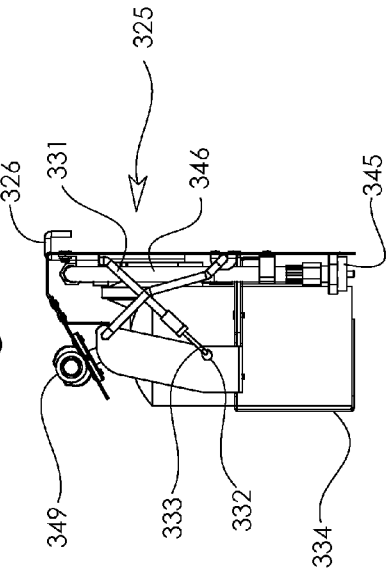
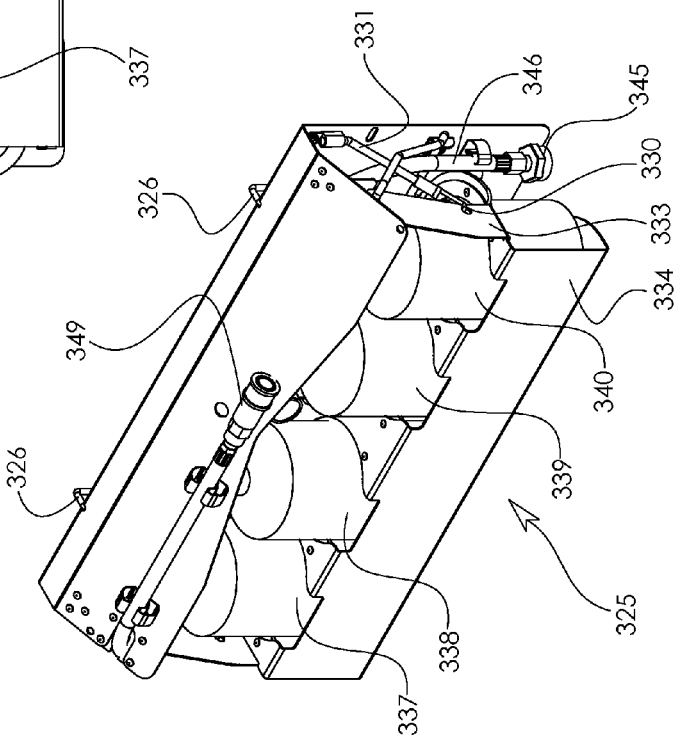

… (1)

PORTABLE COOKING SYSTEM AND METHODS OF USING THE SAME

RELATED APPLICATIONS

The present application claims the benefit of priority from U.S. Provisional Patent Application Ser. No. 61/743,816, filed Sep. 12, 2012 with the United States Patent and Trademark Office, the contents of which are hereby incorporated by reference in their entirety to the extent permitted by law.

FIELD OF THE INVENTION

The present application generally relates to cooking systems and methods of using the same and, more particularly, to portable cooking systems for outdoor use and methods of using the same.

BACKGROUND

Sporting events in this country have become much more than just simply an athletic contest between teams or individuals. Indeed, the social aspects or such occurrences constitute an integral, if not major, portion of the enjoyment of those in attendance. In fact, the sponsors of such engagements have felt compelled to institute rules and regulations limiting the ancillary events in order to make certain that the focus or those in attendance remains on the athletic event itself. Thus, the teams may not admit persons not holding tickets to the sporting event to sponsored parking lots regardless of whether ticket holders also ride in the cars themselves. Furthermore, the teams may also require that the partying surrounding the event absolutely stop during the game so as not to detract from the sponsored event itself.

Regardless of the exact nature of the sporting event attended, the ancillary partying, typically called tailgating, constitutes a separately enjoyable aspect of the overriding, advertised, and expected athletic contest. Naturally, during the pre- and post-game activities, the consumption of liquid and solid refreshments constitutes a centrally important aspect of the attendant conviviality. The storage, serving, preparation, and slowing of associated accoutrement for tailgating utilization presents challenges of their own. Recalling that vehicles used for transportation to a sporting event generally also serve the usual familial purposes, finding a way to use and subsequently store tailgating equipment represents an important goal to achieving a heightened level of enjoyment of this pastime activity.

Various types of equipment have found use in the past at tailgating events. Some of it simply represents home utensils or barbeques carried to a sports event and used there in much the same fashion as at home. This plan involves the gathering, combining, stowing, removing, setting up, using, cooling, cleaning, restowing, removing, and cleaning again, and replacing the various components in their usual locations, all hopefully without loss or damage. All of this, as can be imagined, can take inordinate amounts of time with the potential of leaving important items at home. Spending valuable time at the game to set up and take down the equipment, and replacing all of this stuff at home when finished. Clearly, having equipment intended specifically for tailgating will enhance the experience of the event surrounding the game, save time and effort, and help avoid the loss of and damage to the involved items.

One example of tailgating equipment appears in U.S. Pat. No. 6,814,383 to Silas Reed, Ill., et al. That patent shows a major tailgating piece of equipment with both a cooling side and a warming side. It may include, inter alia, warming drawers, a refrigerator drawer, possibly a stove, grill, crock pot, or rotisserie, a beer tan k, a beverage tank, dispensing spigots, and entertainment and water outdoor grill systems. To provide power for all of these components, the equipment may also include an electrical outdoor grill system to power all of the gadgets.

Reed et al. points out that their outdoor grill system readily submits to the placement within and removal from the back of an SUV. However, as shown, the unit barely fits within the lateral confines of that type of a vehicle. More significantly, removing it from the vehicle prior to use requires the holding of the entire weight of that equipment. Furthermore, to actually prepare it for actual use involves a person, while others are holding it up, crawling under the heavy equipment to deploy legs so that it can stand alone. Otherwise, its entire weight sits cantilevered out the back of the vehicle.

Various companies provide a piece of equipment that attaches to a trailer hitch of an SUV, for example. When not in use, the equipment sits on the outside of and adjacent to the vehicle. To make it available for party time, the user swings the unit out in an arc away from the vehicle. At all times, it remains connected to the hitch. And, that means that the unit sits outside of the vehicle, exposed to the elements and any dirt that might fly in that direction. It also provides a tempting target for thieves or vandals. Companies supplying this type of device to the public include Party King Grills, LLC., Freedom Grill Inc., and the Margaritaville grills. Another type of equipment appears in U.S. Pat. No. 7,338,104 which shows an apparatus that attaches to and rolls behind a vehicle as a trailer. Not only does it remain outside at all times, an impropitious disconnect of the trailer could cause the entire loss if the apparatus.

Other efforts to make vehicles more useful have involved attaching ramps and other such devices to the beds of pickup trucks to facilitate the on- and off-loading of heavy cargoes. They can also convert to tables. These appear in the U.S. Pat. No. 5,533,771 to S. Taylor et al. and U.S. Pat. No. 7,338,104 to P. Bejin. While tailgating might appear to possibly utilize these devices, no disclosure or teaching suggests this. Accordingly, these devices offer no genuine assistance to good times achieved through pregame parties. Accordingly, the search continues for facilely used and readily deployed and securely stowed equipment for pre- and post-game partying.

SUMMARY

In one aspect, an outdoor food handling outdoor grill system for outdoor partying at a remote location will typically have some form of a food-treating device. A holder held in contact with a vehicle may then include an attaching device which releasably couples to the food-treating device. This holder, when coupled to the food-treating device, retains the food-treating device at any one of plurality of fixed locations relative to the vehicle. In at least one of the locations, the food-treating device is actually retained within the vehicle for its protection and ease of transportation. In a second of the fixed positions, the food-treating device is retained at a location remote from the vehicle typically for its actual use in preparing food. Thus, the food-treating device can sit inside the vehicle for transportation and its protection. In the second, it sits outside the vehicle for use at a party.

A retaining device then releasably couples to both the food-treating device and the holder. The retaining device extends between the first and second positions at which the food-treating device may locate. The retaining device restricts the food-treating device, when traveling between its first and second positions, to moving along a predetermined path.

This arrangement has several benefits. When the food-treating device moves, its path is known in advance. In fact, typically the path can undergo some adjustment to place the food-treating device at the desired location. Further, the operators (e.g., cooks, users, etc.) can decide in advance where they wish to ply their trade (or avocation). And, the folks moving the food-treating device can cooperate since they can see where it now has to go.

As a separate aspect of the food-handling outdoor grill system, the holder retains the food-treating device in contact with the vehicle when in its first location. The second location lies at a position remote from the vehicle. The retainer then restricts the food-treating device, when moving between the first and second locations, to traveling along a substantially straight line.

Further, and separate from the above, the holder can retain the food-treating device at any one of a plurality of at least first and second locations relative to the vehicle. In a first of these locations, the holder retains the food-treating device nearer to the vehicle than in a second of the possible positions. The food-treating device, when retained in the second position, lies further away from the vehicle and at a location remote from the vehicle than when in the first position.

The outdoor grill system, in this configuration, will also have a guide-rail set having at least one guide rail connecting the first and second locations. The further component of a retainer couples to both the food-treating device and the guide-rail set. The retainer releasably couples to both the food-treating device and the guide-rail set. It serves to restrict the food-treating device to moving along the guide-rail set when traveling between its first and second positions.

Preparing a food-treating device located in a vehicle for use at a separate location remote from that vehicle also displays very unusual and creative features. Thus, the method may involve first establishing a definitive path from the location of the food-treating device in the vehicle to the separate location. Subsequently, the food-treating device moves along the definitive path from the vehicle to the separate location.

Alternately, the method may involve preparing a food-treating device at a first location in contact with a vehicle for use at a separate, second location remote from that vehicle. In this situation, the method includes establishing a definitive, substantially straight, linear path from the first location of the food-treating device in contact with the vehicle to the second, separate location; and then moving the food-treating device between the first and second locations along the substantially straight, linear predetermined path.

A further method for preparing a food-treating device retained near a vehicle for use at a second, separate location includes retaining the food-treating device at any one of plurality of at least first and second fixed locations relative to the vehicle. In a first of these locations, the food-treating device is retained near the vehicle, while in a second of the positions, the food-treating device is retained further away from the vehicle than in the first position. A guide-rail set composed of at least one guide rail is extended between the first and second locations. After extending the guide-rail set between the first and second locations, the food-treating device moves along the guide-rail set between the first position and the second position.

In one aspect, an outdoor food handling outdoor grill system is provided and includes a food-treating device, a holder held in contact with a vehicle, the holder including an attaching device releasably coupled to the food-treating device and, when coupled to the food-treating device, retaining the food-treating device at any one of a plurality of fixed locations relative to the vehicle, in a first of the locations the food-treating device is retained within the vehicle and in a second of the positions, the food-treating device is retained at a location remote from the vehicle, and a retainer, releasably coupled to both the food-treating device and the holder and extending between the first and second positions and restricting the food-treating device, when moving between the first and second positions, to moving along a predetermined path.

In one aspect, the food-treating device includes a food-heating element.

In one aspect, the food-treating device includes a grill.

In one aspect, the grill includes an interior and a cover having first and second configurations and, when in the second configurations, providing greater room on the interior of the grill than when in the first configuration.

In one aspect, the grill, with the cover in the second configuration, comprises a food warmer.

In one aspect, the system further includes a support device coupled to the retainer near the second position and supporting the retainer and the food-treating device, when in the second position, at a generally fixed vertical position.

In one aspect, the retainer comprises a rail set of at least two rails, the rails extending between the first and second positions and coupled to the holder and the support device comprises a leg set comprising at least one leg, the leg set capable of supporting the food-treating device above a substantially horizontal surface, and a connector couplable to both the leg set and the rails, the connector, when coupled to the leg set and the rails, holding the rails in proximity to the second position at a predetermined elevation above the substantially horizontal surface.

In one aspect, the rails of the rail set have the ability of holding the weight of the food-treating device at any location between the first and second positions without substantial distortion of the rails.

In one aspect, the system further includes a guide coupled to the food-treating device and the rails, the guide retaining the device on the rails as the device moves between the first and second positions.

In one aspect, the food-treating device includes a braking device for selectively preventing the food-treating device from movement on the rails.

In one aspect, the system further includes wheels coupled to the food-treating device and permitting the food-treating device to roll along the rails.

In one aspect, the food-treating device includes a braking device for selectively preventing the food-treating device from movement on the rails.

In one aspect, the holder is held in contact with the vehicle by the weight of the food-treating device and the holder.

In one aspect, when the food-treating device is retained in the first of the locations, the food-treating device is at least partially laterally enclosed by the vehicle.

In one aspect, the retainer comprises a rail set of at least two rails, the rails extending between the first and second positions and coupled to the holder and the support device comprises a leg set comprising at least one leg, the leg set capable of supporting the food-treating device above a substantially horizontal surface; and a connector couplable to both the leg set and the rails, the connector, when coupled to the leg set and the rails, holding the rails in proximity to the second position at a predetermined elevation above the substantially horizontal surface.

In one aspect, when the food-treating device is retained in the first of the locations, the vehicle substantially fully encloses the horizontal perimeter of the food-treating device.

In one aspect, the rails of the set have the ability of holding the weight of the food-treating device at any location between the first and second positions without substantial distortion of the rails.

In one aspect, the system further includes a guide coupled to the food-treating device and the rails, the guide retaining the device on the rails as the device moves between the first and second positions.

In one aspect, the food-treating device includes a braking device for selectively preventing the food-treating device from movement on the rails.

In one aspect, each of the rails includes a plurality of telescoping sections.

In one aspect, the holder includes a space for holding the rails of the set when not in use supporting the food-treating device.

In one aspect, the leg set is a first leg set and further including a second leg set the second leg set including at least two legs and being couplable to the rails of the rail set at a distance from the second position, the first and second leg sets, when coupled to the rail set, being capable of holding the food-treating device at a height above a generally horizontal surface upon which the legs sit.

In one aspect, each of the legs of the leg sets has an adjustable length.

In one aspect, when the food-treating device is retained in the first of the locations, the vehicle substantially fully encloses the horizontal perimeter of the food-treating device.

In one aspect, the system further includes wheels rotatably coupled to the holder, the wheels permitting the holder to be rolled on a substantially horizontal surface.

In one aspect, when the food-treating device is retained in the first of the locations, the food-treating device is substantially fully enclosed by the vehicle.

In one aspect, the holder includes a storage area that will retain the attaching device.

In one aspect, the storage area will retain the food-treating device in addition to the attaching device.

In one aspect, the holder includes wheels coupled thereto that will allow the holder to be rolled on a surface.

In one aspect, the wheels permit the food-treating device to roll along the rails.

In one aspect, the food-treating device includes a braking device for selectively preventing the food-treating device from moving on the rails.

In one aspect, the system further includes a plurality of substantially flat surfaces and connecting devices holding the surfaces to the rails.

In one aspect, the connecting devices are first connecting devices and further including a storage unit and at least one second connecting device holding the storage unit to the rails.

In one aspect, the storage unit includes a cooler.

In one aspect, the holder further comprises at least one storage area holding the surfaces while the holder is held in contact with the vehicle.

In one aspect, the storage area is a first storage area and further including a second storage area holding the cooler while the holder is held in contact with the vehicle.

In one aspect, the holder further comprises a storage area holding the surfaces while the holder is rolled on a surface.

In one aspect, the holder further comprises a handle coupled thereto which, when held onto by a person, will allow that person to roll the holder on a surface.

In one aspect, the food-treating device includes a food-heating element.

In one aspect, the food-treating device includes a grill.

In one aspect, the grill includes an interior and a cover having first and second configurations and, when in the second configurations, providing greater room on the interior of the grill than when in the first configuration.

In one aspect, the grill, with the cover in the second configuration, comprises a food warmer.

In one aspect, the system further includes a cart capable of holding the holder with the food-treating device and a ramp coupled to the cart having guide rails along which the holder may travel from the vehicle to the cart.

In one aspect, the ramp includes a guide that directs the motion of the holder along a predetermined line when traveling from the vehicle to the cart.

In one aspect, the system further includes a cart capable of holding the holder with the food-treating device and a ramp coupled to the cart and having guide rails along which the holder may travel from the vehicle to the cart.

In one aspect, the ramp includes a guide that directs the motion of the holder along a predetermined line when traveling from the vehicle to the cart.

In one aspect of the disclosure, an outdoor food handling outdoor grill system is provided and includes a food-treating device, a holder held in contact with a vehicle, the holder including an attaching device releasably coupled to the food-treating device and, when coupled to the food-treating device, retaining the food-treating device at any one of a plurality of fixed locations relative to the vehicle, in a first of the locations the food-treating device is retained in contact with the vehicle and in a second of the locations, the food-treating device is retained outside of the vehicle and at the second location remote from the vehicle, and a retainer, releasably coupled to both the food-treating device and the holder the retainer restricting the food-treating device, when moving between the first and second positions, to moving along a substantially straight, linear, predetermined path.

In one aspect, the food-treating device includes a food-heating element.

In one aspect, the food-treating device includes a grill.

In one aspect, the grill includes an interior and a cover having first and second configurations and, when in the second configurations, providing greater room on the interior of the grill than when in the first configuration.

In one aspect, the grill, with the cover in the second configuration, comprises a food warmer.

In one aspect, the system further includes a support device coupled to the retainer near the second position and supporting the retainer and the food-treating device, when in the second position, at a generally fixed vertical position.

In one aspect, the retainer comprises a rail set of at least two rails, the rails extending between the first and second positions and coupled to the holder and the support device comprises a leg set comprising at least one leg, the leg set capable of supporting the food-treating device above a substantially horizontal surface, and a connector couplable to both the leg set and the rails, the connector, when coupled to the leg set and the rails, holding the rails in proximity to the second position at a predetermined elevation above the substantially horizontal surface.

In one aspect, the rails of the set have the ability of holding the weight of the food-treating device at any location between the first and second positions without substantial distortion of the rails.

In one aspect, the system further includes a guide coupled to the food-treating device and the rails, the guide retaining the device on the rails as the device moves between the first and second positions.

In one aspect, the food-treating device includes a braking device for selectively preventing the food-treating device from movement on the rails.

In one aspect, the system further includes wheels coupled to the food-treating device, the wheels permitting the food-treating device to roll along the rails.

In one aspect, the food-treating device includes a braking device for selectively preventing the food-treating device from movement on the rails.

In one aspect, the holder is held in contact with the vehicle by the weight of the food-treating device and the holder.

In one aspect, when the food-treating device is retained in the first of the locations, the food-treating device is at least partially laterally enclosed by the vehicle.

In one aspect, the retainer comprises a set of at least two rails, the rails extending between the first and second positions and coupled to the holder, a leg set of legs comprising at least one leg, the leg set capable of supporting the food-treating device above a substantially horizontal surface, and a connector couplable to both the set leg set and the rails, the connector, when coupled to the leg set and the rails, holding the rails at the second position at a predetermined elevation above the substantially horizontal surface.

In one aspect, the rails of the set have the ability of holding the weight of the food-treating device at any location between the first and second positions without substantial distortion of the rails.

In one aspect, the system further includes a guide coupled to the food-treating device and the rails, the guide retaining the device on the rails as the device moves between the first and second positions.

In one aspect, the food-treating device includes a braking device for selectively preventing the food-treating device from movement on the rails.

In one aspect, each of the rails includes a plurality of telescoping sections.

In one aspect, the holder includes a space for holding the rails of the set when not in use supporting the food-treating device.

In one aspect, the leg set is a first leg set and further including a second leg set the second leg set including at least two legs and being couplable to the rails of the rail set at a distance from the second position, the first and second leg sets, when coupled to the rail set, being capable of holding the food-treating device at a height above a generally horizontal surface upon which the legs sit.

In one aspect, each of the legs of the leg sets has an adjustable length.

In one aspect, the system further includes wheels rotatably coupled to the holder, the wheels permitting the holder to be rolled on a substantially horizontal surface.

In one aspect, when the food-treating device is retained in the first of the locations, the food-treating device is substantially fully enclosed by the vehicle.

In one aspect, the holder includes a storage area that will retain the attaching device.

In one aspect, the storage area will retain the food-treating device in addition to the attaching device.

In one aspect, the holder includes wheels coupled thereto that will allow the holder to be rolled on a surface.

In one aspect, the system further includes wheels coupled to the food-treating device, the wheels permitting the food-treating device to roll along the rails.

In one aspect, the food-treating device includes a braking device for selectively preventing the food-treating device from moving on the rails.

In one aspect, the system further includes a plurality of substantially flat surfaces and connecting devices holding the surfaces to the rails.

In one aspect, the connecting devices are first connecting device and further including a storage unit and at least one second connecting device holding the food-holding device to the rails.

In one aspect, the storage unit includes a cooler.

In one aspect, the holder further comprises at least one storage area holding the surfaces while the holder is held in contact with the vehicle.

In one aspect, the storage area is a first storage area and further including a second storage area holding the cooler while the holder is held in contact with the vehicle.

In one aspect, the holder further comprises a storage area holding the surfaces while the holder is rolled on a surface.

In one aspect, the holder further comprises a handle coupled thereto which, when held onto by a person, will allow that person to roll the holder on a surface.

In one aspect, the food-treating device includes a food-heating element.

In one aspect, the food-treating device includes a grill.

In one aspect, the grill includes an interior and a cover having first and second configurations and, when in the second configurations, providing greater room on the interior of the grill than when in the first configuration.

In one aspect, the grill, with the cover in the second configuration, comprises a food warmer.

In one aspect, the system further includes a cart capable of holding the holder with the food-treating device and a ramp coupled to the cart having guide rails along which the holder may travel from the vehicle to the cart.

In one aspect, the ramp includes a guide that directs the motion of the holder along a predetermined line when traveling from the vehicle to the cart.

In one aspect, the system further includes a cart capable of holding the holder with the food-treating device and a ramp coupled to the cart and having guide rails along which the holder may travel from the vehicle to the cart.

In one aspect, the ramp includes a guide that directs the motion of the holder along a predetermined line when traveling from the vehicle to the cart.

In one aspect of the present disclosure, an outdoor food handling outdoor grill system is provided and includes a food-treating device, a holder held in contact with a vehicle, the holder including an attaching device releasably coupled to the food-treating device and, when coupled to the food-treating device, retaining the food-treating device at any one of plurality of at least first and second fixed locations relative to the vehicle, in a first of the locations the food-treating device is retained near the vehicle and in a second of the positions, the food-treating device is retained further away from the vehicle than in the first position and at a location remote from the vehicle, a guide-rail set comprising at least one guide rail connecting the first and second locations, and a retainer, releasably coupled to both the food-treating device and the guide-rail set, the retainer restricting the food-treating device, when moving between the first and second positions, to moving along the guide-rail set.

In one aspect, the guide rail set comprises at least two rails.

In one aspect, the system further includes a support device coupled to the rails near the second position and supporting the rails and the food-treating device, when in the second position, at a generally fixed vertical position.

In one aspect, the food-treating device includes a food-heating element.

In one aspect, the food-treating device includes a grill.

In one aspect, the grill includes an interior and a cover having first and second configurations and, when in the second configurations, providing greater room on the interior of the grill than when in the first configuration.

In one aspect, the grill, with the cover in the second configuration, comprises a food warmer.

In one aspect, the system further includes a support device coupled to the guide-rail set near the second position and supporting the guide-rail set and the food-treating device, when in the second position, at a generally fixed vertical position.

In one aspect, the guide-rail set comprises at least two rails, the rails extending between the first and second positions and coupled to the holder and the support device comprises a leg set comprising at least one leg, the leg set capable of supporting the food-treating device above a substantially horizontal surface and a connector couplable to both the leg set and the rails, the connector, when coupled to the leg set and the rails, and the leg set, holding the rails in proximity to the second position at a predetermined elevation above the substantially horizontal surface.

In one aspect, the rails of the guide-rail set have the ability of holding the weight of the food-treating device at any location between the first and second positions without substantial distortion of the rails.

In one aspect, the system further includes a guide coupled to the food-treating device and the rails, the guide retaining the device on the rails as the device moves between the first and second positions.

In one aspect, the food-treating device includes a braking device for selectively preventing the food-treating device from movement on the rails.

In one aspect, the system further includes wheels coupled to the food-treating device, the wheels permitting the food-treating device to roll along the rails.

In one aspect, the food-treating device includes a braking device for selectively preventing the food-treating device from movement on the rails.

In one aspect, the holder is held in contact with the vehicle by the weight of the food-treating device and the holder.

In one aspect, when the food-treating device is retained in the first of the locations, the food-treating device is at least partially laterally enclosed by the vehicle.

In one aspect, the guide-rail set comprises at least two rails, the rails extending between the first and second positions and coupled to the holder and the support device comprises a leg set comprising at least one leg, the leg set capable of supporting the food-treating device above a substantially horizontal surface, and a connector couplable to both the leg set and the rails, the connector, when coupled to the leg set and the rails, and the leg set, holding the rails in proximity to the second position at a predetermined elevation above the substantially horizontal surface.

In one aspect, the rails of the set have the ability of holding the weight of the food-treating device at any location between the first and second positions without substantial distortion of the rails.

In one aspect, the system further includes a guide coupled to the food-treating device and the rails, the guide retaining the device on the rails as the device moves between the first and second positions.

In one aspect, the food-treating device includes a braking device for selectively preventing the food-treating device from movement on the rails.

In one aspect, each of the rails includes a plurality of telescoping sections.

In one aspect, the holder includes a space for holding the rails of the set when not in use supporting the food-treating device.

In one aspect, the leg set is a first leg set and further including a second leg set the second leg set including at least two legs and being couplable to the rails of the rail set at a distance from the second position, the first and second leg sets, when coupled to the rail set, being capable of holding the food-treating device at a height above a generally horizontal surface upon which the legs sit.

In one aspect, each of the legs of the leg sets has an adjustable length.

In one aspect, when the food-treating device is retained in the first of the locations, the vehicle substantially fully encloses the horizontal perimeter of the food-treating device.

In one aspect, the system further includes wheels rotatably coupled to the holder, the wheels permitting the holder to be rolled on a substantially horizontal surface.

In one aspect, when the food-treating device is retained in the first of the locations, the food-treating device is substantially fully enclosed by the vehicle.

In one aspect, the holder includes a storage area that will retain the attaching device.

In one aspect, the storage area will retain the food-treating device in addition to the attaching device.

In one aspect, the holder includes wheels coupled thereto that will allow the holder to be rolled on a surface.

In one aspect, the system further includes wheels coupled to the food-treating device, the wheels permitting the food-treating device to roll along the rails.

In one aspect, the food-treating device includes a braking device for selectively preventing the food-treating device from moving on the rails.

In one aspect, the system further includes a plurality of substantially flat surfaces and connecting devices holding the surfaces to the rails.

In one aspect, the connecting devices are first connecting device and further including a storage unit and at least one second connecting device holding the storage unit to the rails.

In one aspect, the storage unit includes a cooler.

In one aspect, the holder further comprises at least one storage area holding the surfaces while the holder is held in contact with the vehicle.

In one aspect, the storage area is a first storage area and further including a second storage area holding the cooler while the holder is held in contact with the vehicle.

In one aspect, the holder further comprises a storage area holding the surfaces while the holder is rolled on a surface.

In one aspect, the holder further comprises a handle coupled thereto which, when held onto by a person, will allow that person to roll the holder on a surface.

In one aspect, the food-treating device includes a food-heating element.

In one aspect, the food-treating device includes a grill.

In one aspect, the grill includes an interior and a cover having first and second configurations and, when in the second configuration, providing greater room on the interior of the grill than when in the first configuration.

In one aspect, the grill, with the cover in the second configuration, comprises a food warmer.

In one aspect, the system further includes a cart capable of holding the holder with the food-treating device and a ramp coupled to the cart having guide rails along which the holder may travel from the vehicle to the cart.

In one aspect, the ramp includes a guide that directs the motion of the holder along a predetermined line when traveling from the vehicle to the cart.

In one aspect, the system further includes a cart capable of holding the holder with the food-treating device and a ramp coupled to the cart and having guide rails along which the holder may travel from the vehicle to the cart.

In one aspect, the ramp includes a guide that directs the motion of the holder along a predetermined line when traveling from the vehicle to the cart.

In one aspect of the present disclosure, a method for preparing a food-treating device located in a vehicle for use at a separate location remote from the vehicle is provided. The method includes establishing a definitive path from the location of the food-treating device in the vehicle to the separate location, and moving the food-treating device along the definitive path from the vehicle to the separate location.

In one aspect, the method further includes restraining with a retainer the food-treating device to the definitive path as the food-treating device moves to the separate location.

In one aspect, the food-treating device includes a food-heating element.

In one aspect, the food-treating device includes a grill.

In one aspect, the grill includes an interior and a cover having first and second configurations and further comprising moving the cover from the first to the second configurations to provide greater room on the interior of the trill than when the cover is in the first configuration.

In one aspect, the grill, with the cover in the second configuration, comprises a food warmer.

In one aspect, the method includes coupling a support device coupled to the retainer near the second position and supporting with the support device the retainer and the food-treating device, when in the second position, at a generally fixed vertical position.

In one aspect, the method further includes a holder attached to the vehicle and wherein the retainer comprises a rail set of at least two rails, the rails extending between the first and second positions and coupled to the holder, the support device comprises a leg set comprising at least one leg, the leg set capable of supporting the food-treating device above a substantially horizontal surface; and further comprising coupling the leg set and the rails together and holding the rails in proximity to the second position at a predetermined elevation above the substantially horizontal surface.

In one aspect, the method further includes holding the weight of the food-treating device at any location between the first and second positions without substantial distortion of the rails.

In one aspect, the method further includes retaining the device on the rails as the device moves between the first and second positions.

In one aspect, the method further includes selectively preventing the food-treating device from movement on the rails.

In one aspect, the method further includes rolling the food-treating device on wheels coupled to the food-treating device along the rails.

In one aspect, the method further includes selectively preventing the food-treating device from movement on the rails.

In one aspect, the holder is held in contact with the vehicle by the weight of the food-treating device and the holder.

In one aspect, when the food-treating device is retained in the first of the locations, the food-treating device is at least partially laterally enclosed by the vehicle.

In one aspect, the retainer comprises a rail set of at least two rails, the rails extending between the first and second positions and coupled to the holder, the support device comprises a leg set comprising at least one leg, the leg set capable of supporting the food-treating device above a substantially horizontal surface; and further comprising coupling the leg set and the rails together and holding the rails in proximity to the second position at a predetermined elevation above the substantially horizontal surface.

In one aspect, when the food-treating device is retained in the first of the locations, substantially fully enclosing the horizontal perimeter of the food-treating device with the vehicle.

In one aspect, the method further includes holding the weight of the food-treating device at any location between the first and second positions without substantial distortion of the rails.

In one aspect, the method further includes retaining the device on the rails as the device moves between the first and second positions.

In one aspect, the food-treating device includes a braking device for selectively preventing the food-treating device from movement on the rails and further including engaging the braking device to prevent movement of the food-treating device on the rails.

In one aspect, each of the rails include a plurality of telescoping sections and further including extending the rails from their telescoped arrangement to an extended arrangement prior to moving the food-treating device from the first to the second position.

In one aspect, the holder includes a space for holding the rails of the set when not in use supporting the food-treating device and further including telescoping the legs from their extended arrangement to their telescoped arrangement and placing the rails in the space.

In one aspect, the leg set is a first leg set and further including a second leg set including at least two legs and being couplable to the rails of the rail set and further including coupling the second rail set at a distance removed from the second position.

In one aspect, the method further includes adjusting the length of each of the legs of the leg sets.

In one aspect, when the food-treating device is retained in the first of the locations, the food-treating device is at least partially laterally enclosed by the vehicle.

In one aspect, the method further includes rolling the food-treating device on wheels coupled to the food-treating device along the rails.

In one aspect, when the food-treating device is retained in the first of the locations, the food-treating device is substantially fully enclosed by the vehicle.

In one aspect, the method further includes rolling the food-treating device on wheels coupled to the food-treating device along the rails.

In one aspect, the method further includes selectively preventing the food-treating device from moving on the rails.

In one aspect, the method further includes connecting a plurality of substantially flat surfaces to the rails.

In one aspect, the method further includes connecting a storage unit to the rails.

In one aspect, the storage unit includes a cooler.

In one aspect, the method further includes storing the surfaces in the holder while the holder is held in contact with the vehicle.

In one aspect, the method further includes storing the cooler while the holder is held in contact with the vehicle.

In one aspect, the method further includes storing the surfaces in the holder while the holder is rolled on a surface.

In one aspect, the holder includes a space that will retain the food-treating device and further including placing the food-treating device in the space.

In one aspect, the method further includes rolling the holder on wheels coupled to the holder on a surface.

In one aspect, the method further includes grasping a handle coupled to the holder and rolling the holder on a surface by moving the handle.

In one aspect, the food-treating device includes a food-heating element and further including heating food on the food-treating device.

In one aspect, the food-treating device includes a grill and further including grilling food on the food-treating device.

In one aspect, the grill includes an interior and a cover having first and second configurations and, when in the second configurations, providing greater room on the interior of the grill than when in the first configuration and further including moving the cover between the first and second configurations.

In one aspect, the grill, with the cover in the second configuration, comprises a food warmer and further including warming food in the food warmer.

In one aspect, the method further includes moving the holder on a ramp coupled to a cart capable of holding the holder with the food-treating device from the vehicle to the cart.

In one aspect, the method further includes directing the motion of the holder on the ramp along a predetermined line when traveling from the vehicle to the cart.

In one aspect, the method further includes moving the holder on a ramp coupled to a cart capable of holding the holder with the food-treating device from the vehicle to the cart.

In one aspect, the method further includes directing the motion of the holder on the ramp along a predetermined line when traveling from the vehicle to the cart.

In one aspect of the present disclosure, a method for preparing a food-treating device at a first location in contact with a vehicle for use at a separate, second location remote from the vehicle is provided. The method includes establishing a definitive, substantially straight, linear path from the first location of the food-treating device in contact with the vehicle to the second separate location, and B. moving the food-treating device between the first and second locations along the substantially straight, linear path.

In one aspect, the method further includes restraining with a retainer the food-treating device to the predetermined path as the food-treating device moves along the predetermined path.

In one aspect, the food-treating device includes a food-heating element.

In one aspect, the food-treating device includes a grill.

In one aspect, the grill includes an interior and a cover having first and second configurations and further comprising moving the cover from the first to the second configurations to provide greater room on the interior of the trill than when the cover is in the first configuration.

In one aspect, the grill, with the cover in the second configuration, comprises a food warmer.

In one aspect, the method further includes coupling a support device coupled to the retainer near the second position and supporting with the support device the retainer and the food-treating device, when in the second position, at a generally fixed vertical position.

In one aspect, the method further includes a holder attached to the vehicle and wherein the retainer comprises a rail set of at least two rails, the rails extending between the first and second positions and coupled to the holder, the support device comprises a leg set comprising at least one leg, the leg set capable of supporting the food-treating device above a substantially horizontal surface; and further comprising coupling the leg set and the rails together and holding the rails in proximity to the second position at a predetermined elevation above the substantially horizontal surface.

In one aspect, the method further includes holding the weight of the food-treating device at any location between the first and second positions without substantial distortion of the rails.

In one aspect, the method further includes retaining the device on the rails as the device moves between the first and second positions.

In one aspect, the method further includes selectively preventing the food-treating device from movement on the rails.

In one aspect, the method further includes rolling the food-treating device on wheels coupled to the food-treating device along the rails.

In one aspect, the method further includes selectively preventing the food-treating device from movement on the rails.

In one aspect, the holder is held in contact with the vehicle by the weight of the food-treating device and the holder.

In one aspect, when the food-treating device is retained in the first of the locations, the food-treating device is at least partially laterally enclosed by the vehicle.

In one aspect, the retainer comprises a rail set of at least two rails, the rails extending between the first and second positions and coupled to the holder, the support device comprises a leg set comprising at least one leg, the leg set capable of supporting the food-treating device above a substantially horizontal surface; and further comprising coupling the leg set and the rails together and holding the rails in proximity to the second position at a predetermined elevation above the substantially horizontal surface.

In one aspect, when the food-treating device is retained in the first of the locations, substantially fully enclosing the horizontal perimeter of the food-treating device with the vehicle.

In one aspect, the method further includes holding the weight of the food-treating device at any location between the first and second positions without substantial distortion of the rails.

In one aspect, the method further includes retaining the device on the rails as the device moves between the first and second positions.

In one aspect, the food-treating device includes a braking device for selectively preventing the food-treating device from movement on the rails and further includes engaging the braking device to prevent movement of the food-treating device on the rails.

In one aspect, each of the rails include a plurality of telescoping sections and further including extending the rails from their telescoped arrangement to an extended arrangement prior to moving the food-treating device from the first to the second position.

In one aspect, the holder includes a space for holding the rails of the set when not in use supporting the food-treating device and further including telescoping the legs from their extended arrangement to their telescoped arrangement and placing the rails in the space.

In one aspect, the leg set is a first leg set and further including a second leg set including at least two legs and being couplable to the rails of the rail set and further including coupling the second rail set at a distance removed from the second position.

In one aspect, the method further includes adjusting the length of each of the legs of the leg sets.

In one aspect, when the food-treating device is retained in the first of the locations, the food-treating device is at least partially laterally enclosed by the vehicle.

In one aspect, the method further includes rolling the food-treating device on wheels coupled to the food-treating device along the rails.

In one aspect, when the food-treating device is retained in the first of the locations, the food-treating device is substantially fully enclosed by the vehicle.

In one aspect, the method further includes rolling the food-treating device on wheels coupled to the food-treating device along the rails.

In one aspect, the method further includes selectively preventing the food-treating device from moving on the rails.

In one aspect, the method further includes connecting a plurality of substantially flat surfaces to the rails.

In one aspect, the method further includes connecting a storage unit to the rails.

In one aspect, the storage unit includes a cooler.

In one aspect, the method further includes storing the surfaces in the holder while the holder is held in contact with the vehicle.

In one aspect, the method further includes storing the cooler while the holder is held in contact with the vehicle.

In one aspect, the method further includes storing the surfaces in the holder while the holder is rolled on a surface.

In one aspect, the holder includes a space that will retain the food-treating device and further including placing the food-treating device in the space.

In one aspect, the method further includes rolling the holder on wheels coupled to the holder on a surface.

In one aspect, the method further includes grasping a handle coupled to the holder and rolling the holder on a surface by moving the handle.

In one aspect, the food-treating device includes a food-heating element and further including heating food on the food-treating device.

In one aspect, the food-treating device includes a grill and further including grilling food on the food-treating device.

In one aspect, the grill includes an interior and a cover having first and second configurations and, when in the second configurations, providing greater room on the interior of the grill than when in the first configuration and further including moving the cover between the first and second configurations.

In one aspect, the grill, with the cover in the second configuration, comprises a food warmer and further including warming food in the food warmer.

In one aspect, the method further includes moving the holder on a ramp coupled to a cart capable of holding the holder with the food-treating device from the vehicle to the cart.

In one aspect, the method further includes directing the motion of the holder on the ramp along a predetermined line when traveling from the vehicle to the cart.

In one aspect, the method further includes moving the holder on a ramp coupled to a cart capable of holding the holder with the food-treating device from the vehicle to the cart.

In one aspect, the method further includes directing the motion of the holder on the ramp along a predetermined line when traveling from the vehicle to the cart.

In one aspect of the present disclosure, a method for preparing a food-treating device retained near a vehicle for use at a second, separate location is provided. The method includes retaining the food-treating device at any one of plurality of at least first and second fixed locations relative to the vehicle, in a first of the locations the food-treating device is retained near the vehicle and in a second of the positions, the food-treating device is retained further away from the vehicle than in the first position, extending a guide-rail set comprising at least one guide rail between the first and second locations, after extending the guide-rail set between the first and second locations, moving the food-treating device along the guide-rail set between the first position and the second position.

In one aspect, the guide rail set comprises at least two rails.

In one aspect, the method further includes restraining with a retainer the food-treating device to the guide-rail set as the food-treating device moves along the guide-rail set.

In one aspect, the method further includes coupling a support device to the retainer near the second position and supporting the retainer and the food-treating device, when in the second position, at a generally fixed vertical position.

In one aspect, the step of supporting the retainer and the food-treating device at the generally fixed vertical position includes coupling legs to the guide-rail set at the second position prior to moving the device to the second position.

In one aspect, the food-treating device includes a food-heating element.

In one aspect, the food-treating device includes a grill.

In one aspect, the grill includes an interior and a cover having first and second configurations and further comprising moving the cover from the first to the second configurations to provide greater room on the interior of the trill than when the cover is in the first configuration.

In one aspect, the grill, with the cover in the second configuration, comprises a food warmer.

In one aspect, the method further includes coupling a support device coupled to the retainer near the second position and supporting with the support device the retainer and the food-treating device, when in the second position, at a generally fixed vertical position.

In one aspect, the method further includes a holder attached to the vehicle and wherein the support device comprises a leg set comprising at least one leg, the leg set capable of supporting the food-treating device above a substantially horizontal surface; and further comprising coupling the leg set and the rails together and holding the rails in proximity to the second position at a predetermined elevation above the substantially horizontal surface.

In one aspect, the method further includes holding the weight of the food-treating device at any location between the first and second positions without substantial distortion of the rails.

In one aspect, the method further includes retaining the device on the rails as the device moves between the first and second positions.

In one aspect, the method further includes selectively preventing the food-treating device from movement on the rails.

In one aspect, the method further includes rolling the food-treating device on wheels coupled to the food-treating device along the rails.

In one aspect, the method further includes selectively preventing the food-treating device from movement on the rails.

In one aspect, the holder is held in contact with the vehicle by the weight of the food-treating device and the holder.

In one aspect, when the food-treating device is retained in the first of the locations, the food-treating device is at least partially laterally enclosed by the vehicle.

In one aspect, the support device comprises a leg set comprising at least one leg, the leg set capable of supporting the food-treating device above a substantially horizontal surface; and further comprising coupling the leg set and the rails together and holding the rails in proximity to the second position at a predetermined elevation above the substantially horizontal surface.

In one aspect, when the food-treating device is retained in the first of the locations, substantially fully enclosing the horizontal perimeter of the food-treating device with the vehicle.

In one aspect, the method further includes holding the weight of the food-treating device at any location between the first and second positions without substantial distortion of the rails.

In one aspect, the method further includes retaining the device on the rails as the device moves between the first and second positions.

In one aspect, the food-treating device includes a braking device for selectively preventing the food-treating device from movement on the rails and further including engaging the braking device to prevent movement of the food-treating device on the rails.

In one aspect, each of the rails include a plurality of telescoping sections and further including extending the rails from their telescoped arrangement to an extended arrangement prior to moving the food-treating device from the first to the second position.

In one aspect, the holder includes a space for holding the rails of the set when not in use supporting the food-treating device and further including telescoping the legs from their extended arrangement to their telescoped arrangement and placing the rails in the space.

In one aspect, the leg set is a first leg set and further including a second leg set including at least two legs and being couplable to the rails of the rail set and further including coupling the second rail set at a distance removed from the second position.

In one aspect, the method further includes adjusting the length of each of the legs of the leg sets.

In one aspect, when the food-treating device is retained in the first of the locations, the food-treating device is at least partially laterally enclosed by the vehicle.

In one aspect, the method further includes rolling the food-treating device on wheels coupled to the food-treating device along the rails.

In one aspect, when the food-treating device is retained in the first of the locations, the food-treating device is substantially fully enclosed by the vehicle.

In one aspect, the method further includes rolling the food-treating device on wheels coupled to the food-treating device along the rails.

In one aspect, the method further includes selectively preventing the food-treating device from moving on the rails.

In one aspect, the method further includes connecting a plurality of substantially flat surfaces to the rails.

In one aspect, the method further includes connecting a storage unit to the rails.

In one aspect, the storage unit includes a cooler.

In one aspect, the method further includes storing the surfaces in the holder while the holder is held in contact with the vehicle.

In one aspect, the method further includes storing the cooler while the holder is held in contact with the vehicle.

In one aspect, the method further includes storing the surfaces in the holder while the holder is rolled on a surface.

In one aspect, the holder includes a space that will retain the food-treating device and further including placing the food-treating device in the space.

In one aspect, the method further includes rolling the holder on wheels coupled to the holder on a surface.

In one aspect, the method further includes grasping a handle coupled to the holder and rolling the holder on a surface by moving the handle.

In one aspect, the food-treating device includes a food-heating element and further including heating food on the food-treating device.

In one aspect, the food-treating device includes a grill and further including grilling food on the food-treating device.

In one aspect, the grill includes an interior and a cover having first and second configurations and, when in the second configurations, providing greater room on the interior of the grill than when in the first configuration and further including moving the cover between the first and second configurations.

In one aspect, the grill, with the cover in the second configuration, comprises a food warmer and further including warming food in the food warmer.

In one aspect, the method further includes moving the holder on a ramp coupled to a cart capable of holding the holder with the food-treating device from the vehicle to the cart.

In one aspect, the method further includes directing the motion of the holder on the ramp along a predetermined line when traveling from the vehicle to the cart.

In one aspect, the method further includes moving the holder on a ramp coupled to a cart capable of holding the holder with the food-treating device from the vehicle to the cart.

In one aspect, the method further includes directing the motion of the holder on the ramp along a predetermined line when traveling from the vehicle to the cart.

In one aspect of the present disclosure, a portable cooking system is provided and includes a guide member and a cooking device supported by the guide member. The cooking device engages and is movable along the guide member between a first cooking device position, in which the cooking device is at least partially positioned within a vehicle, and a second cooking device position, in which the cooking device is spaced-apart from and external of the vehicle.

In one aspect, the cooking device is a grill.

In one aspect, the guide member is moveable between a first guide member position, in which the guide member is at least partially positioned within the vehicle, and a second guide member position, in which the guide member extends from and externally of the vehicle. The guide member is in the second guide member position when the cooking device is in the second cooking device position.

In one aspect, the guide member is a first guide rail and the portable cooking system further includes a second guide rail spaced-part from the first guide rail. The cooking device is supported by the first guide rail and the second guide rail, and the cooking device engages and is movable along the first guide rail and the second guide rail between the first cooking device position and the second cooking device position.

In one aspect, the second guide rail is moveable with the first guide rail between the first guide member position and the second guide member position.

In one aspect, the guide member is comprised of a plurality of telescoping sections, and the plurality of telescoping sections are nested with the guide member in the first guide member position and extend from one another when the guide member is in the second guide member position.

In one aspect, the portable cooking system further includes a support leg selectively connected to the guide member. The support leg is connected to the guide member when the guide member is in the second guide member position and is disconnected from the guide member when the guide member is in the first guide member position.

In one aspect, the portable cooking system further includes a plurality of support legs selectively connected to the guide member. The plurality of support legs are connected to the guide member when the guide member is in the second guide member position and are disconnected from the guide member when the guide member is in the first guide member position.

In one aspect, the guide member is at least partially supported by the vehicle when the guide member is in both the first guide member position and the second guide member position.

In one aspect, the guide member is supported by the vehicle when the guide member is in the first guide member position and is not supported by the vehicle when the guide member is in the second guide member position.

In one aspect of the present disclosure, a portable cooking system is provided and includes a rack configured to be positioned in a vehicle, a guide member moveable between a first guide member position, in which the guide member is at least partially positioned within the rack and the vehicle, and a second guide member position, in which the guide member at least partially extends out from the rack and the vehicle, and a cooking device supported by the guide member and movable along the guide member between a first cooking device position, in which the cooking device is at least partially positioned within the rack and the vehicle, and a second cooking device position, in which the cooking device is spaced-apart from and external of the rack and the vehicle.

In one aspect, the portable cooking system further includes a cart configured to support the rack when the rack is outside of the vehicle.

In one aspect, the cart includes a plurality of telescoping legs and a plurality of wheels with one wheel for each of the telescoping legs. The plurality of telescoping legs are adjustable to adjust a height of the cart.

In one aspect, the cooking device includes at least one wheel engageable with the guide member to facilitate movement of the cooking device along the guide member between the first cooking device position and the second cooking device position.

In one aspect, the cooking device has a compact position, in which the cooking device has a first height, and an expanded position, in which the cooking device has a second height, wherein the first height is less than the second height.

In one aspect, the cooking device includes a firebox and a hood. The firebox defines a slot therein and the hood includes a rod at least partially positioned in and moveable within the slot. The rod moves within the slot as the cooking device moves between the compact position and the expanded position.

In one aspect of the present disclosure, a portable cooking system is provided and includes a rack configured to be positioned in a vehicle, a guide rail system including a plurality of telescoping portions moveable between a first guide rail system position, in which the plurality of telescoping portions are nested and at least partially positioned within the rack and the vehicle, and a second guide rail system position, in which the plurality of telescoping portions at least partially extend out from the rack and the vehicle, wherein the plurality of telescoping portions together provide a first guide rail and a second guide rail spaced-apart from and substantially parallel to one another, a plurality of support legs selectively connected to the guide rail system, wherein the plurality of support legs are connected to the guide rail system when the guide rail system is in the second guide rail system position and are disconnected from the guide rail system when the guide rail system is in the first guide rail system position, and a cooking device supported by the first guide rail and the second guide rail, wherein the cooking device includes a first wheel engageable with and moveable along the first guide rail and a second wheel engageable with and moveable along the second guide rail, wherein the first and second wheels respectively roll along the first and second guide rails to facilitate movement of the cooking device between a first cooking device position, in which the cooking device is at least partially positioned within the rack and the vehicle, and a second cooking device position, in which the cooking device is spaced-apart from and external of the rack and the vehicle.

In one aspect, the first and second guide rails restrict movement of the cooking device along a predetermined path between the first cooking device position and the second cooking device position.

In one aspect, the guide rail system is configured to support at least one of a flat platform, a storage unit, a trough and a fuel supply at any one of a plurality of positions on the guide rail system.

In one aspect, the guide rail system is configured to support all of the flat platform, the storage unit, the trough and the fuel supply. Each of the flat platform, the storage unit, the trough and the fuel supply may be supported in any one of a plurality of positions on the guide rail system.

The scope of the present disclosure is defined solely by the appended claims and is not affected by the statements within this summary.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure.

FIG. 5 is an isometric view of the cart shown in FIGS. 3 and 4, the cart may be used to store the portable cooking system when not in use.

FIG. 6 is a side elevational view of the storage cart of FIGS. 3-5 with a ramp of the cart partially elevated.

FIG. 7 is a side elevational view the storage cart with its ramp in a lowered position.

FIG. 8 is a side elevational view of the storage cart of FIGS. 4-7 in a raised configuration.

FIG. 9 is a left, front isometric view of the portable cooking system and includes a travel rack, this figure also shows the components of the system that would be placed in a vehicle.

FIG. 17 is an isometric view of a portion of a telescoping guide rail system.

FIG. 18 is an enlarged view of circled section 18 in FIG. 17 showing a roller on an end of each guide rail portion of the portable cooking system.

FIG. 19 is an isometric view of the guide rail system in a free standing configuration.

FIG. 20 is an enlarged view of circled section 20 of FIG. 19 showing a pin used as a strengthening mechanism at rail junctures lacking a leg.

FIG. 21 is an isometric view of a portion of a guide rail of the portable cooking system with a tab for inhibiting inadvertent separation of rail sections from each other.

FIG. 22 is an enlarged view of circled section 22 of FIG. 21 showing a spring loaded tab used on an end of a portion of a guide rail to stop adjoining rail sections from pulling apart when the guide rail is extended prior to use.

FIG. 29 is a front elevational view of the grill of the portable cooking system.

FIG. 30 is an enlarged view of circle section 30 of FIG. 29 showing a finger screw used to lock wheels of the grill.

FIG. 31 is a left, front, top isometric view of the grill showing a lid in its compact or storage position.

FIG. 32 is a left-side elevational view of the grill of FIG. 31 with the lid in its compact or storage position.

FIG. 33 is a left, front, top isometric view of the grill with the lid in its expanded or operational position.

FIG. 34 is a left-side elevational view of the grill with the lid in its expanded or operational position.

FIG. 42 is an elevational view of the fuel-tank pack.

FIG. 43 is a front, right, top isometric view of the fuel-tank pack.

FIG. 44 is a right-side elevational view of the fuel-tank pack.

DETAILED DESCRIPTION

Figure 1:
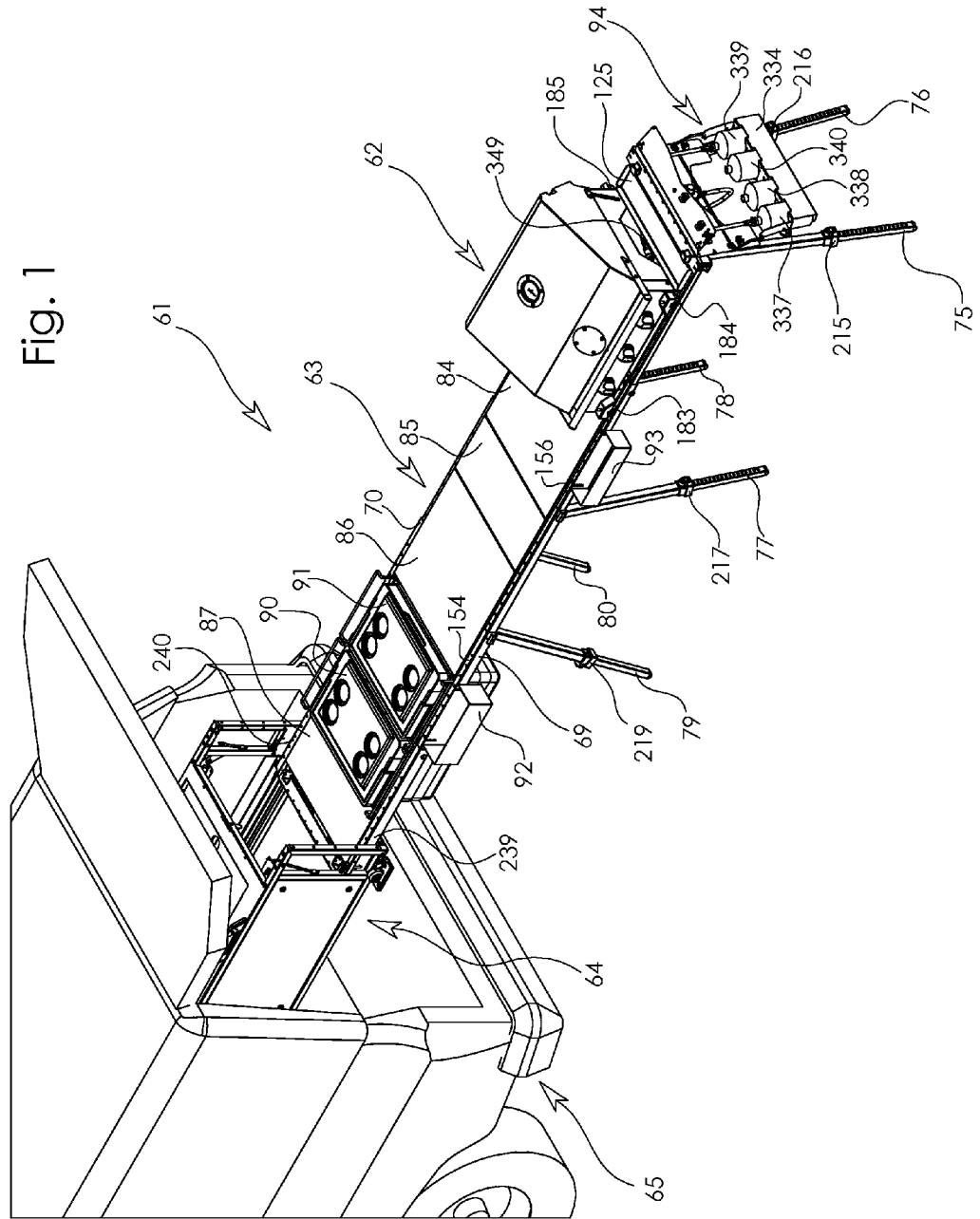
FIG. 1 is an isometric view of one example of a portable cooking system shown in an extended position, in which the portable cooking system is extended from a back of a vehicle.

FIG. 1 shows one example of a portable cooking system generally at 61 for use at, for example, sporting events. The system 61 includes a cooking device 62 such as, for example, a grill, a guide rail system 63, and a travel rack 64. FIG. 1 shows the components of the system 61 extending from a vehicle, such as, for example, a truck or SUV 65, in a configuration or position suitable for use. Transporting the system 61 involves placing all of the components of the system 61 inside of the vehicle 65, as discussed below. The guide rail system 63 includes guide members or guide rails 69 and 70, and the grill 62 sits on and is supported by the rails 69 and 70. Legs 75-80 of the portable cooking system 61 support the guide rails 69 and 70. The guide rails 69 and 70 also support flat platforms, or table tops, 84, 85, 86, and 87, storage units 90 and 91, troughs 92 and 93, and a fuel-tank pack 94 for the grill 62 as described below. Thus, FIG. 1 illustrates the portable cooking system 61 in an operational position extended from, but still coupled to the vehicle 65.

Figure 2:
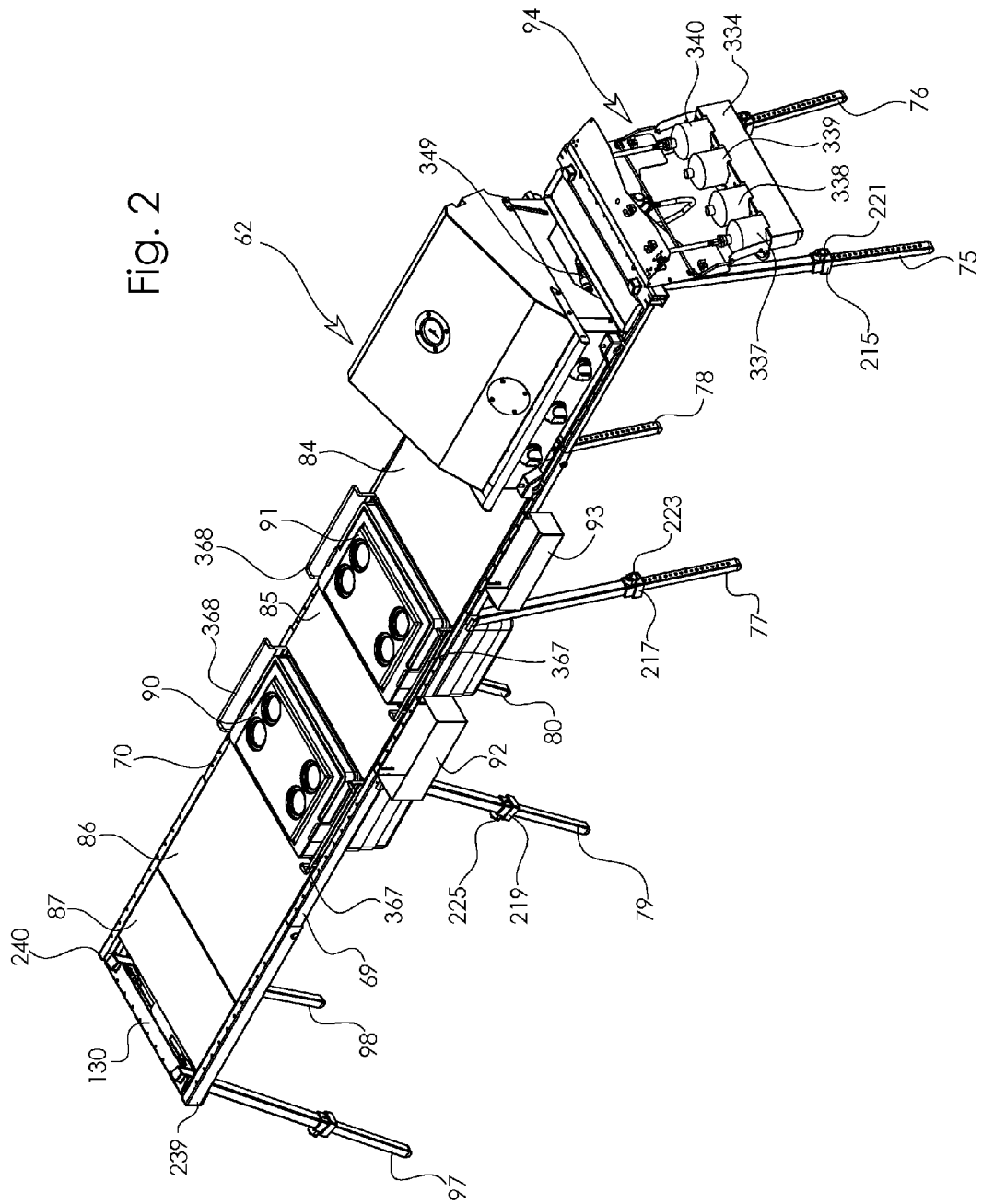
FIG. 2 is an isometric view of the portable cooking system of FIG. 1 in a "free standing" mode or position achieved by adding a pair of legs to an end of guide rails of the portable cooking system.

FIG. 2 illustrates the portable cooking system 61 in a second operational position, but is separate and displaced from the vehicle 65 in a free-standing position. The portable cooking system 61 includes two additional legs 97 and 98 connected to an end of the guide rail system 63 opposite the legs 75 and 76. This allows use of the system 61 independent of and separate from the vehicle 65, which may occur while the vehicle 65 travels or relocates elsewhere for the usual purposes or when the vehicle 65 may not park at a location where use of the system 61 is desired. The somewhat different arrangement of the components in FIG. 2 from those of FIG. 1 suggests versatility of the system 61.

Figure 3:
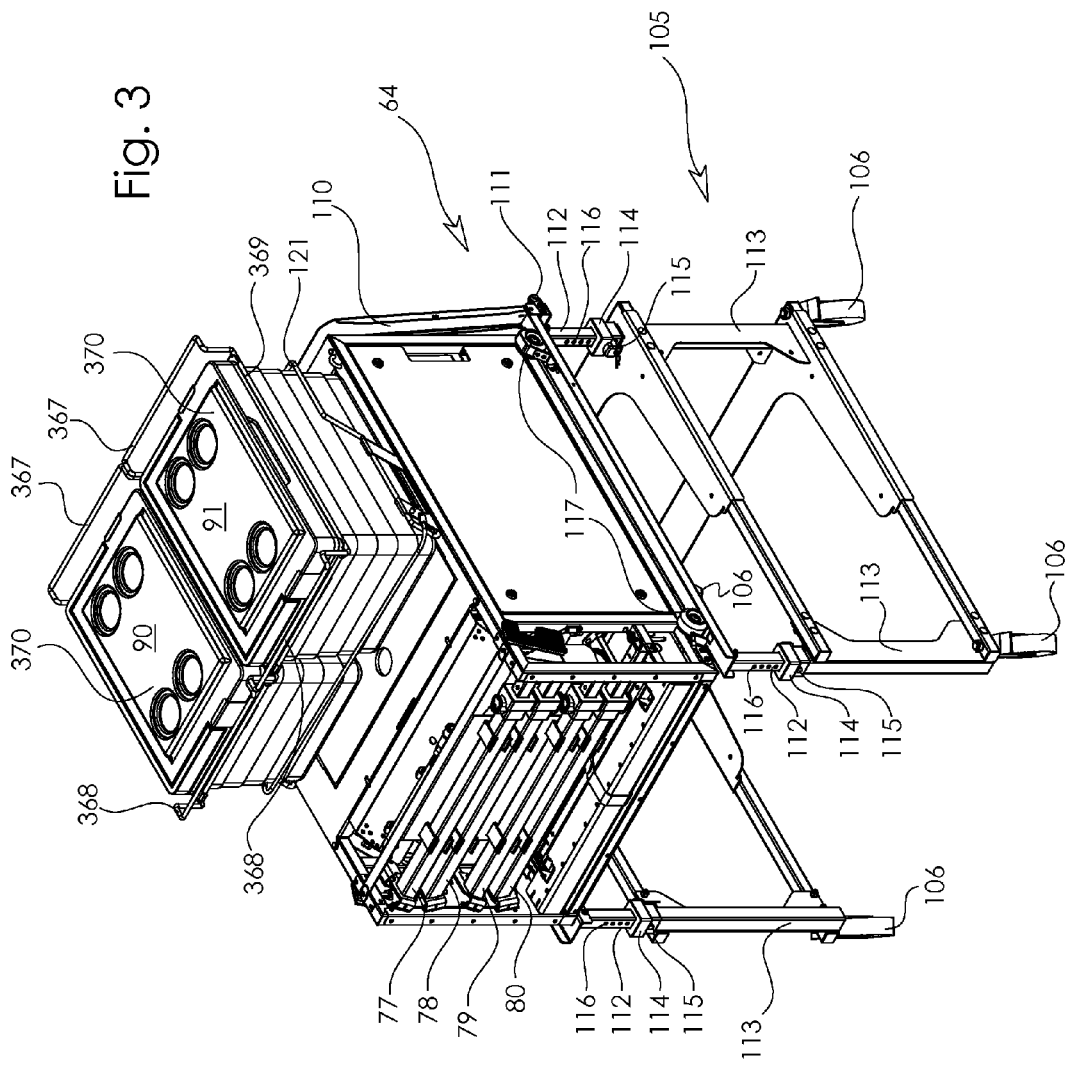
FIG. 3 is an isometric view of the portable cooking system of FIG. 1 and includes a storage cart with components of the system in a stored position.

With reference to FIG. 3, the portable cooking system also includes a storage cart 105. Components of the portable cooking system 61 are collapsed and positioned in an on the travel rack 64, which then sits on or is supported on the storage cart 105. This allows the travel rack 64 and various components of the system 61 to store neatly while occupying minimal space. To facilitate use of the system 61, the storage cart 105 includes wheels 106 that allow it to move between its storage position, such as, for example in a garage, to a vehicle 65 and back again.

Figure 4:
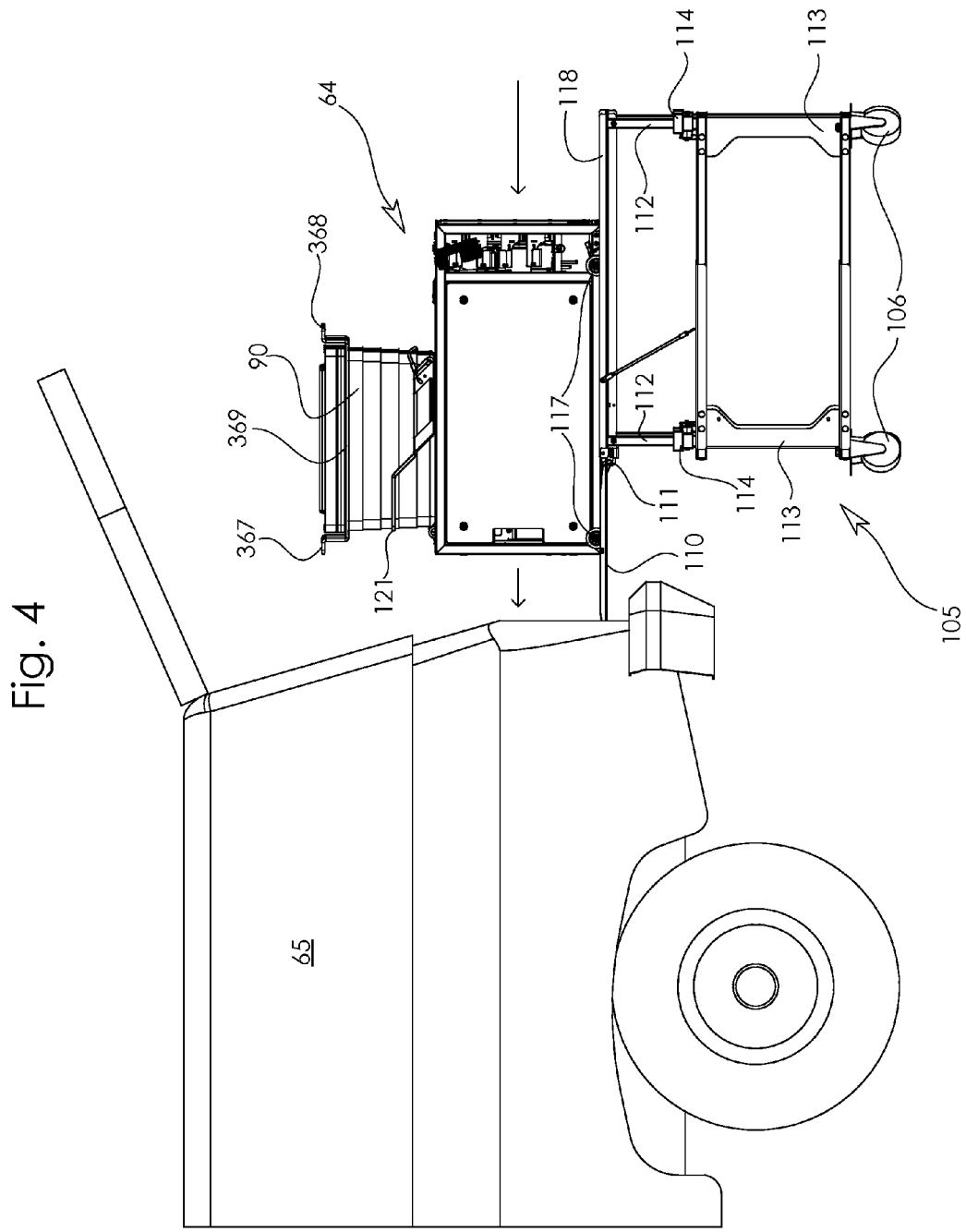
FIG. 4 is an elevational view from a left side of the portable cooking system rolling off the storage cart into a vehicle.

To facilitate transfer of the travel rack 64 between the storage cart 105 and the vehicle 65, the storage cart 105 includes a stowable ramp 110 which can rotate about a connection or hinge 111. When the travel rack 64 moves between the vehicle 65 and the storage cart 105, the ramp rotates about the hinged connection 111 to a position shown in FIG. 4. When the ramp 110 is not in use, the ramp 110 may be swung back to its upright position shown in FIG. 3.

The storage cart 105 is also height adjustable so a height of the ramp 110 may be adjusted to position the ramp 110 in a generally horizontal position generally co-planar with a truck or surface of the vehicle 65. In this manner, the travel rack 64 may simply move in a generally horizontal manner into the vehicle 65 from the storage cart 105 and vice versa. To accomplish this height adjustment, reference is made to FIGS. 5-8. The storage cart 105 includes upper legs 112 that telescope into and out of lower legs 113. Stops 114 around the upper legs 112 include spring loaded pins 115 which fit into openings 116 of the upper legs 112. Adjusting the height of the storage cart 105 involves pulling out the pins 115, moving the upper legs 112 relative to the lower legs 113, and releasing the pins 115 so the pins 115 engage the opening 116 aligned with the pin 115. FIGS. 7 and 8 show the storage cart 105 positioned at different heights after adjustments in this manner to accommodate vehicles 65 of different heights. With the storage cart 105 at its appropriate height for the vehicle 65, the travel rack 64 may, on its wheels 117, easily roll from the storage cart 105 to the vehicle 65, and easily roll from the vehicle 65 onto the storage cart 105. The cart 105 includes stops or limiting members 119 (see FIG. 5) on the guide rails 118 to inhibit or stop movement of the travel rack 64 when the travel rack 64 rolls, on its wheels 117, onto the rails 118 of the storage cart 105.

As seen in FIGS. 3 and 9 as well as in later figures, the travel rack 64 is configured to stow, support or contain all of the components of the system 61 shown in FIG. 1 (except the vehicle 65, of course). The travel rack 64 includes guard rails 121 that maintain storage units 90 and 91 in place when the storage units are positioned and supported on top of the travel rack 64.

Figure 10:
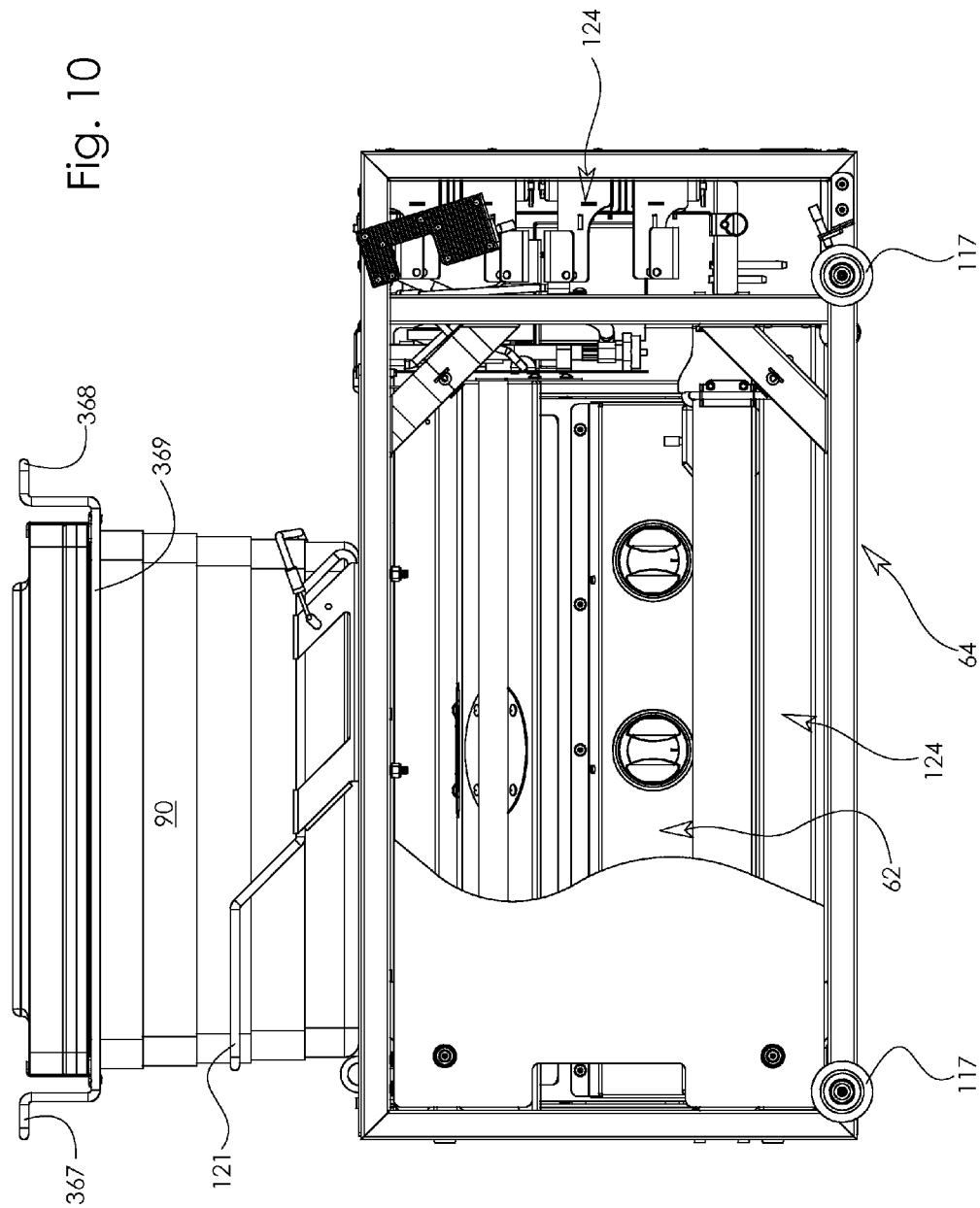
FIG. 10 is a left-side elevational view of the portable cooking system on the travel rack with part of a side panel removed to show a grill in its stored position.
Figure 11:
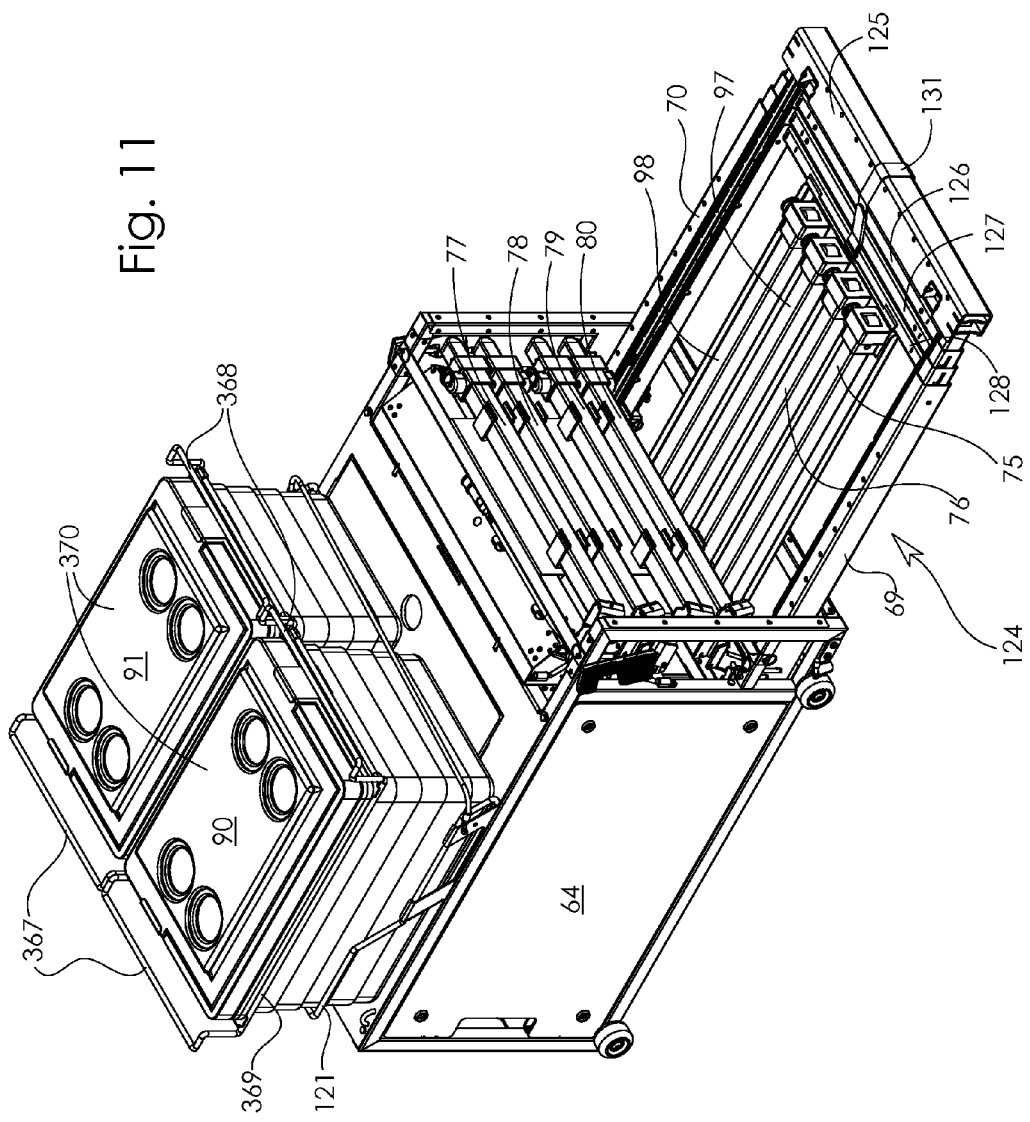
FIG. 11 is an isometric view of the portable cooking system on the travel rack with a guide rail system extended from the travel rack.

With the travel rack 64 and components of the system 61 supported thereon in the vehicle 65 and at a position of intended use, the rails 69 and 70 and their supporting legs 75-80 are deployed from their storage positions. This begins with extricating a rail pack at 124, as illustrated in FIGS. 9-11, out of the travel rack 64. An end brace 125 facilitates this process. The end brace 125 is pulled out of the travel rack 64, which causes middle braces 126-128 to be pulled out as well (see FIGS. 11, 13, 14, and 15). A strap 131 keeps all of these components, along with the condensed rails 69 and 70 and the compressed end legs 75, 76, 97, and 98 (discussed below) together in order to allow for their facile deployment in this fashion. Removing the end legs 75, 76, 97 and 98 from their holders 134 and 135 (see FIGS. 14 and 16) and releasing the strap 131 then allows for the further pulling outward of the end brace 125 and extending the side rails 69 and 70 to their configurations shown in FIG. 13. The configuration of the end brace 125, the middle braces 126-128, and the side rails 69 and 70 allows removal of these components from the travel rack 64 without disturbing any of the other components stored in the travel rack 64.

The middle or interior legs 77-80 are also removed from their clips or holders 140 on support member or board 139. The condensed form of the middle legs 77-80, when removed from the board 139 appears in FIG. 12.

Figure 12:
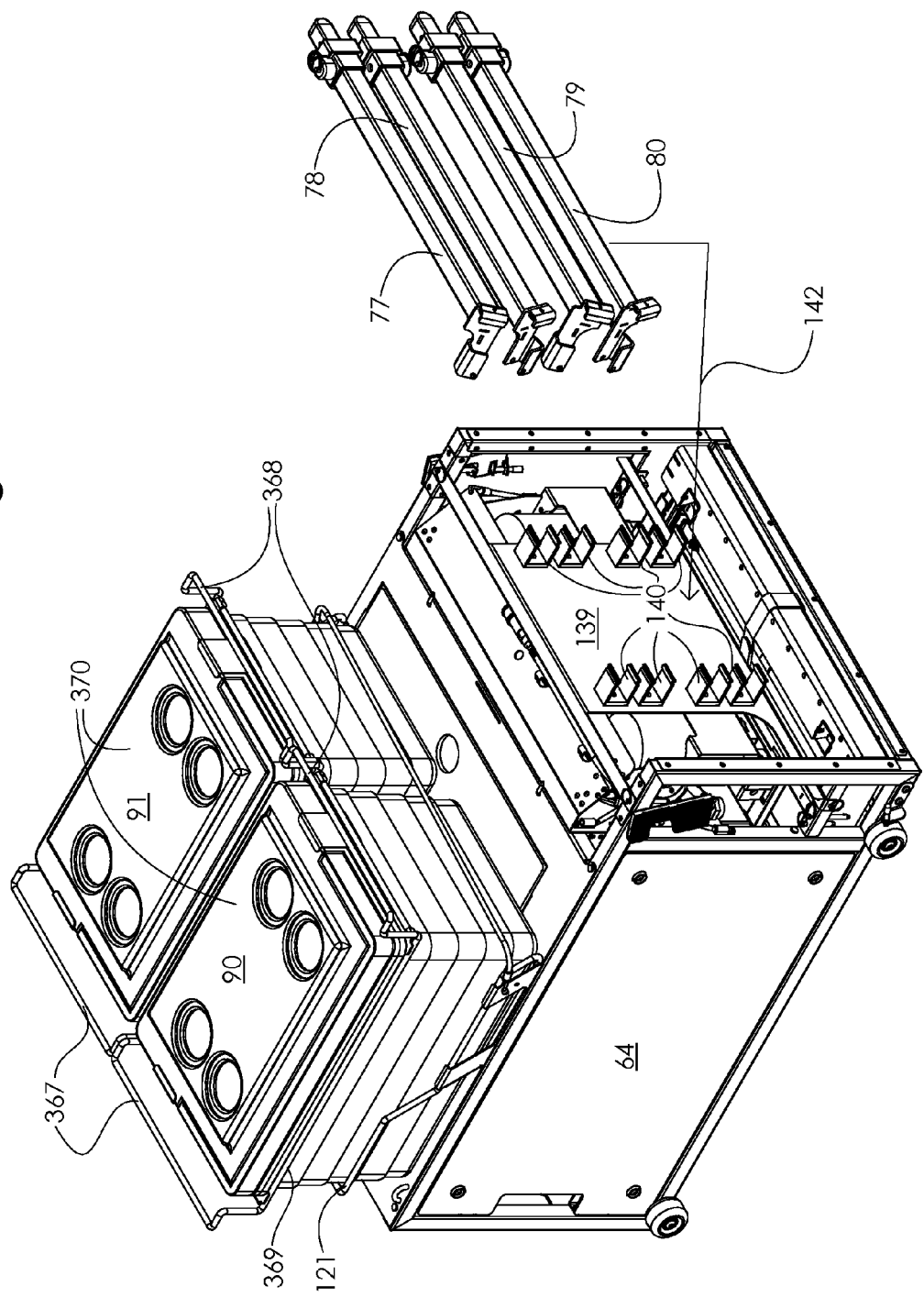
FIG. 12 is a partially exploded isomeric view of the portable cooking system in a stored position except for four middle legs exploded off.

Assembling the portable cooking system 61 also involves, after extending the guide rails 69 and 70 (see FIGS. 1 and 15) in the direction of arrow 141 (see FIGS. 13 and 15), attaching the end legs 75 and 76 and the interior legs 77-80 to the guide rails 69 and 70. The end legs 75 and 76, along with their companion end legs 97 and 98, are removed from their holders 134 and 135. In the storage position, the interior legs 77-80 are positioned against the board 139, which acts as an interior-leg storage bracket, and the clips 140 hold the interior legs 77-80 in place for travel and storage. Removing the legs 77-80 simply requires pulling them from the clips 140. The legs 77-80 are then ready for installation and subsequent use. The arrows 142 in FIG. 12 show the travel of the legs 77-80 to their storage position in the clips 140 on the board 139. Removal of the legs 77-80 from the clips occurs by moving the legs 77-80 in an opposite direction to arrow 142 in FIG. 12.

Figure 14:
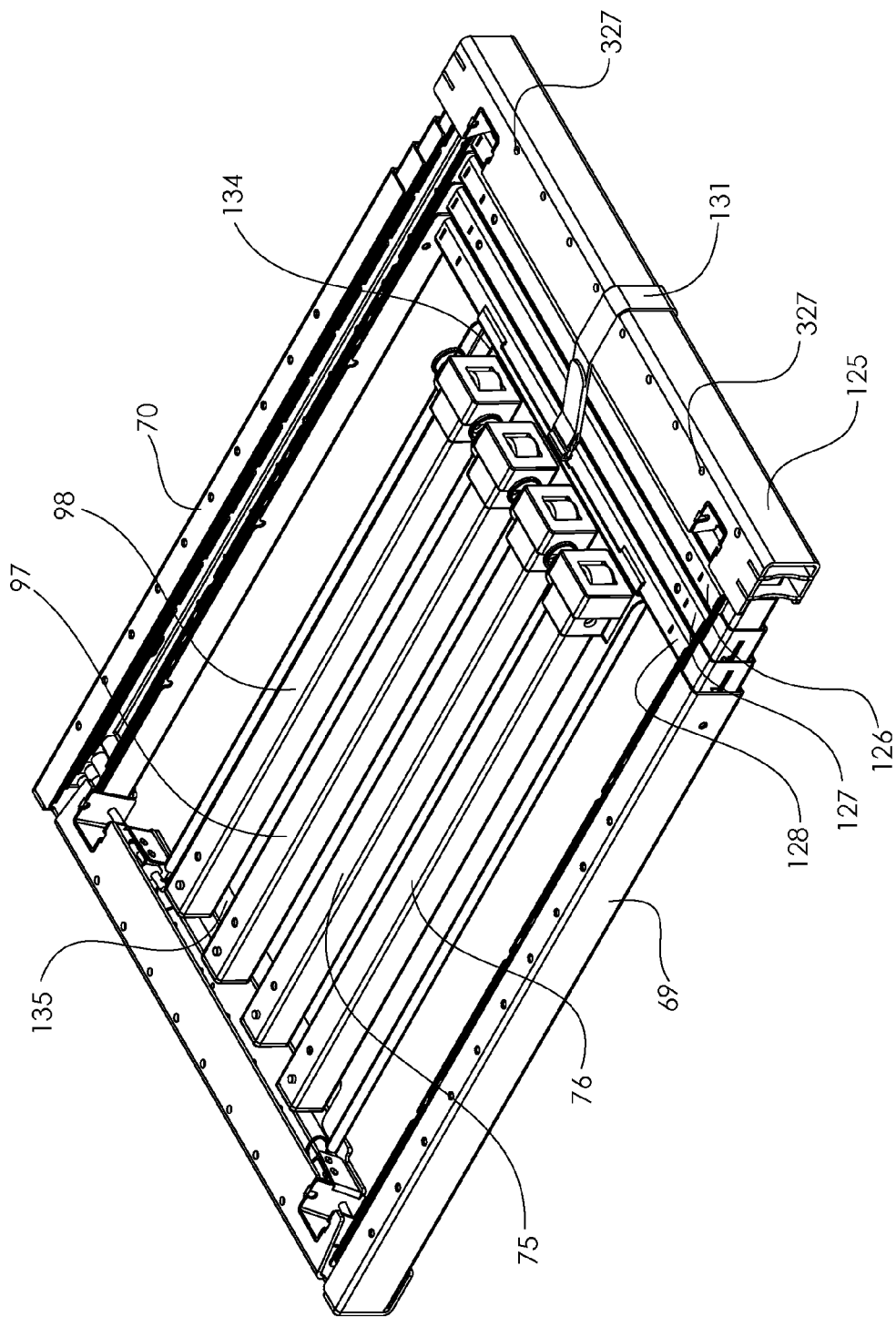
FIG. 14 is an isometric view of four end legs of the portable cooking system in a stored position on a removable tray.
Figure 15:
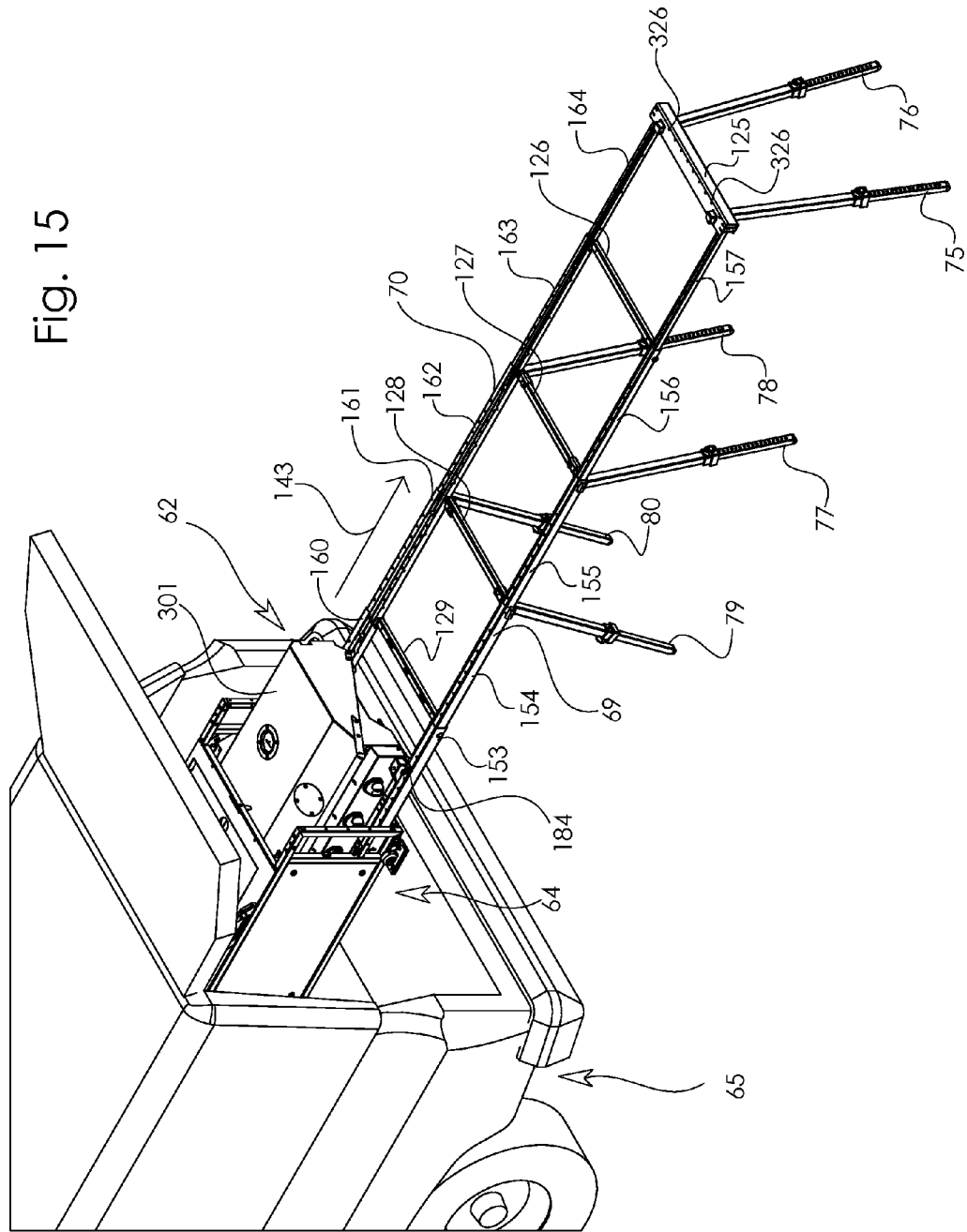
FIG. 15 is an isometric view of a grill of the system in a compact configuration rolling out of the travel rack located inside of a vehicle.
Figure 16:
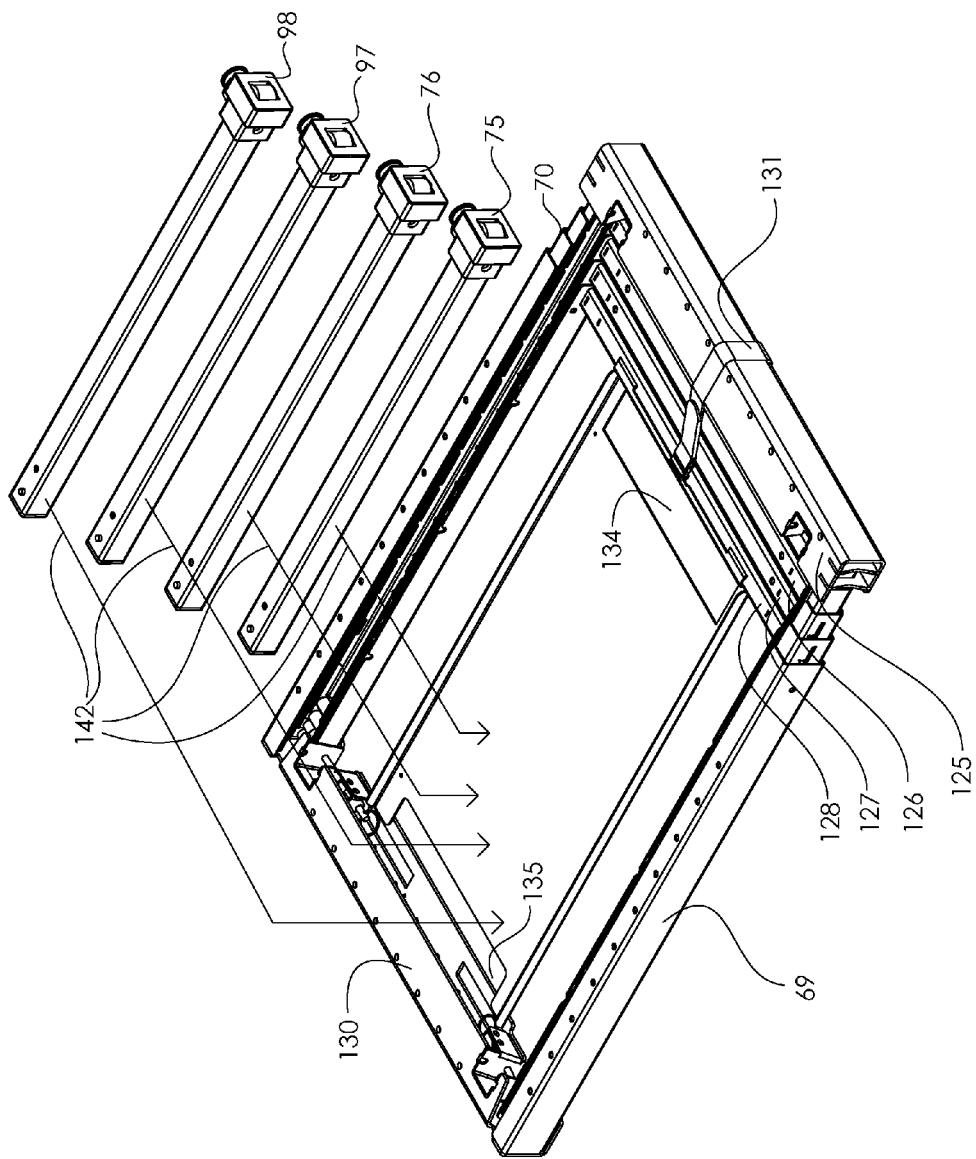
FIG. 16 is an exploded view of the four end legs removed from their stored position.

Removing the legs 77-80 permits the extension of the rails 69 and 70 from the travel rack 64 in the direction of arrow 143 in FIG. 15. Each of the rails 69 and 70 actually incorporates several telescoping cross-connected units, sections or portions similar to rail portion 145 shown in FIGS. 17 and 18. Each of the rail portions 145 includes two sections 147 and 148. The section 148 forms part of the rail 69, and the other section 147 forms part of the rail 70. Each portion 145 also has a cross bar 149 for rigidity. In the case of the rail portion furthest from the travel rack 64, the cross bar takes the form of the end brace 125, while, for the other sections, it constitutes cross braces 126, 127, and 128 seen in the condensed configuration of FIG. 14 and the extended position in FIG. 15.

With reference to FIGS. 1, 2, 13, and 15, the reference to general section 148 of the guide rail 69 in FIG. 17 corresponds to sections 153, 154, 155, 156, and 157 of the guide rail 69. Similarly, the reference to general section 147 in FIG. 17 corresponds to sections 160, 161, 162, 163, and 164 of the guide rail 70. The cross or end brace 125 rigidly attaches to the rail sections 157 and 164, the cross brace 126 to the sections 156 and 163, the cross brace 127 to the sections 155 and 162, the cross brace 128 to the sections 154 and 161, and the cross brace 129 to the sections 153 and 160. The cross brace 130 also attaches to the sections 153 and 160 to make a rigid rectangle with the cross brace 129. Thus, the portion of the guide rail system 63 closest to the vehicle 65 has the four connected pieces 129, 130, 153, and 160. All the other portions of the guide rail system 63 include three connected pieces.

The structure of the guide rails 69 and 70 allows them to facilely telescope in and out of each other. FIGS. 17-20 show details of this structure that facilitates these motions. The guide rail portion 145 includes a bottom surface 165 having a flat configuration, a short vertical ridge or wall 166 on an interior of the guide rail portion 145, an outer wall 167 having a greater height than the inner wall 166, and an inward pointing partial flange or roof 168. The bottom surface 165 rigidly connects to the two side walls 166 and 167 and maintains them in a vertical direction and at a predetermined distance apart from each other.

As seen in FIG. 20, the rail section 147 of the rail portion 145 fits into rail section 170 of the rail portion 146. Overhang 171 of the rail section 170 serves to keep the rail portion 145 from dislodging from the rail portion 145 when rail section 147 enters rail section 170. However, the rail section 147 can move longitudinally when placed inside of the rail section 170. This movement allows the rail section 147 to telescope into and out of the rail section 170. To further facilitate this motion, the end of the rail section 147 includes roller 174 affixed at its end. The roller 174 rolls along the bottom surface 165 of the rail portion 146 when the relative motion between the rail portions 145 and 146 occurs.

With reference to FIGS. 19 and 20, the guide rail system 63 does not include a supporting leg at every location where rail portions connect. Particularly, a supporting leg is not positioned where rail sections 153 and 160 respectively connect to rail sections 154 and 161. Similarly, a supporting leg is not positioned where rail sections 156 and 163 respectively connect to rail sections 157 and 164. The portable cooking system 61 includes pins 181 at these locations without supporting legs to provide support to the guide rail system 63.

As seen in FIGS. 1, 2, 13, 19, and 20, the rail sections 153 and 160 closest to the travel rack 64 have the greatest cross sections (taken along a vertical plane perpendicular to a ground surface). The cross-sections of the other rail sections decrease towards the end rail sections 157 and 164. When the guide rails 69 and 70 are attached to the vehicle 65, the thicker, stronger rail sections are positioned closer to the vehicle 65, and the thinner sections are positioned further away from the vehicle 65. This gives the greatest strength to those sections which can rely upon the vehicle 65 for support.

Pulling the guide rail system 63 out of the vehicle 65 to its extended configuration seen in FIGS. 1, 2, 13, and 19 portends the possibility of the sections 153-157 and 160-164 simply extending too far and becoming completely separated from each other. Worse still, this could also theoretically happen with the system 61 in use, creating a possibly very unpleasant scene. The portable cooking system 61 includes components that preclude this scenario from occurring and will be described with respect to FIGS. 21-23. For example, with respect to the rail portion comprised of rail sections 156 and 163 and cross-brace 126, an edge or end of this portion of the guide rail system 63 includes a retractile, triangular pin or wedge 189 forced into an interior channel 190 of the rail section 156 by spring 191 connected to base 192 of the wedge 189. The spring 191 forces the base 192 and thus the wedge 189 to the left and, consequently, the channel 190.

Figure 23:
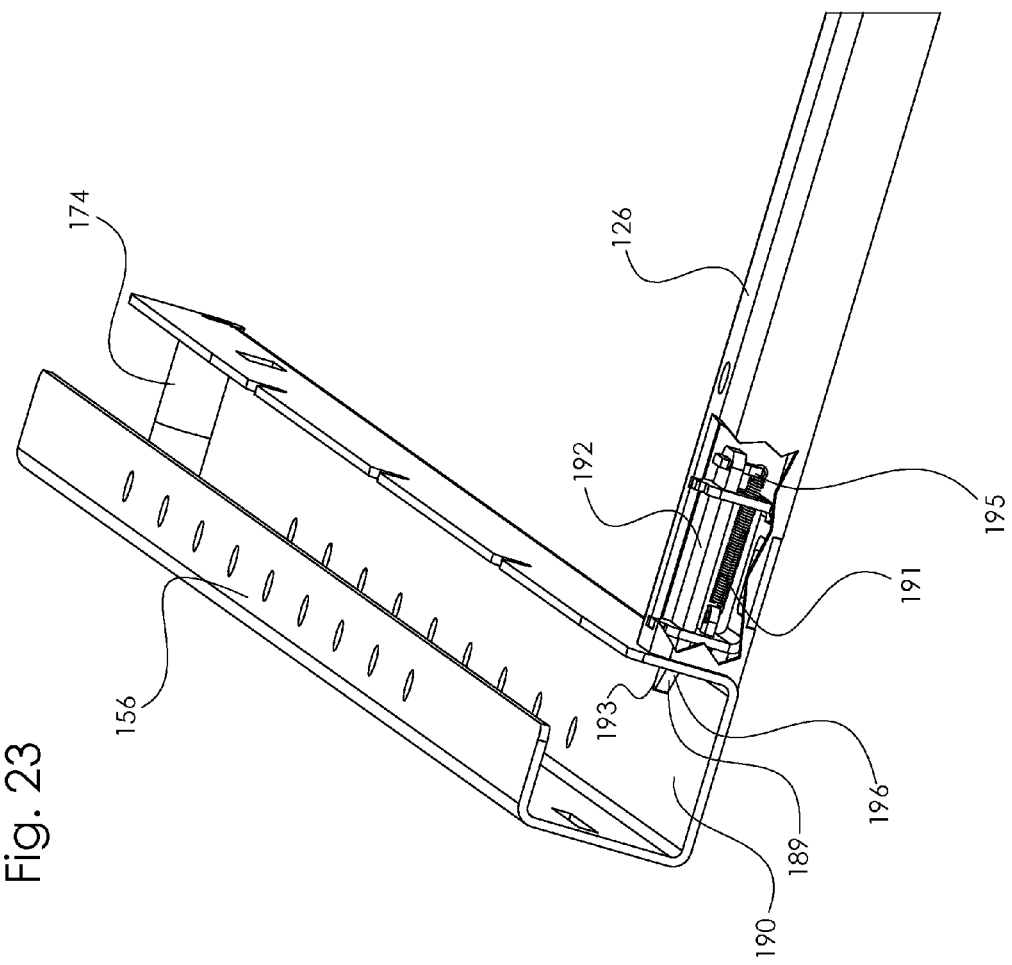
FIG. 23 is a partially cutaway isometric view showing details of the spring-loaded tab of FIGS. 21 and 22 and a spring connection for the spring loaded pin that is used to stop the guide rails when extending.

A front side 193 of the wedge 189 is generally flat or planar and is positioned perpendicularly across the channel 190. The front side 193 is configurable to engage a slotted opening of a rail section sitting in the channel 190 when that rail section is withdrawn. In other words, the front surface 193 of the wedge 189 will contact a rear surface of a slot, such as at 194, but of a rail section sitting in the channel 190, to stop further motion of the interior rail section in a direction to remove the interior rail section entirely from the outer rail section. Such removal, if actually desired, can result from placing a finger on the tab 195 and pushing it toward an interior of the cross brace 126 (or to the right as shown in FIG. 23). This action will withdraw the wedge 189 out of the channel 190 and allow a rail section sitting in the channel 190 to withdraw entirely from the channel 190.

Inserting the rail section 157 (from FIG. 19) into the channel 190 proceeds without any noticeable difficulty. A leading edge of the rail section 157 will push against a ramped or angled, backward-facing side 196 of the wedge 189 forcing the wedge 189 out of the channel 190 and allowing the rail section 157 to proceed toward the vehicle 65. If the wedge 189 were to enter a slot 194 at a rear of the rail section 157 (similar to the slot 194 of FIG. 21), a rear edge of the slot 194 would force the wedge 189 to push against a spring 191 and retract the wedge 189 to allow the entry of the rail section 157. Similarly, when the use of the system 61 is finished for the time being, pushing the rail section 156 toward a back of the rail system 63 pushes against the wedge 189 which withdraws out of the channel 190 so that the rail portions may condense to the configuration shown in FIG. 16.

Figure 13:
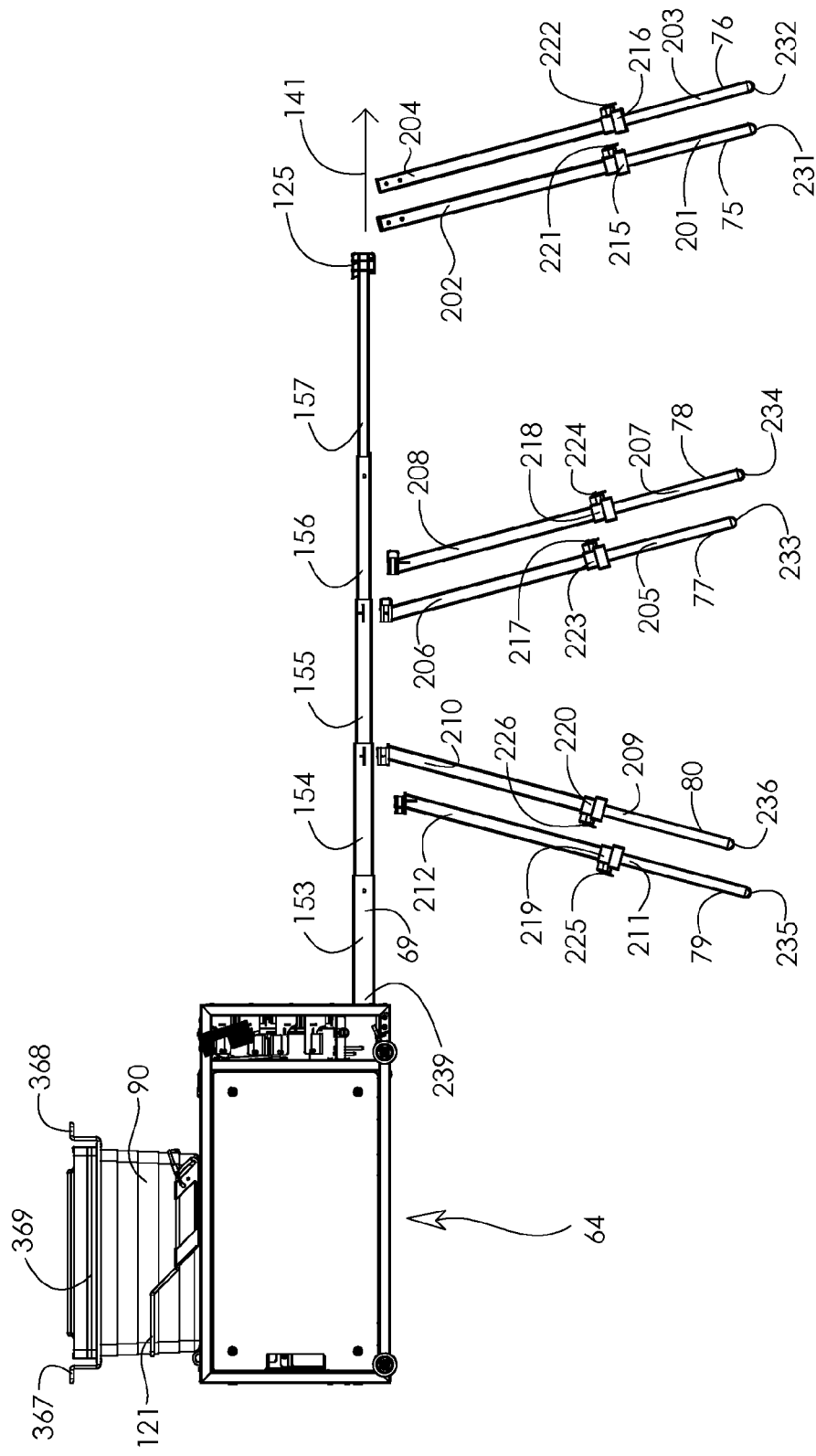
FIG. 13 is a left elevational view of the portable cooking system on the travel rack with the rail system extended and the legs in position under the guide rail system, but not yet connected.

With the guide rails 69 and 70 telescoped out to their extended position as seen in FIG. 13, the mid legs 75-80 may be attached to the guide rails 69 and 70. As seen in FIG. 13, each of the legs 75-80 includes two telescoping sections such as, for example, sections 201 and 202 of the leg 75, sections 203 and 204 of leg 76, sections 205 and 206 of leg 77, sections 207 and 208 of leg 78, sections 209 and 210 of leg 79, and sections 211 and 212 of leg 80. Similarly, the two end legs 97 and 98 have two telescoping sections. The legs 75-80 also have adjusting links 215-220, respectively, with spring-loaded pins 221-226, respectively, which retract against springs to allow for the extension of the lower legs 201, 203, 205, 207, 209, and 211 from the upper legs 202, 204, 206, 208, 210, and 212, respectively, to provide legs 75-80 having desired length(s) for the desired position, height of the vehicle 65 and surrounding terrain or environment. The pins 221-226 return to their original extended positions when the legs 75-80 are at their desired length(s) to maintain the legs 75-80 at the desired length(s). The legs 75-80 also have feet 231-236, respectively, to keep the legs 75-80 from slipping on a ground surface upon which they rest and to protect lower ends of the legs 75-80.

Referring back to FIG. 2, ends 239 and 240 of the guide rails 69 and 70, respectively, positioned near, next to or on the vehicle 65 as shown in FIG. 1 need not rely upon the vehicle 65 for support. The end legs 97 and 98 can attach to the guide rails 69 and 70 to free the portable cooking system 61 from the vehicle 65. The end legs 97 and 98 may include the same structure as the other end legs 75 and 76.

Figure 24:
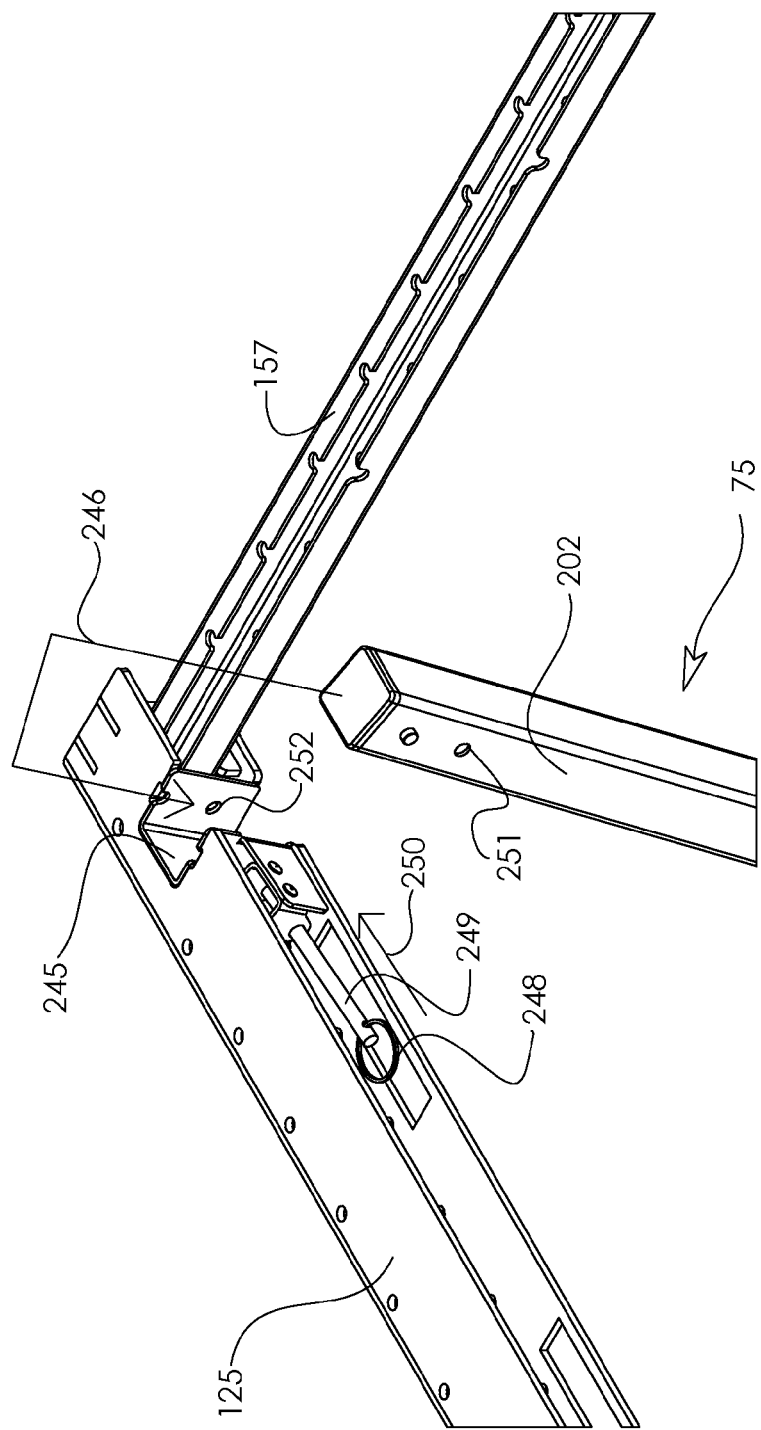
FIG. 24 is an exploded view showing a connection of an end leg to a portion of the guide rail system.

Referring now to FIG. 24, the end leg 75 is illustrated and is in the process of connecting to the end brace 125. End 202 of the leg 75 inserts into a notch 245 defined in the end brace 125 in a direction represented by arrow 246. While inserting the end 202 of the leg 75 into the notch 245, ring 248 is pulled away from the notch 245 to withdraw pin 249 from the notch 245 and allow for entry of the leg 75 into the notch 245. After the leg 75 is positioned inside the notch 245, the pin 249 is pushed in a direction, represented by arrow 250, into an opening 251 of the leg 75 and into an opening 252 of the cross brace 125 to keep the leg 75 in place. The other end legs 76, 97, and 98 attach to the guide rails 69 and 70 in a similar manner.

Figure 25:
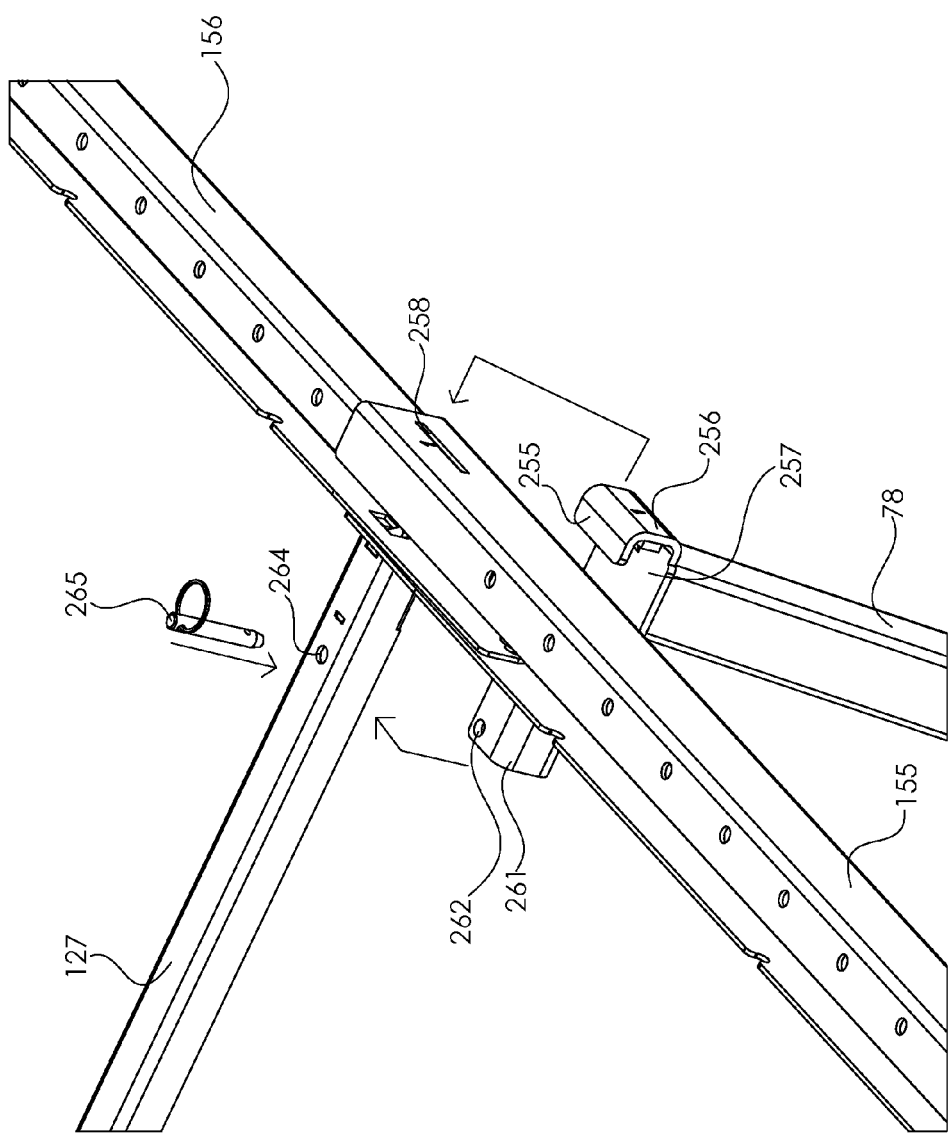
FIG. 25 is an exploded view of a mid-leg connected to a portion of the guide rail system, this figure includes arrows indicating a direction of motion to connect the leg to the guide rail system.

With reference to FIG. 25, a manner of attaching a middle leg, such as for example leg 78, to rail sections, such as for example rail sections 155 and 156, is illustrated. In this example, tab or flange 255 connects to the remainder of the leg 78 by a curved section 256 and a flat surface 257 attached to a top of the leg 78. This configuration allows the tab 255 to fit into slot 258 defined in section 155 of the guide rail system 63. An open "U"-shaped coupler 261 is also formed unitarily as one-piece with flat surface 257 and can fit around the cross brace 127. When the tab 255 is positioned into the slot 258, the coupler 261 is positioned around the cross brace 127. Positioning the tab 255 tightly into the slot 258 aligns an opening 262 as defined in a on the top of the coupler 261 (and another opening on the bottom of the coupler 261 not seen in the figure) with openings 264 (one opening in top and one opening in bottom of the cross-brace 127) passing through the cross brace 127. Inserting pin 265 through the aligned openings 262, 264, and the opening on the bottom side of the coupler 261 attaches the mid leg 78 securely to the rail sections 155 and 156 and the cross brace 127.

Figure 26:
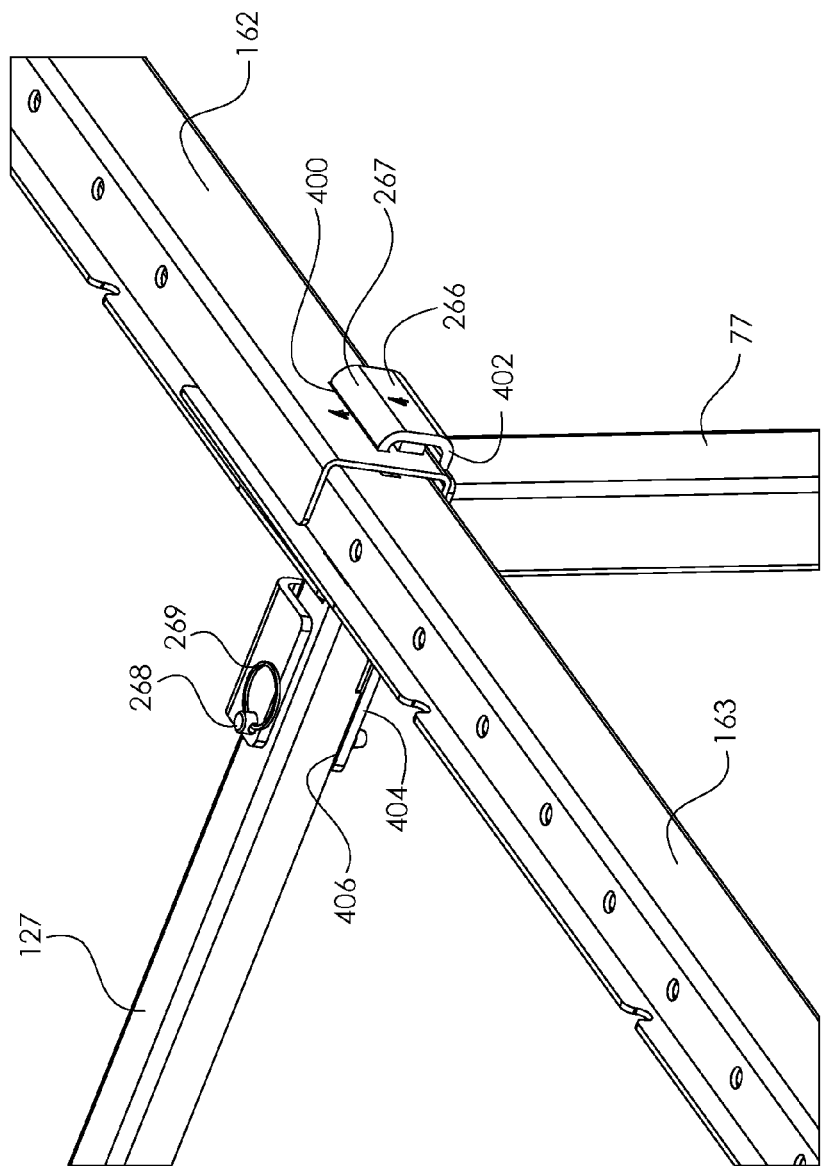
FIG. 26 is an isometric view showing a mid-leg connected to a portion of the guide rail system.

All of the other mid legs 77, 79 and 80 connect to the guide rails 69 and 70 in a similar manner. For example, in FIG. 26, the leg 77 attaches to the rail sections 162 and 163 and the cross brace 127 through the aid of a tab or flange 267 positioned into a slot 400 defined in the rail section 162, a curved section 266 and a flat surface 402. On the other side of the rail sections 162 and 163, the cross brace 127 fits into a "U"-shaped coupler 404 having a channel 406. When the components are properly aligned, a pin 268 (with its extraction ring 269) holds the components together and the leg 77 attached to the rail sections 162 and 163. Removing the pins 265 and 268 allows for the disengagement of the legs 77 and 78 from their respective rail sections.

Placing the rail sections 153-157 and 160-164 as well as the legs 75-80 in place as described above and seen, in particular, in FIG. 15 allows for the grill 62 to be slid onto and down the guide rails 69 and 70 from the vehicle 65. The grill 62 rolls out of the travel rack 64 and along the guide rails 69 and 70 until it reaches its desired position of use, most often at the end of the guide rails 69 and 70 near the end brace 125. At all times, its wheels 183-186 of the grill 62 sit on the guide rails 69 and 70. This includes while the grill 62 sits in the vehicle 65, travels along the guide rails 69 and 70, and sits ready for or in use as shown in FIGS. 1, 2, and 27-30.

Figure 27:
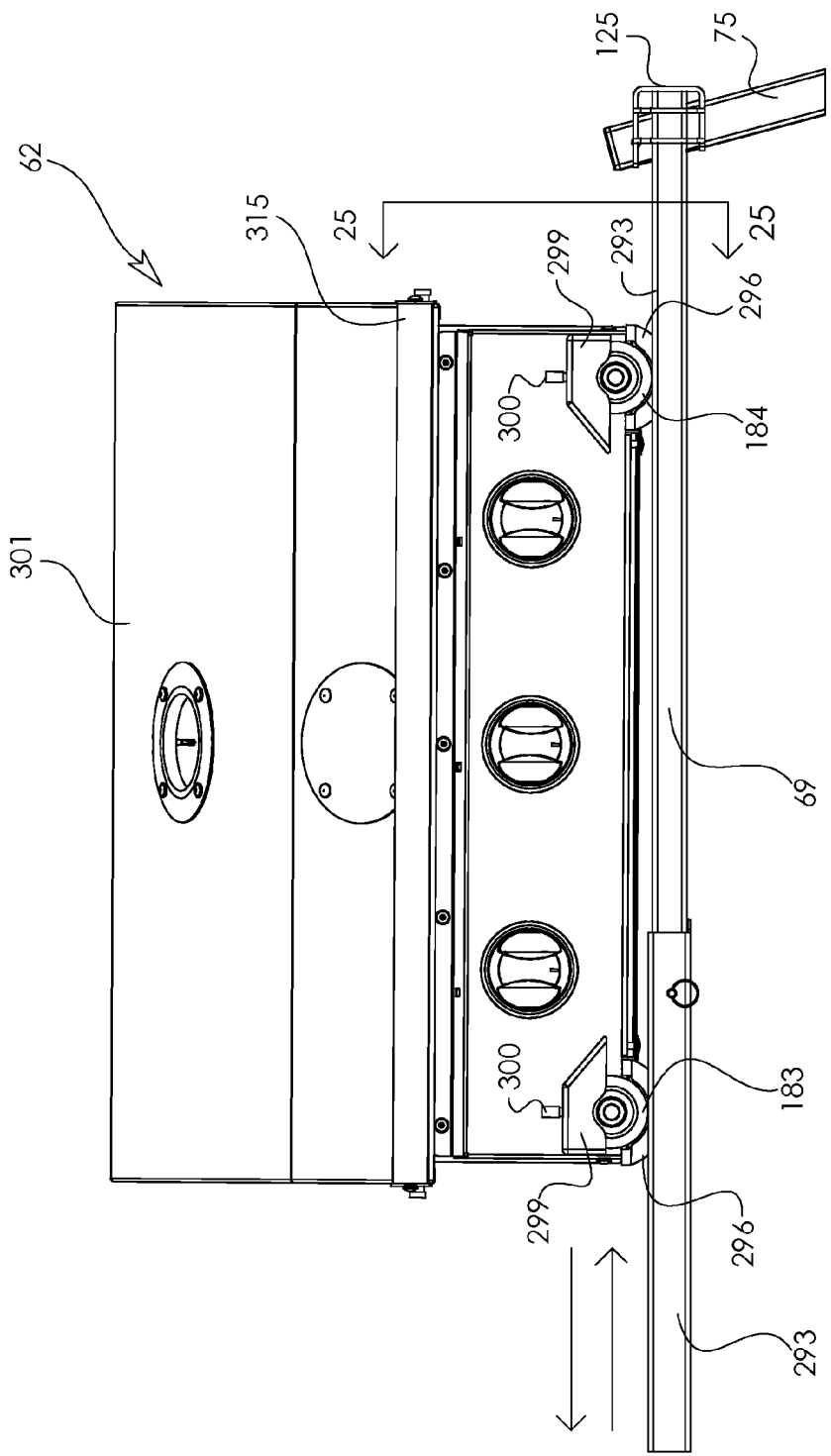
FIG. 27 is a front elevational view of a grill of the portable cooking system on the guide rail system with arrows indicating its directions of travel.
Figure 28:
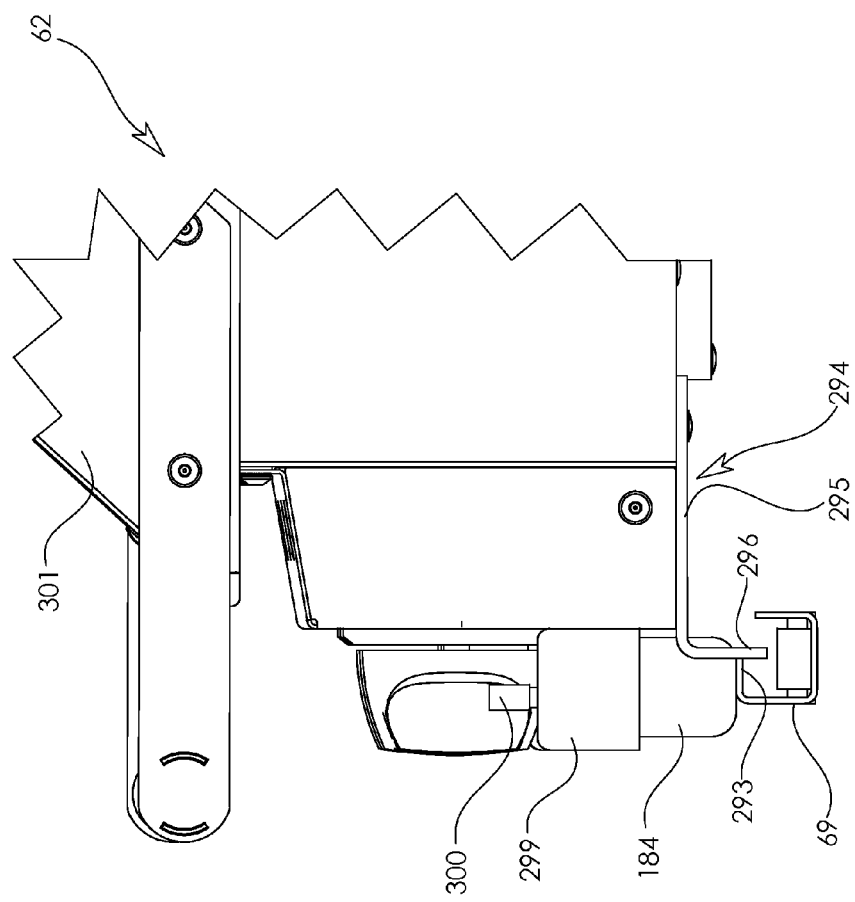
FIG. 28 is a partial right end elevational view of the grill of FIG. 27 showing guides that keep the grill on the guide rails as it moves back and forth.

FIGS. 27-30 show the wheels 183 and 184 sitting, resting or supported on the guide rail 69. The grill 62 also includes wheels 185 and 186 sitting, resting or supported on the guide rail 70. As seen in FIG. 27 and in the end view of FIG. 28, the wheel 184 sits or is supported on top of an upper horizontal rail surface 293 of the guide rail 69. To keep the wheels 183-186 on the upper rail surfaces 293 of the guide rails 69 and 70, a bottom of the grill 62 includes curved metal plates 294 (four total, one associated with each wheel), each of which includes a horizontal section 295 and a vertical section 296. As seen in FIG. 28, the vertical sections 296 of the plates 294 abut against the horizontal upper rail surfaces 293 of the guide rails 69 and 70 on both sides of the grill 62 to keep the grill 62 on the guide rails 69 and 70 much like the wheels of a train keep the train on its tracks. The vertical sections 296 of the plates 294 abut against the upper horizontal rail surfaces 293 if the grill 62 tends to move in that direction. Accordingly, the grill can only move along the guide rails 69 and 70 and cannot dislodge or fall from the guide rails 69 and 70 toward a front or back of the guide rails 69 and 70.

However, the grill 62 may be removed from the guide rails 69 and 70 by lifting the grill 62 vertically until the vertical plates 296 of the grill 62 have cleared the upper horizontal rail surfaces 293 of the guide rails 69 and 70.

The grill 62 also includes fenders 299 positioned above and covering wheels 183-186 to inhibit food and other debris from falling on the wheels 183-186 and negatively impacting operation of the wheels 183-186. The grill 62 further includes screws 300 that can be manually tightened to engage the wheels 183-186 and inhibit the wheels 183-186, and thereby the grill 62, from moving along the guide rails 69 and 70 from a desired position. Loosening the screws 300 allows movement of the grill 62 along the guide rails 69 and 70.

Figure 36:
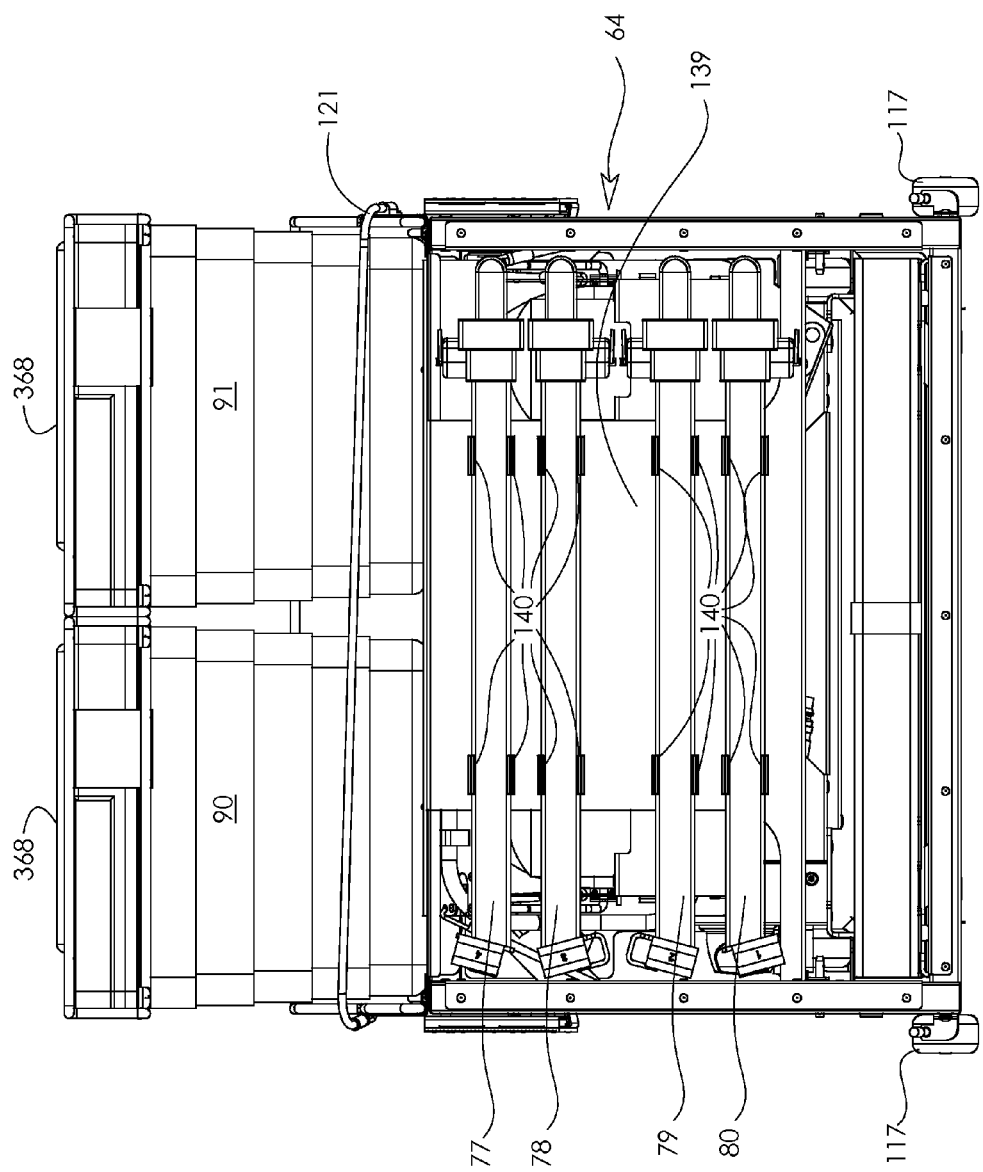
FIG. 36 is a right side elevational view of the portable cooking system stored on a travel rack showing four middle legs attached to an end of the travel rack.
Figure 37:
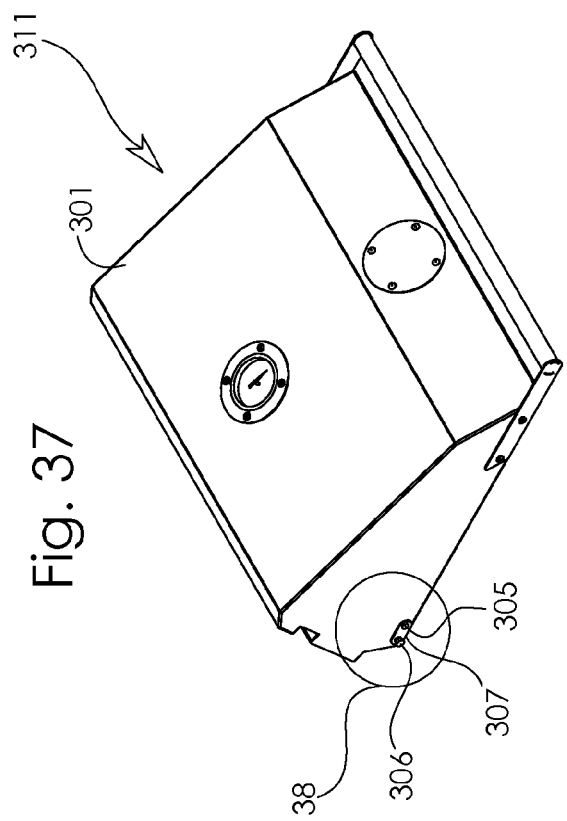
FIG. 37 is a left end, top, front isometric view of a lid of the grill.

The grill 62 includes a lid or hood 301, which is moveable between a lowered or compact position (see FIGS. 31 and 32) and an expanded, raised or operational position (see FIGS. 33 and 34). At least one of the reasons for the compact position of the grill 62 appears in FIG. 15. The compacted grill 62 with the hood 301 in the compact position fits neatly in the travel rack 64. In turn, the travel rack 64 fits nicely into the vehicle 65. Without this compact position of the grill 62, the travel rack 64 might well have a taller stature, thereby preventing the system 61 from fitting in a vehicle 65, especially with the storage units 90 and 91 (of FIGS. 10 and 36, for example) positioned on top of the travel rack 64.

As seen in FIGS. 33, 34, 35, 37, and 38, the grill 62 includes a metal rod 305, a metal tab 307 connected (e.g., welded) to the rod 305, and a screw 306 attached to the metal tab 307 and the hood 301. The screw 306 maintains the tab 306 and the rod 305 in position to move the hood 301 between the compacted and operation positions.

Figure 35:
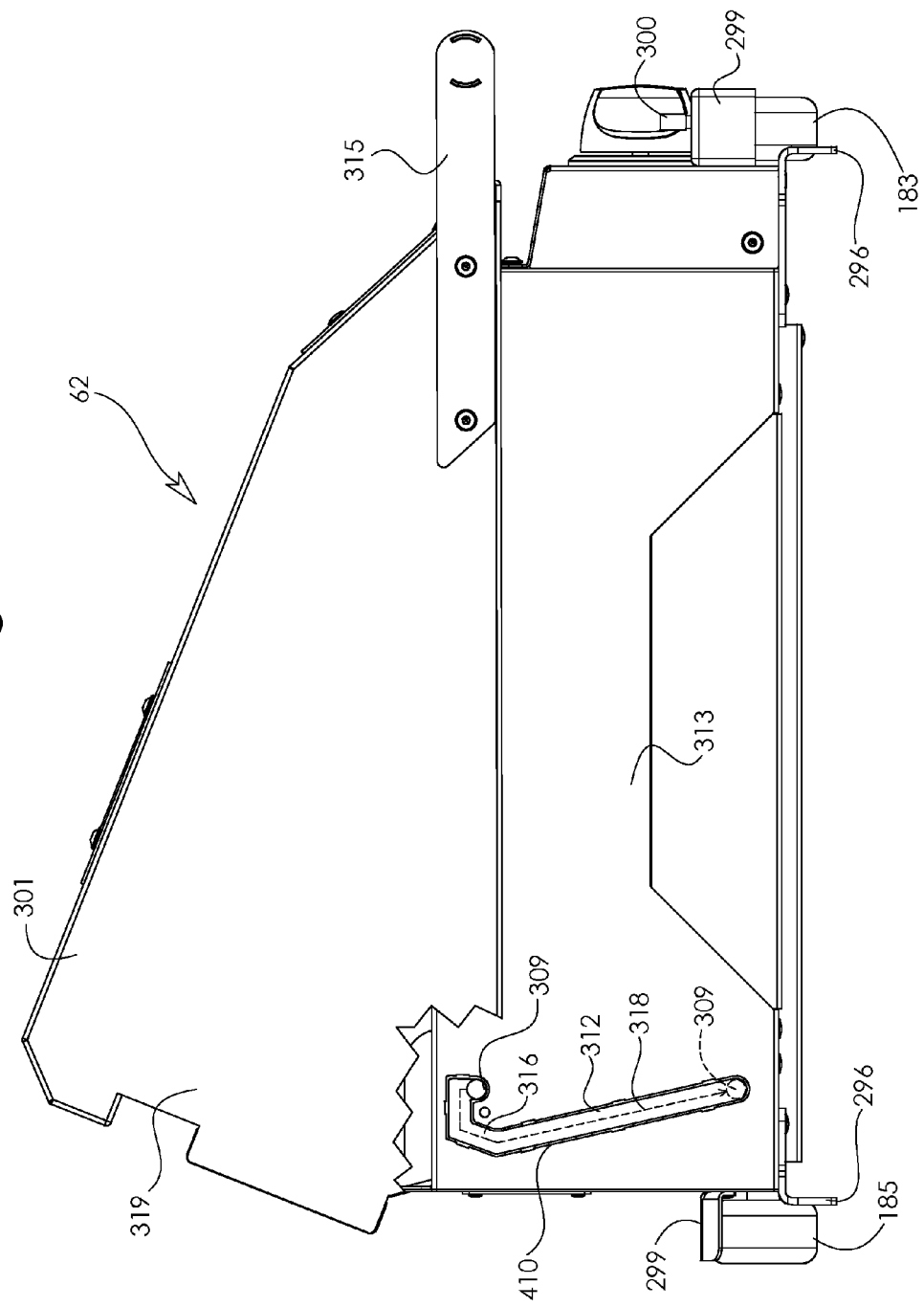
FIG. 35 is a partially cutaway left-side elevational view of the grill with its lid in the expanded or operational position showing a slot in a firebox of the grill within which a lid hinge pin travels when moving between its expanded and compact position.
Figure 38:
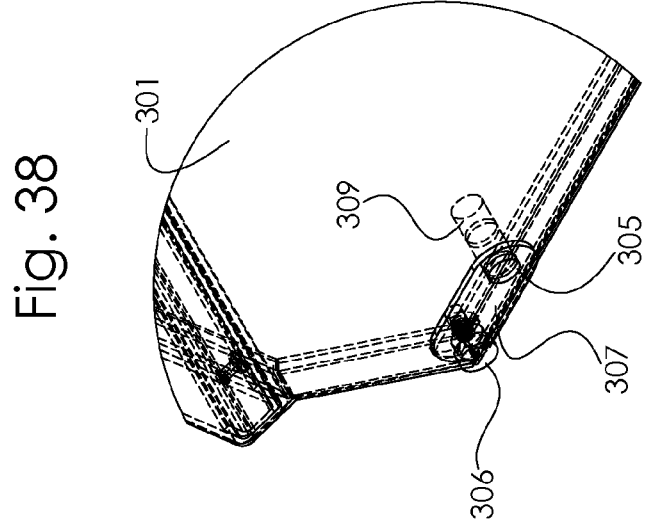
FIG. 38 is an enlarged view of circled section 38 of FIG. 37 showing a left-rear corner of a portion of the lid of the grill.
Figure 39:
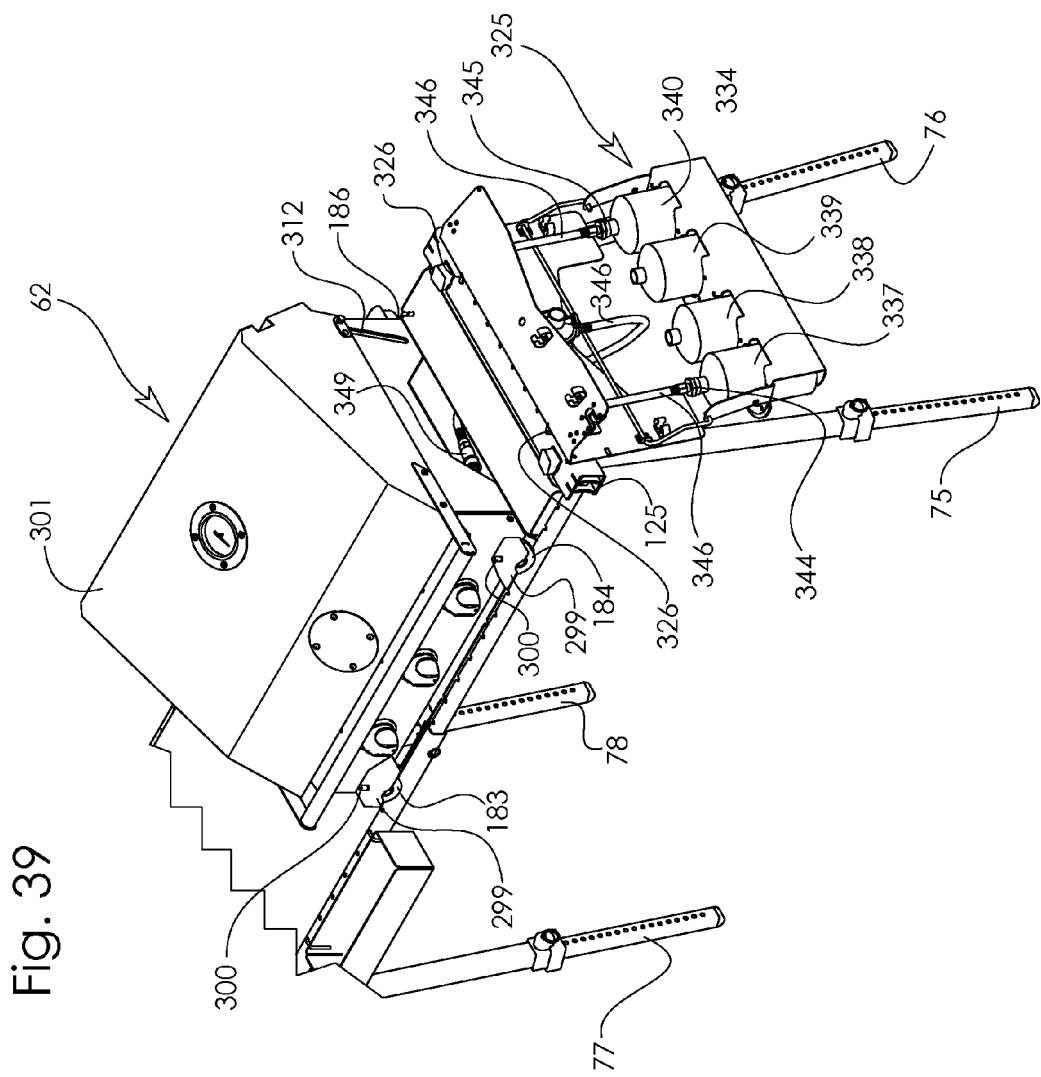
FIG. 39 is a top, front isometric view of the grill with a fuel-tank pack coupled to the portable cooking system in its operational position at an end of the guide rail system.
Figure 40:
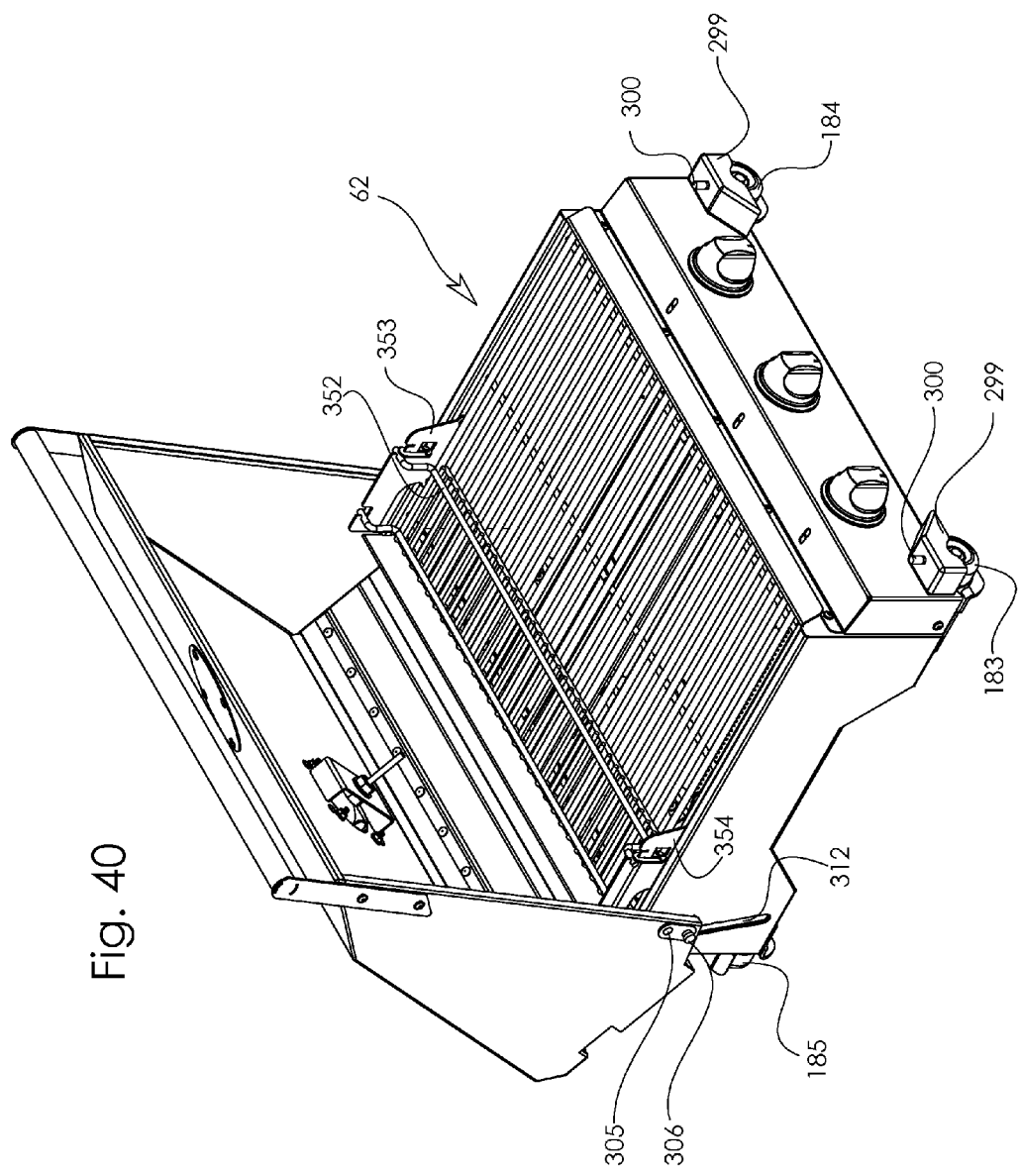
FIG. 40 is a left, top, front isometric view of the grill with the lid in an open position and a warming rack or shelf in its storage position.
Figure 41:
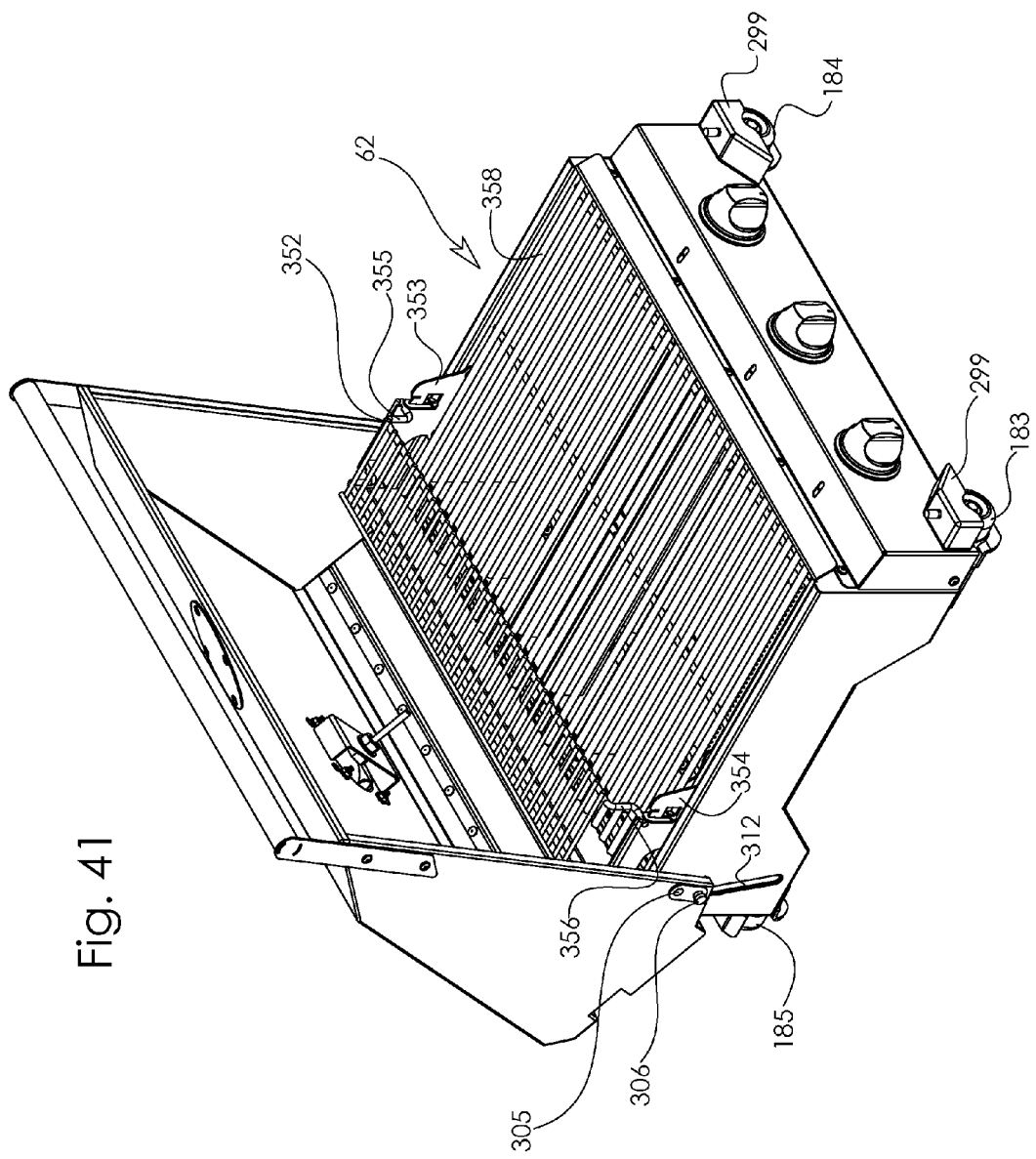
FIG. 41 is a left, top, front isometric view of the grill with the warming rack in its employable or operational position.

With reference to FIGS. 35 and 38, the rod 305 includes portion 309 that extends into an interior of the hood 301. A mirror-image of components 305, 306, 307 and 309 attach to a right side of the hood 301 shown somewhat in FIG. 39. The rod portion 309 fits into an elongated opening or slot 312 in a side of a bottom 313 of the grill 62. In the expanded configuration of FIGS. 33, 34, and 35, the rod portion 309 is positioned in a top portion 316 of the slot 312. The hood 301 may be rotated in a counterclockwise direction (as shown in FIG. 35) with the use of handle 315 to move the hood 301 from a closed position (as shown in FIG. 35) to an open position (as shown in FIGS. 40 and 41). The hood 301 may be rotated a clockwise direction (as shown in FIGS. 40 and 41) to return the hood 301 to the closed position. The double-headed arrow 317 in FIG. 34 indicates a height of the grill 62 in the expanded and operational position of the grill 62, while the double headed arrow 408 in FIG. 32 indicates a height of the grill 62 in the compact position of the grill 62. As can be seen, the grill 62 is significantly more compact and has a smaller stature and height when in the compact position illustrated in FIG. 32.

Placing the hood 301 back into its compact position after use involves first lifting a rear 319 of the hood 301 to move the rod portion 309 upward out of the upper portion 316 of the notch 312 and into a vertically elongated portion 410 of the slot 312 (see FIGS. 33-35). Positioning the grill 62 in the compact position allows the grill 62 to be replaced into the travel rack 64 and into the vehicle 65 for storage and transport. Dashed arrow 318 in FIG. 35 identifies a path followed by the rod portion 309 as it moves along the slot 312 and the hood 301 moves from the expanded position to its compact position.

Figure 46:
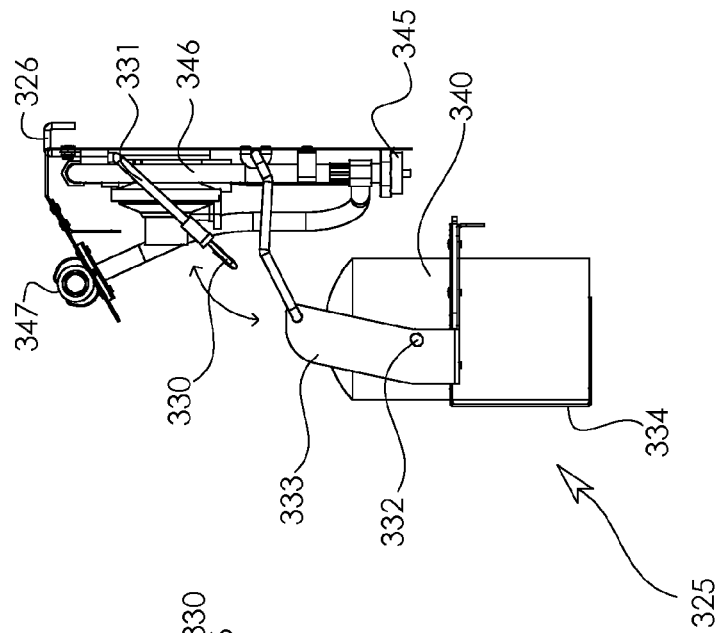
FIG. 46 is a right-side elevational view of the fuel-tank pack with the tank tray rotated partially downward toward its employable or operational position.
Figure 45:
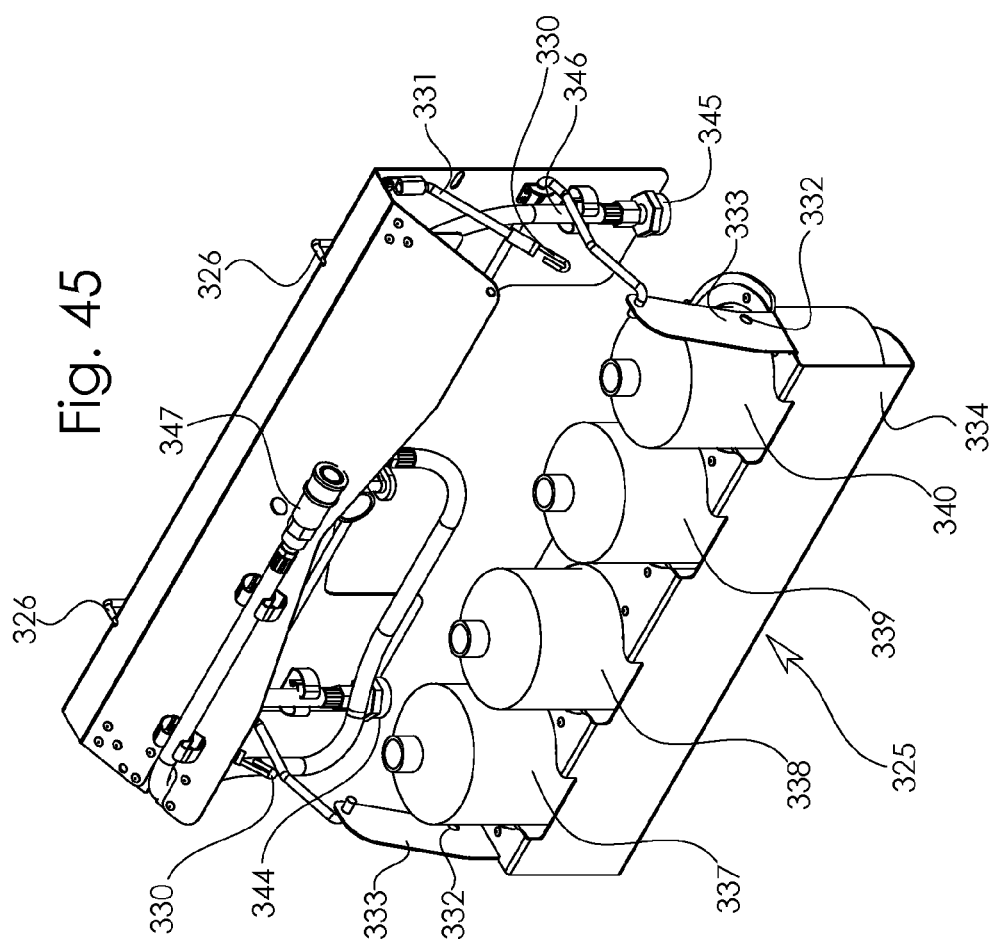
FIG. 45 is a front, right, top isometric view of the fuel-tank pack with a tank tray rotated partially downward towards its employable or operational position.

Once the grill 62 has reached the end of the guide rails 69 and 70 spaced from the vehicle 65 (see FIG. 1) and the cover 301 is raised to its expanded position shown in FIGS. 33-35, a fuel supply is provided in order to cook the food. One example of a fuel supply includes a fuel-tank pack 325 shown in FIGS. 39 and 42-46 is removed from its storage position inside the grill 62 and connected to the guide rail system 63 for use. Hooks 326 of the pack 325 are placed in openings 327 of the end brace 125 (see FIG. 14, for example). Hooks 330 on bungee cords 331 of the pack 325 may be removed from openings 332 in side arms 333 to allow basket 334 to drop down, as seen in FIGS. 45 and 46, from its stored position (see FIGS. 42-44) to its operational position (see FIGS. 1, 2, and 39). This places four fuel tanks 337, 338, 339, and 340 in position for use. Connectors 344 and 345 on hose 346 may attach to one or two of the tanks 337-340 as seen in FIG. 39. Coupling 349 at the other end of the hose 346 attaches to the grill 62 itself as seen in FIGS. 1, 2, and 39 to provide it with fuel. Thus, in the illustrated example, the fuel pack 325 holds two tanks 337 and 340 being utilized to provide fuel and two tanks 338 and 339 for future use.

An interior of the grill 62 is shown in FIGS. 40 and 41. The grill 62 includes a warming shelf 352 movable between a storage position (see FIG. 40) and an operational position (see FIG. 41). Placing the warming shelf 352 in the operational position involves removing it from standards 353 and 354 and turning it over. Warming legs 355 and 356 of the warming shelf 352 point downward and are positioned in and on the standards 353 and 354. This configuration projects the shelf 352 upwards and away from a grilling surface 358 and a heating element lying underneath the grilling surface 358. Positioning the warming shelf 352 at this distance from the heating element results in any food positioned on the shelf 352 being warmed rather than cooked. After using the grill 62, flipping the shelf 352 back over returns the shelf 352 to the configuration shown in FIG. 40, thereby allowing the grill 62 to return to its compact position.

Figure 47:
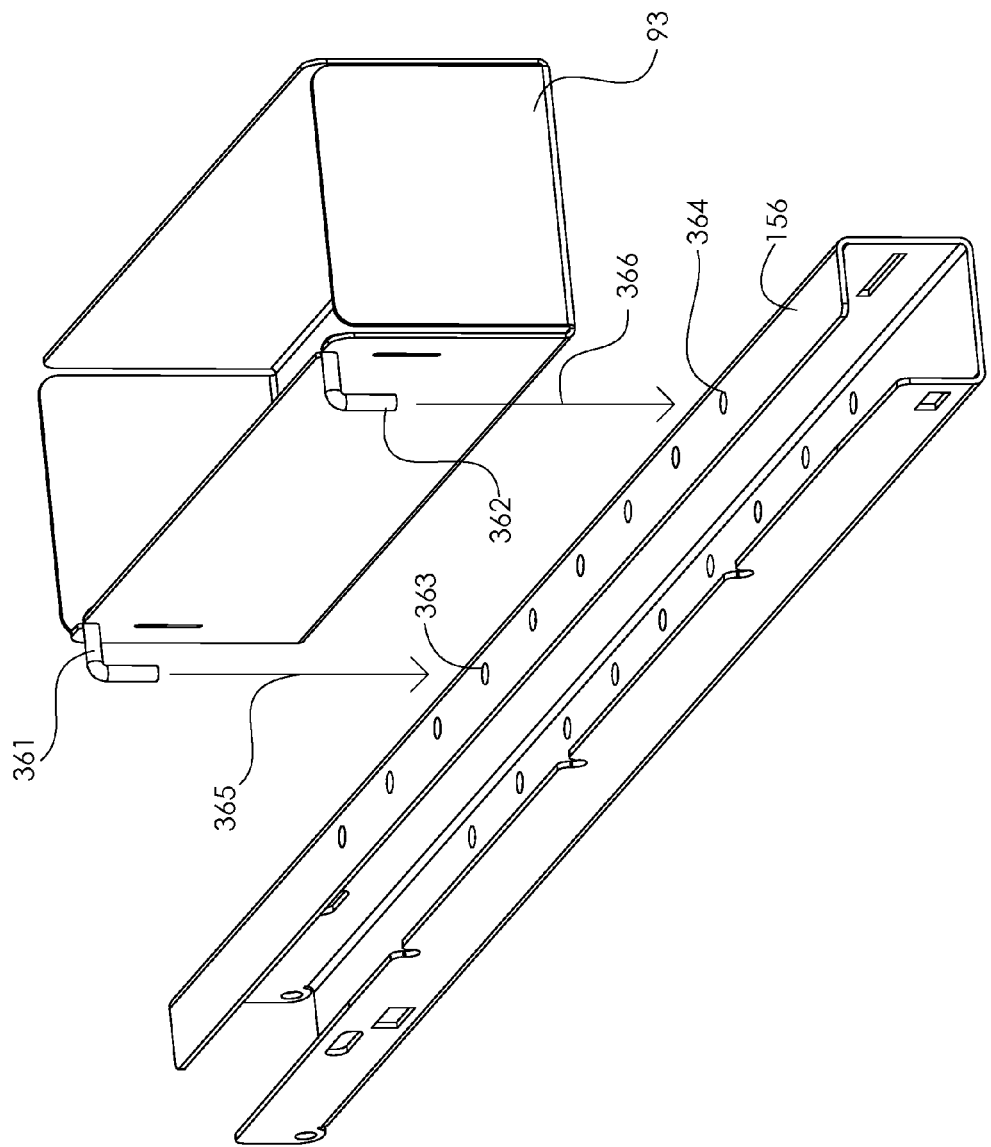
FIG. 47 is an exploded view of a trough for holding various items and its connection to the guide rail system.
Figure 48:
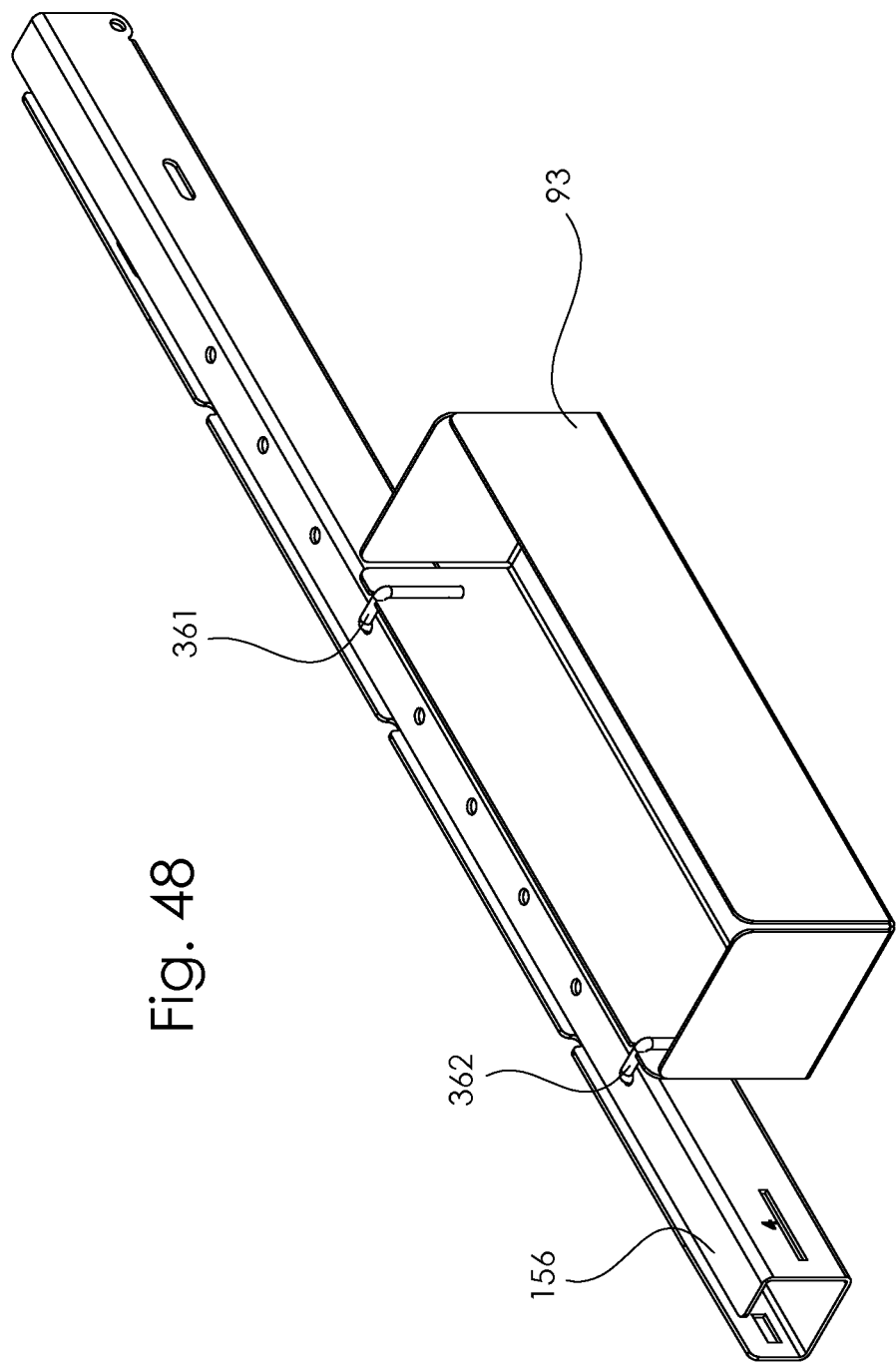
FIG. 48 is a top isometric view of the trough connected to the guide rail system.

Troughs 92 and 93 (one shown in FIGS. 47 and 48) may be attached to the guide rail system 63 by placing or inserting hooks 361 and 362 into openings 363 and 364 of a desired one of the rail sections (for example, rail section 156 is illustrated). Hooks 361 and 362 are moved in a direction identified by arrows 365 and 366 to achieve connection of the trough 93 to a desired rail section (see FIG. 48). The trough 92 attaches to a desired rail section in a similar manner. The troughs 92 and 93 can hold condiments, napkins, eating ware and the like.

Figure 49:
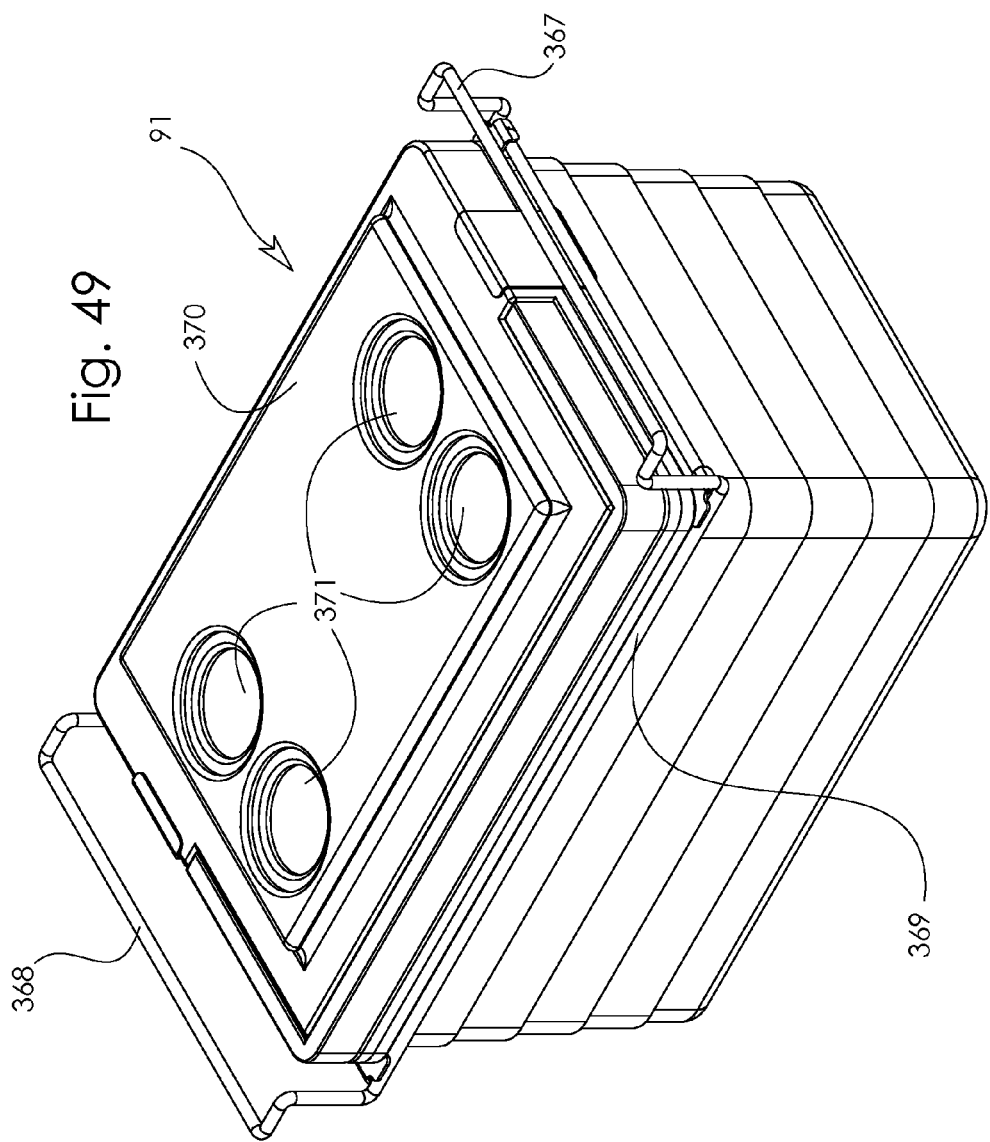
FIG. 49 is a top isometric view of a cooler and a hanger for connecting the cooler to guide rail system.

With reference to FIGS. 1, 2 and 49, storage units 90 and 91 are shown and a manner of supporting the units 90 and 91 with the guide rail system 63 is described. One storage unit 91 is illustrated in FIG. 49, but the following description also applies to storage unit 90. The storage unit 91 includes side rods 367 and 368, connected by cross rods 369. Side rods 367 and 368 sit upon and are supported on the guide rails 69 and 70 when the unit 91 slips between the guide rails 69 and 70. The storage unit 90 fits into place in a similar manner. Each storage unit 90 and 91 includes a removable top 370 which permits access to its interior to retrieve or return stored items. The cover 370 also provides circular indentations 371 for cups, mugs, and the like. The platforms 84-87 sit between outer edges of the guide rails 69 and 70 where they can serve as table tops or other working surface or support structures for food and beverages.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the present disclosure have been described, it will be apparent to those of ordinary skill in the art that other embodiments and implementations are possible within the scope of the present disclosure. Accordingly, the present disclosure is not to be restricted except in light of the attached claims and their equivalents.

What is claimed is:

1. A portable cooking system comprising:
   a guide member; and
   a cooking device supported by the guide member, wherein the cooking device engages and is movable along the guide member between a first cooking device position, in which the cooking device is at least partially positioned within a vehicle, and a second cooking device position, in which the cooking device is spaced-apart from and external of the vehicle;
   wherein the guide member is a first guide rail, the portable cooking system further comprising a second guide rail spaced-apart from the first guide rail, wherein the cooking device is supported by the first guide rail and the second guide rail, and wherein the cooking device engages and is movable along the first guide rail and the second guide rail between the first cooking device position and the second cooking device position.

2. The portable cooking system of claim 1, wherein the cooking device is a grill.

3. The portable cooking system of claim 1, wherein the second guide rail is moveable with the first guide rail between a first guide member position and a second guide member position.

4. The portable cooking system of claim 3, wherein the guide member is at least partially supported by the vehicle when the guide member is in both the first guide member position and the second guide member position.

5. A portable cooking system comprising:
a guide member; and
a cooking device supported by the guide member, wherein the cooking device engages and is movable along the guide member between a first cooking device position, in which the cooking device is at least partially positioned within a vehicle, and a second cooking device position, in which the cooking device is spaced-apart from and external of the vehicle;
wherein the guide member is comprised of a plurality of telescoping sections, and wherein the plurality of telescoping sections are nested with the guide member in a first guide member position and extend from one another when the guide member is in a second guide member position.

6. The portable cooking system of claim 5, wherein the guide member is moveable between the first guide member position, in which the guide member is at least partially positioned within the vehicle, and the second guide member position, in which the guide member extends from and externally of the vehicle, wherein the guide member is in the second guide member position when the cooking device is in the second cooking device position.

7. A portable cooking system comprising:
a guide member;
a cooking device supported by the guide member, wherein the cooking device engages and is movable along the guide member between a first cooking device position, in which the cooking device is at least partially positioned within a vehicle, and a second cooking device position, in which the cooking device is spaced-apart from and external of the vehicle; and
a support leg selectively connected to the guide member, wherein the support leg is connected to the guide member when the guide member is in a second guide member position and is disconnected from the guide member when the guide member is in a first guide member position.

8. A portable cooking system comprising:
a guide member;
a cooking device supported by the guide member, wherein the cooking device engages and is movable along the guide member between a first cooking device position, in which the cooking device is at least partially positioned within a vehicle, and a second cooking device position, in which the cooking device is spaced-apart from and external of the vehicle; and
a plurality of support legs selectively connected to the guide member, wherein the plurality of support legs are connected to the guide member when the guide member is in a second guide member position and are disconnected from the guide member when the guide member is in a first guide member position.

9. A portable cooking system comprising:
a guide member; and
a cooking device supported by the guide member, wherein the cooking device engages and is movable along the guide member between a first cooking device position, in which the cooking device is at least partially positioned within a vehicle, and a second cooking device position, in which the cooking device is spaced-apart from and external of the vehicle;
wherein the guide member is supported by the vehicle when the guide member is in a first guide member position and is not supported by the vehicle when the guide member is in a second guide member position.

10. A portable cooking system comprising:
a rack configured to be positioned in a vehicle;
a guide member moveable between a first guide member position, in which the guide member is at least partially positioned within the rack and the vehicle, and a second guide member position, in which the guide member at least partially extends out from the rack and the vehicle;
a cooking device supported by the guide member and movable along the guide member between a first cooking device position, in which the cooking device is at least partially positioned within the rack and the vehicle, and a second cooking device position, in which the cooking device is spaced-apart from and external of the rack and the vehicle; and
a cart configured to support the rack when the rack is outside of the vehicle.

11. The portable cooking system of claim 10, wherein the cart includes a plurality of telescoping legs and a plurality of wheels with one wheel for each of the telescoping legs, wherein the plurality of telescoping legs are adjustable to adjust a height of the cart.

12. The portable cooking system of claim 10, wherein the cooking device includes at least one wheel engageable with the guide member to facilitate movement of the cooking device along the guide member between the first cooking device position and the second cooking device position.

13. A portable cooking system comprising:
a rack configured to be positioned in a vehicle;
a guide member moveable between a first guide member position, in which the guide member is at least partially positioned within the rack and the vehicle, and a second guide member position, in which the guide member at least partially extends out from the rack and the vehicle; and
a cooking device supported by the guide member and movable along the guide member between a first cooking device position, in which the cooking device is at least partially positioned within the rack and the vehicle, and a second cooking device position, in which the cooking device is spaced-apart from and external of the rack and the vehicle;
wherein the cooking device has a compact position, in which the cooking device has a first height, and an expanded position, in which the cooking device has a second height, wherein the first height is less than the second height.

14. The portable cooking system of claim 13, wherein the cooking device includes a firebox and a hood, wherein the firebox defines a slot therein and the hood includes a rod at least partially positioned in and moveable within the slot, and wherein the rod moves within the slot as the cooking device moves between the compact position and the expanded position.

15. A portable cooking system comprising:
a rack configured to be positioned in a vehicle;
a guide rail system including a plurality of telescoping portions moveable between a first guide rail system position, in which the plurality of telescoping portions are nested and at least partially positioned within the rack and the vehicle, and a second guide rail system position, in which the plurality of telescoping portions at least partially extend out from the rack and the vehicle, wherein the plurality of telescoping portions together provide a first guide rail and a second guide rail spaced-apart from and substantially parallel to one another;

a plurality of support legs selectively connected to the guide rail system, wherein the plurality of support legs are connected to the guide rail system when the guide rail system is in the second guide rail system position and are disconnected from the guide rail system when the guide rail system is in the first guide rail system position; and a cooking device supported by the first guide rail and the second guide rail, wherein the cooking device includes a first wheel engageable with and moveable along the first guide rail and a second wheel engageable with and moveable along the second guide rail, wherein the first and second wheels respectively roll along the first and second guide rails to facilitate movement of the cooking device between a first cooking device position, in which the cooking device is at least partially positioned within the rack and the vehicle, and a second cooking device position, in which the cooking device is spaced-apart from and external of the rack and the vehicle.

16. The portable cooking system of claim 15, wherein the first and second guide rails restrict movement of the cooking device along a predetermined path between the first cooking device position and the second cooking device position.

17. The portable cooking system of claim 15, wherein the guide rail system is configured to support at least one of a flat platform, a storage unit, a trough and a fuel supply at any one of a plurality of positions on the guide rail system.

18. The portable cooking system of claim 17, wherein the guide rail system is configured to support all of the flat platform, the storage unit, the trough and the fuel supply, wherein each of the flat platform, the storage unit, the trough and the fuel supply may be supported in any one of a plurality of positions on the guide rail system.

* * * * *